United States Patent [19]

Kambayashi et al.

[11] Patent Number: 6,163,799
[45] Date of Patent: Dec. 19, 2000

[54] COMMUNICATION NAVIGATION SYSTEM WHICH EASILY FINDS PERSON WHO IS INTERESTED IN THE SAME TOPIC

[75] Inventors: Toru Kambayashi, Chigasaki; Ichiro Tomoda, Tokyo; Yasuhiko Shimomura, Yokohama; Takashi Ida; Hirofumi Muratani, both of Kawasaki; Toshiya Takahashi, Tokyo; Masafumi Kondo, Sagamihara; Satoshi Ito; Shuichi Tsujimoto, both of Yokohama; Akira Morishita, Tokyo; Yoshihiro Ohmori, Yokohama, all of Japan

[73] Assignee: Kabushiki Kaisha Toshiba, Kawasaki, Japan

[21] Appl. No.: 09/050,073

[22] Filed: Mar. 30, 1998

Related U.S. Application Data

[63] Continuation of application No. 08/616,310, Mar. 15, 1996, abandoned.

[30] Foreign Application Priority Data

Mar. 15, 1995 [JP] Japan .................................... 7-083433
Aug. 30, 1995 [JP] Japan .................................... 7-222156
Jan. 10, 1996 [JP] Japan .................................... 8-002584

[51] Int. Cl.⁷ .................................................. G06F 15/16
[52] U.S. Cl. ........................... 709/204; 709/217; 348/15; 370/260
[58] Field of Search ..................................... 709/204, 217, 709/203, 206; 370/265, 260, 262, 261; 712/33, 34; 705/39; 379/93.21, 158; 395/701; 348/15; 386/6, 33; 845/330, 334

[56] References Cited

U.S. PATENT DOCUMENTS

| 5,543,927 | 8/1996 | Herz ............................................ 386/6 |
| 5,819,092 | 10/1998 | Ferguson et al. .......................... 705/39 |
| 5,915,091 | 6/1999 | Ludwig et al. .......................... 709/204 |

*Primary Examiner*—Daniel H. Pan
*Attorney, Agent, or Firm*—Oblon, Spivak, McClelland, Maier & Neustadt, P.C.

[57] ABSTRACT

A navigation communication system in which a plurality of clients access information stored in a server via a network, having a personal information control section provided in the server and controls the personal information of the users of the clients which access the same information and a personal information display section provided in the client and displays the personal information controlled by the personal information control section, a selector for selecting one of the personal information displayed, and a communication application section for communicating with a client corresponding to the selected personal information.

26 Claims, 58 Drawing Sheets

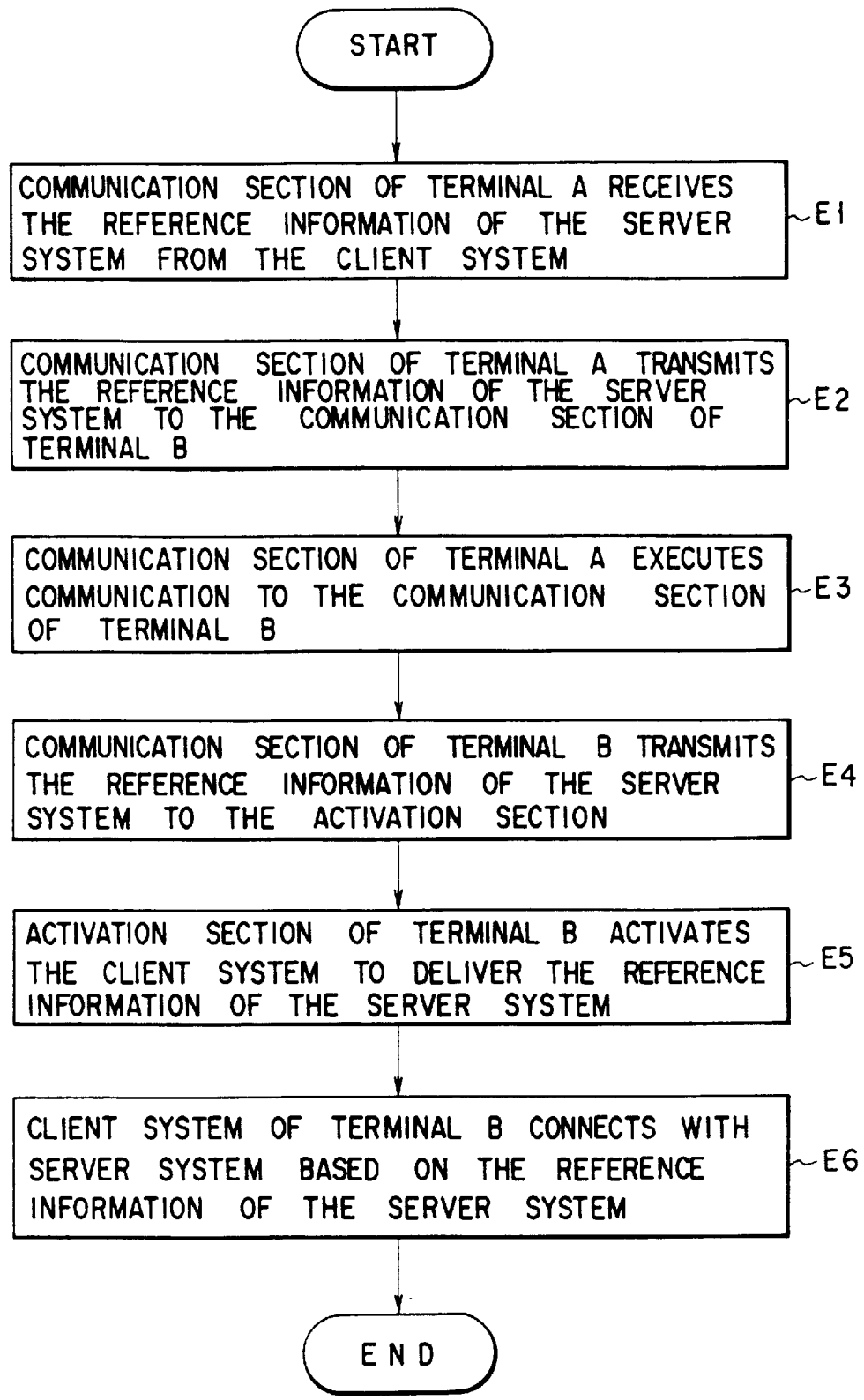
F I G. 9

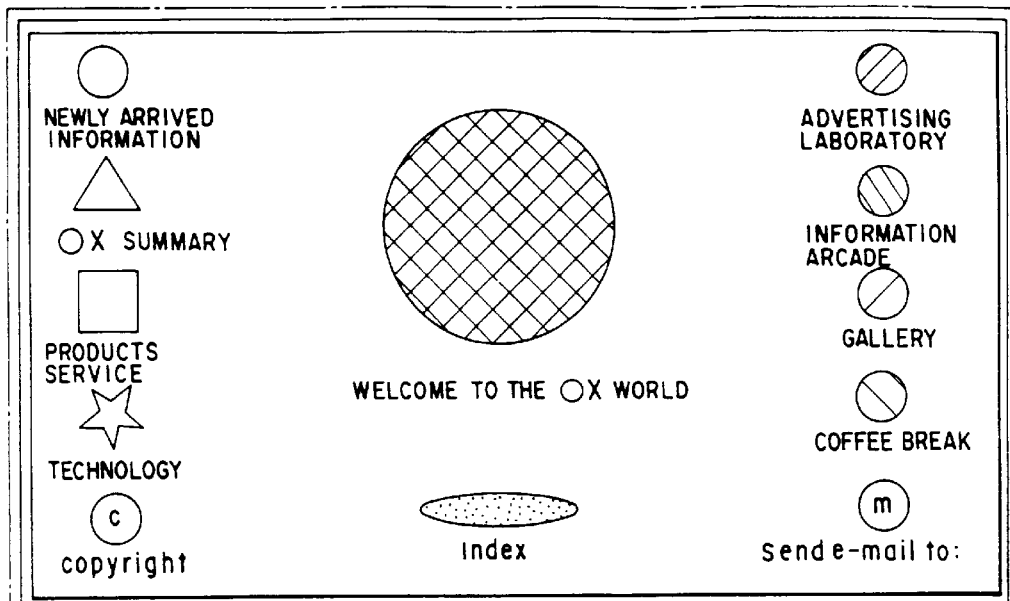
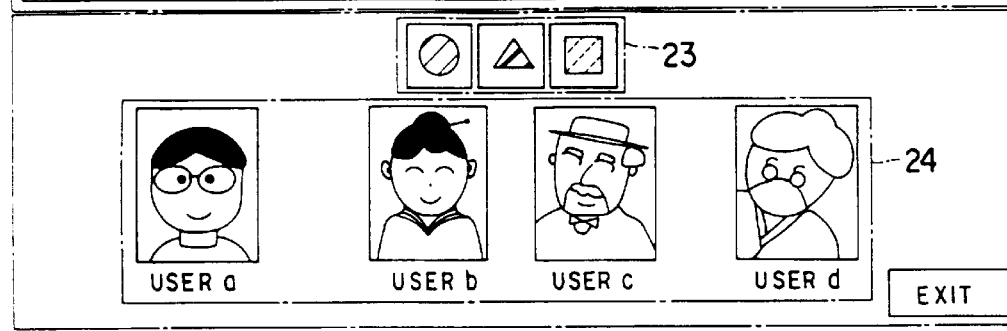
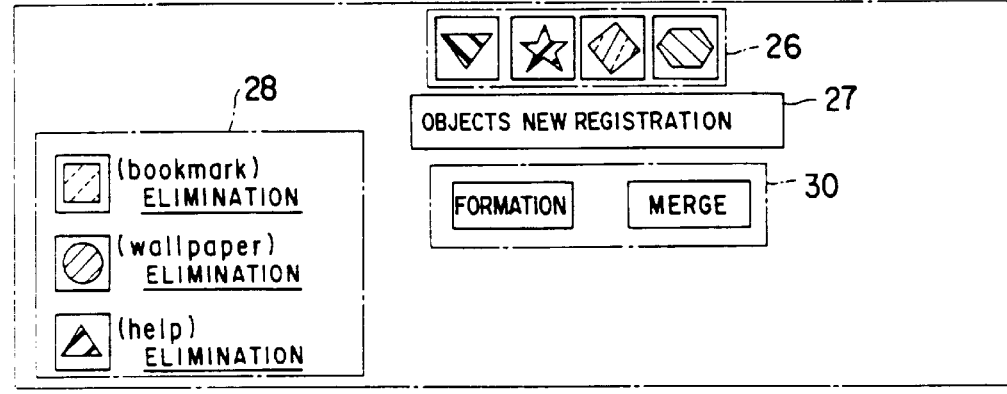
FIG. 12

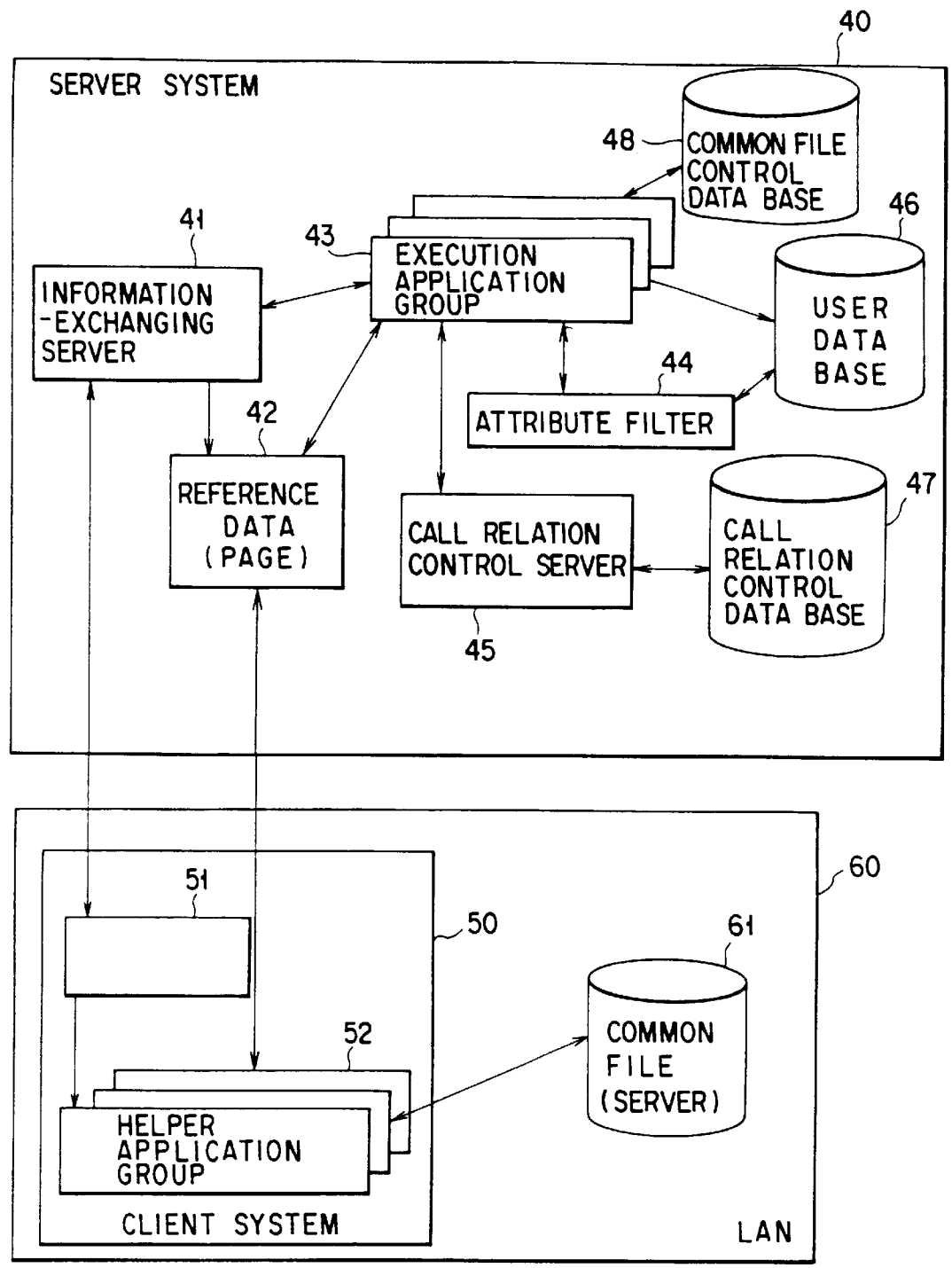
F I G. 13

OBJECT DB

| | OBJECT ID | ATTRIBUTE | POSITION COORDINATES | NETWORK ADDRESS |
|---|---|---|---|---|
| OBJECT1 | 10002110 | SHOP | (25, 30, 0) | (133.115.100.1) |
| OBJECT2 | 10002111 | CLERK | (25, 30, 0) | (133.196.25.2) |
| OBJECT3 | 10002112 | CUSTOMER | (25, 35, 0) | (133.115.100.30) |
| OBJECT4 | 10002115 | CUSTOMER | (24, 28, 0) | (145.201.50.2) |
| OBJECT5 | 10002119 | CUSTOMER | (50, 20, 15) | (189.30.31.45) |
| .. | .. | .. | .. | .. |

F I G. 26

BUYING DETERMINATION
MODE
SHOP OBJECT

SALESCLERK OBJECT

THE CROWDS OBJECT

FROM ONE TO FIVE PEOPLE

ENERGY-FEELING MODE

FROM SIX TO TWENTY PEOPLE

NORMAL COMMUNICATION MODE

FROM TWENTY-ONE PEOPLE TO FIFTY PEOPLE

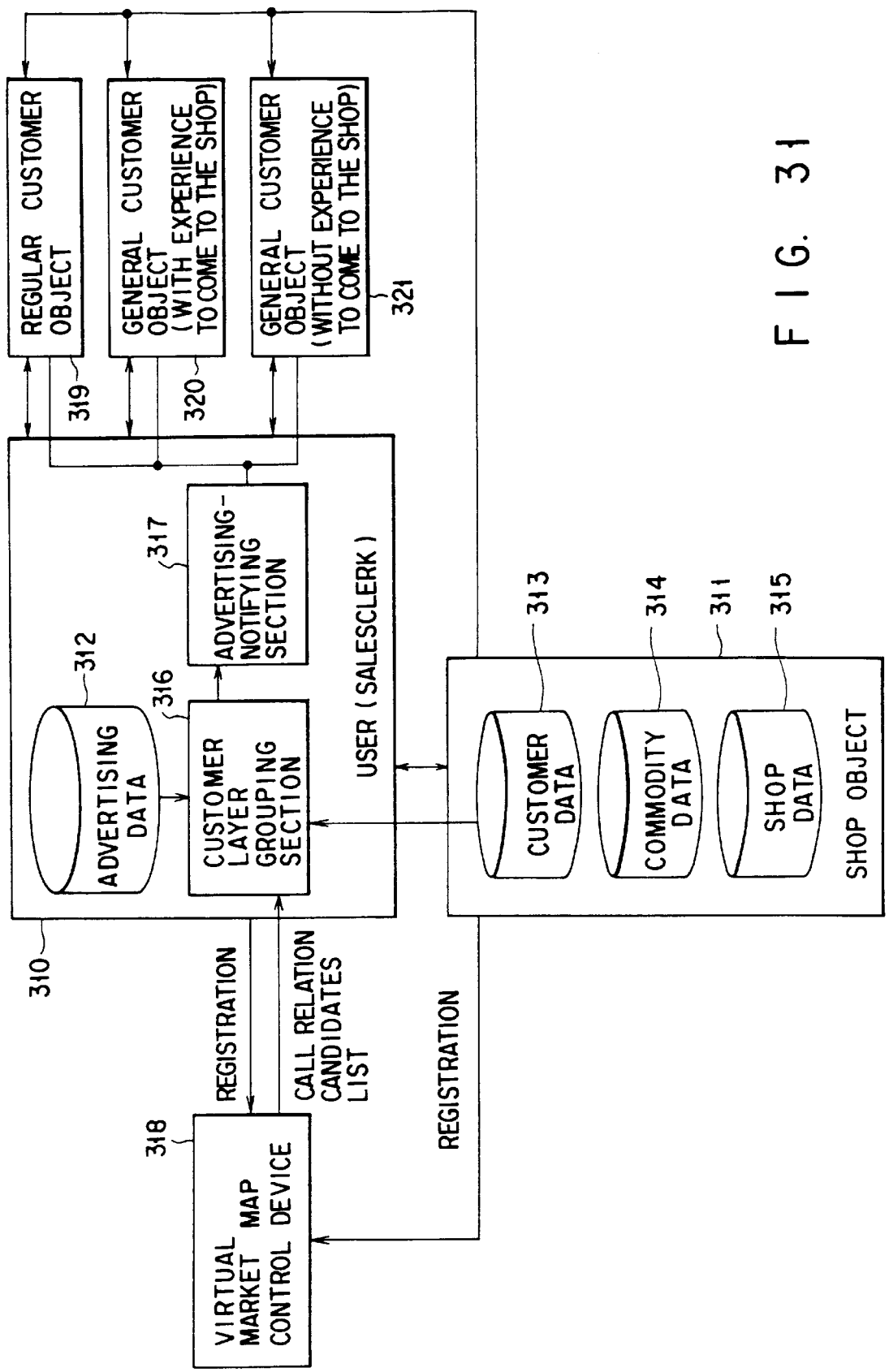
F I G. 31

TODAY'S ARTICLE TO BE OFFERED
AT A BARGAIN
  · ○ ○ ○ ○ ○
  · × × × × ×
  · ☐ ☐ ☐ ☐ ☐
LIST OF COMMODITIES WHICH ARE
DEALT IN THE SHOP
  · A A A A A
  · B B B B B
  · C C C C C

INTRODUCCION OF
THE SHOP
  · D D D D
  · E E E E
  · G G G G G G G

FIG. 34

CUSTOMER DATA

| object ID | NUMBER OF USE | USED AMOUNT | SPECIFICATION OF USE | IMPORTANCE LEVEL OF CUSTOMERS |
|---|---|---|---|---|
| 10002112 | 30 TIMES | 150,000 | file-No. 1001 | 80 |
| 10002115 | 2 TIMES | 2,000 | file-No. 1002 | 20 |
| 10002119 | 6 TIMES | 300,000 | file-No. 1002 | 0 |
| 10002431 | 0 TIMES | 0 | file-No. 1003 | 85 |
| ⋮ | ⋮ | ⋮ | ⋮ | ⋮ |

FIG. 35

| NW ENTRY | 1110.10 | 2110.11 | 2110.15 |
|---|---|---|---|
| NAME OF OBJECT | A | B | C |
| POSITION, SIZE | xa, wa | xb, wb | xc, wc |
| LOCATION OF TERMINAL | CITY T | CITY F | CITY F |
| ATTRIBUTE 4 | --- | --- | --- |
| ATTRIBUTE 5 | --- | --- | --- |
F I G. 37
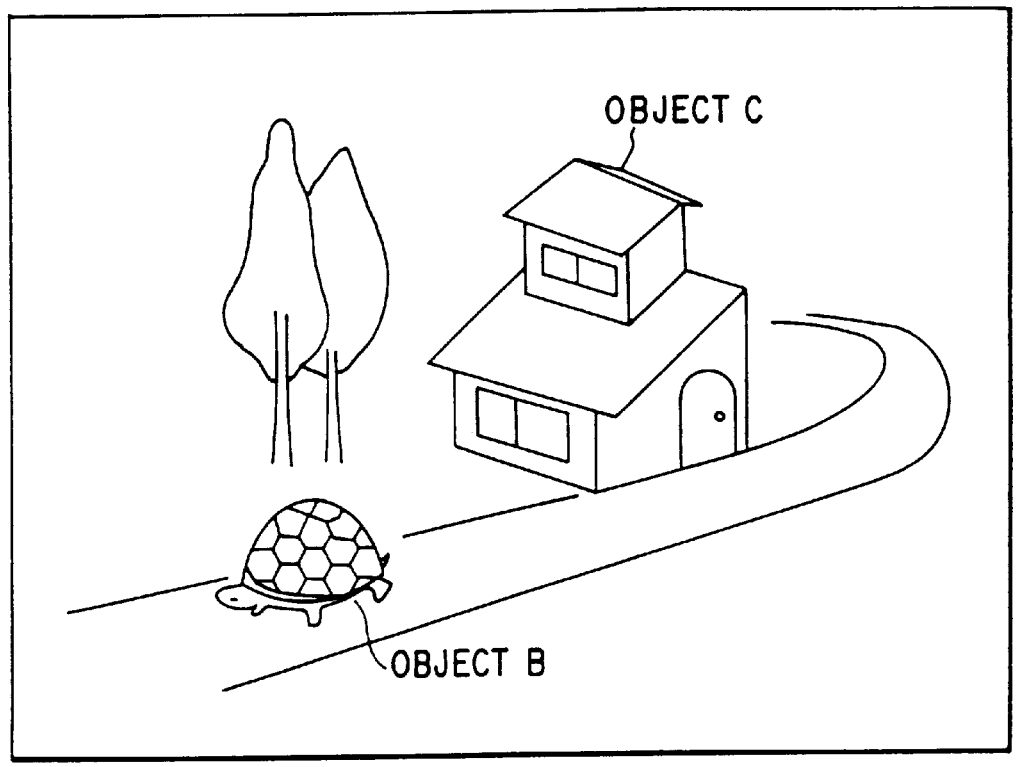
F I G. 38

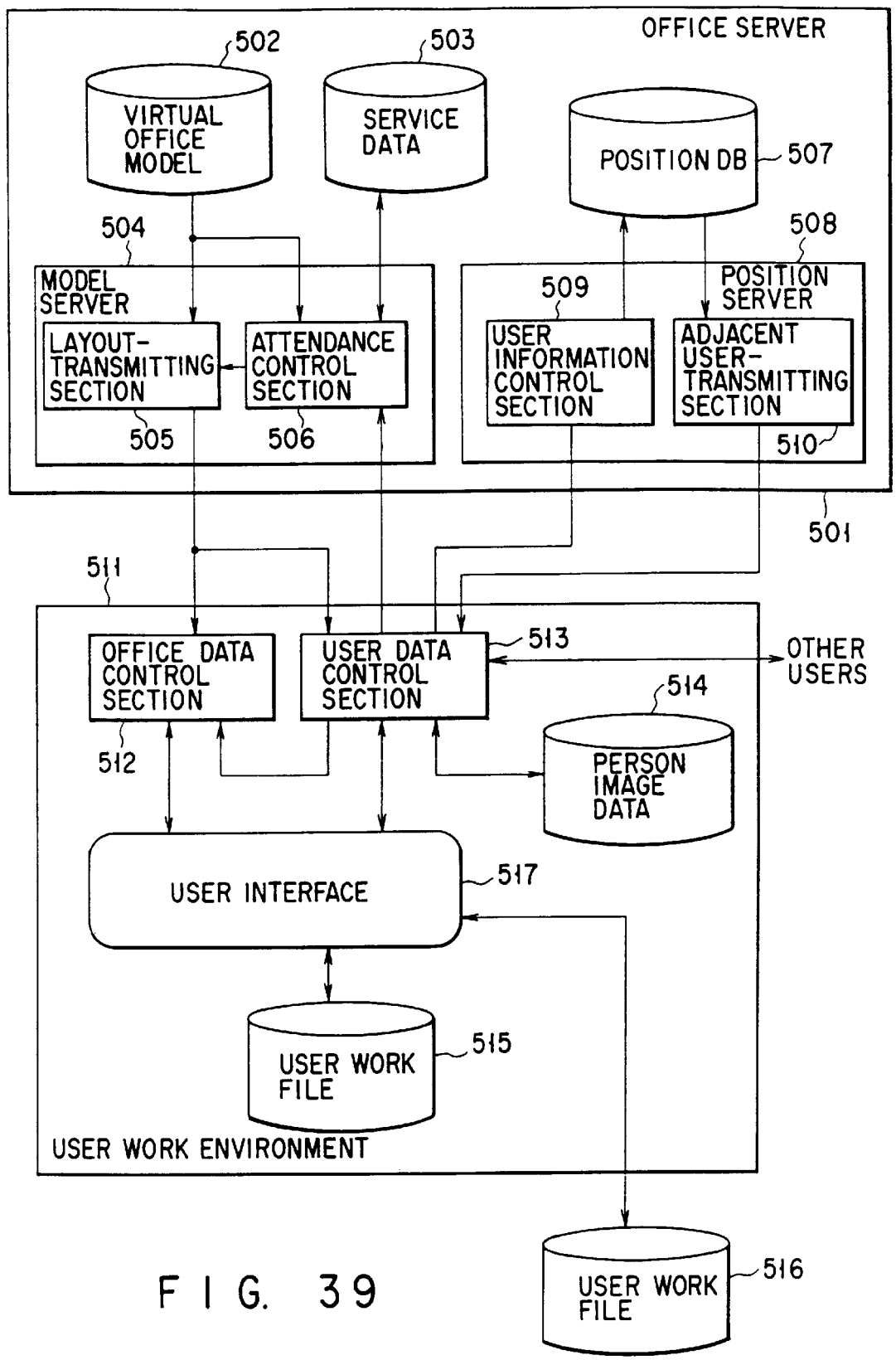
F I G. 39

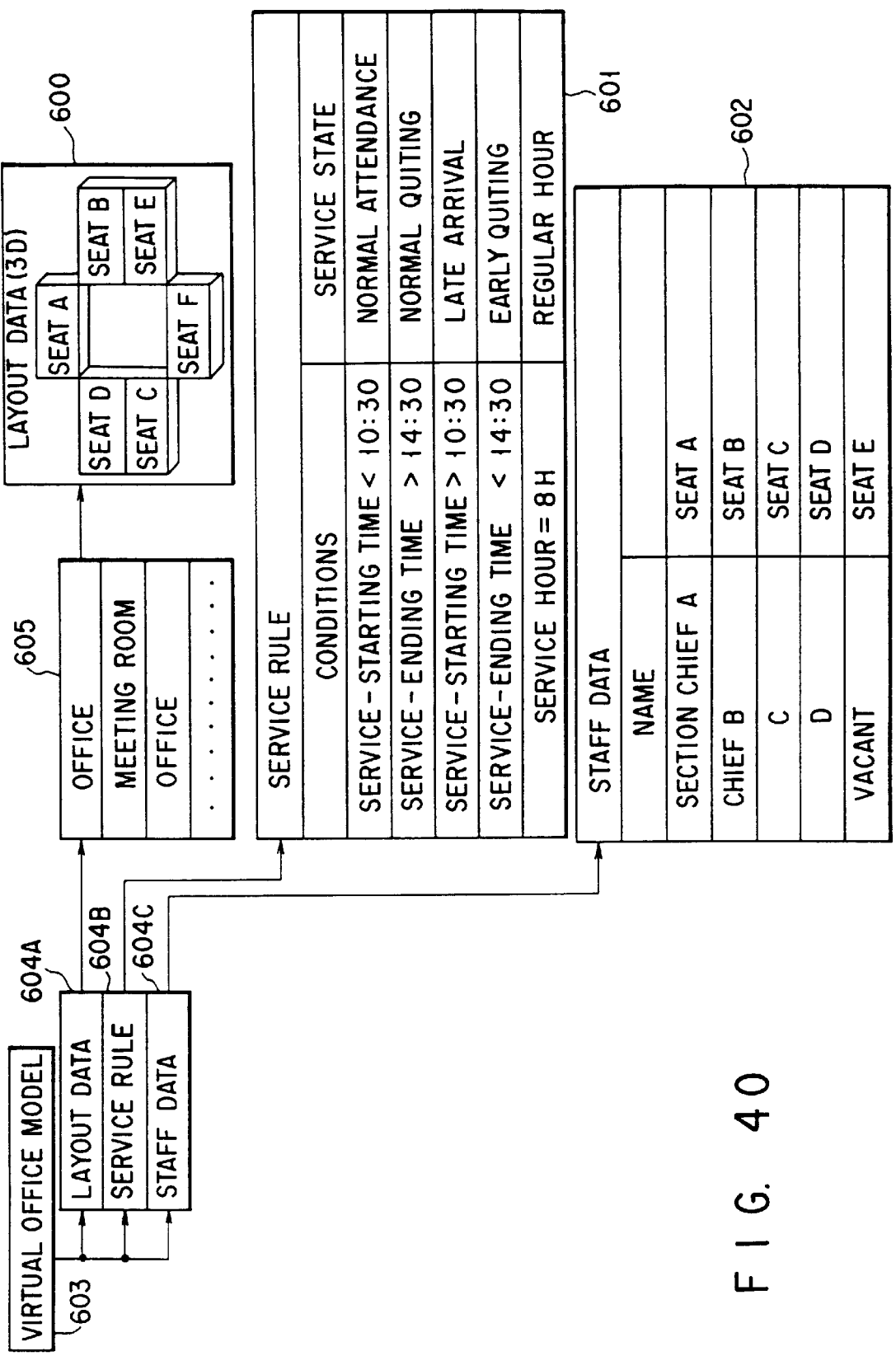
F I G. 40

SERVICE DATA

NAME OF STAFF: CHIEF B  DATA MAY:1ST,1996

| SERVICE STATE | LOG-IN TIME | DOWNTIME INTERRUPTION | DOWNTIME RESUMPTION | LOGOUT TIME | ACTUAL WORKING HOUR | DIFFERENCE OF | OVERTIME AGGREGATE | NOTE |
|---|---|---|---|---|---|---|---|---|
| 1*(SUN) | : | : | : | : | | | | MAY DAY |
| 2*(MON) | : | : | : | : | | | | |
| 3*(TUE) | : | : | : | : | | | | CONSTITUTION DAY |
| 4*(WED) | : | : | : | : | | | | |
| 5*(THU) | : | : | : | : | | | | CHILDREN'S DAY |
| 6 (FRI) | 10:00 | : | : | 19:00 | 8 | 0 | 0 | |
| 7 (SAT) | 8:30 | : | : | 17:30 | 8 | 0 | 0 | |
| 8*(SUN) | : | : | : | : | | | | |
| 9 (MON) | 10:00 | : | : | 22:00 | 10.5 | 2.5 | 2.5 | MOTHER'S DAY |
| 10 (TUE) | 10:00 | : | : | 18:00 | 7 | -1 | 1.5 | |
| 11 (WED) | 10:00 | : | : | 17:30 | 6.5 | -1.5 | 0 | |
| 12 (THU) | 10:00 | : | : | 18:00 | 7 | -1 | -1 | |
| 13 (FRI) HALF-HOLIDAY | 12:00 | : | : | 17:00 | 8 | 0 | -1 | |
| 14*(SAT) | : | : | : | : | | | -1 | |
| 15*(SUN) | : | : | : | : | | | -1 | |
| 16 (MON) | 10:00 | : | : | 21:30 | 10 | 2 | 1 | |
| 17 (TUE) | 7:30 | : | : | 20:30 | 11.5 | 3.5 | 4.5 | |
| 18 (WED) BUSINESS TRIP | | : | : | : | 8 | 8 | 4.5 | MEETING AT A COMPANY |
| 19 (THU) BUSINESS TRIP | | : | : | : | 8 | 8 | 4.5 | MEETING AT B COMPANY |
| 20 (FRI) | 10:00 | : | : | 17:00 | 6 | -2 | 2.5 | |
| 21*(SAT) | : | : | : | : | | | | |
| 22*(SUN) | : | : | : | : | | | | |
| 23 (MON) | 10:00 | : | : | 18:00 | 7 | -1 | 1.5 | |
| 24 (TUE) | 8:00 | : | : | 16:30 | 7.5 | -0.5 | 1.0 | |
| 25 (WED) | 10:00 | : | : | 17:00 | 6 | -2 | -1.0 | |
| 26 (THU) BUSINESS TRIP | | : | : | : | 8 | 0 | -1.0 | MEETING AT C COMPANY |
| 27 (FRI) EXTRA ATTENDANCE | 8:00 | : | : | 17:00 | 8 | 0 | -1.0 | |
| 28*(SAT) | 10:00 | : | : | 17:30 | 6.5 | 6.5 | 5.5 | |
| 29*(SUN) | : | : | : | : | | | | |
| 30 (MON) | 10:00 | : | : | 19:00 | 8 | 0 | 5.5 | |
| 31 (TUE) | 10:00 | : | : | 18:30 | 7.5 | -0.5 | 5.0 | |

F I G. 41

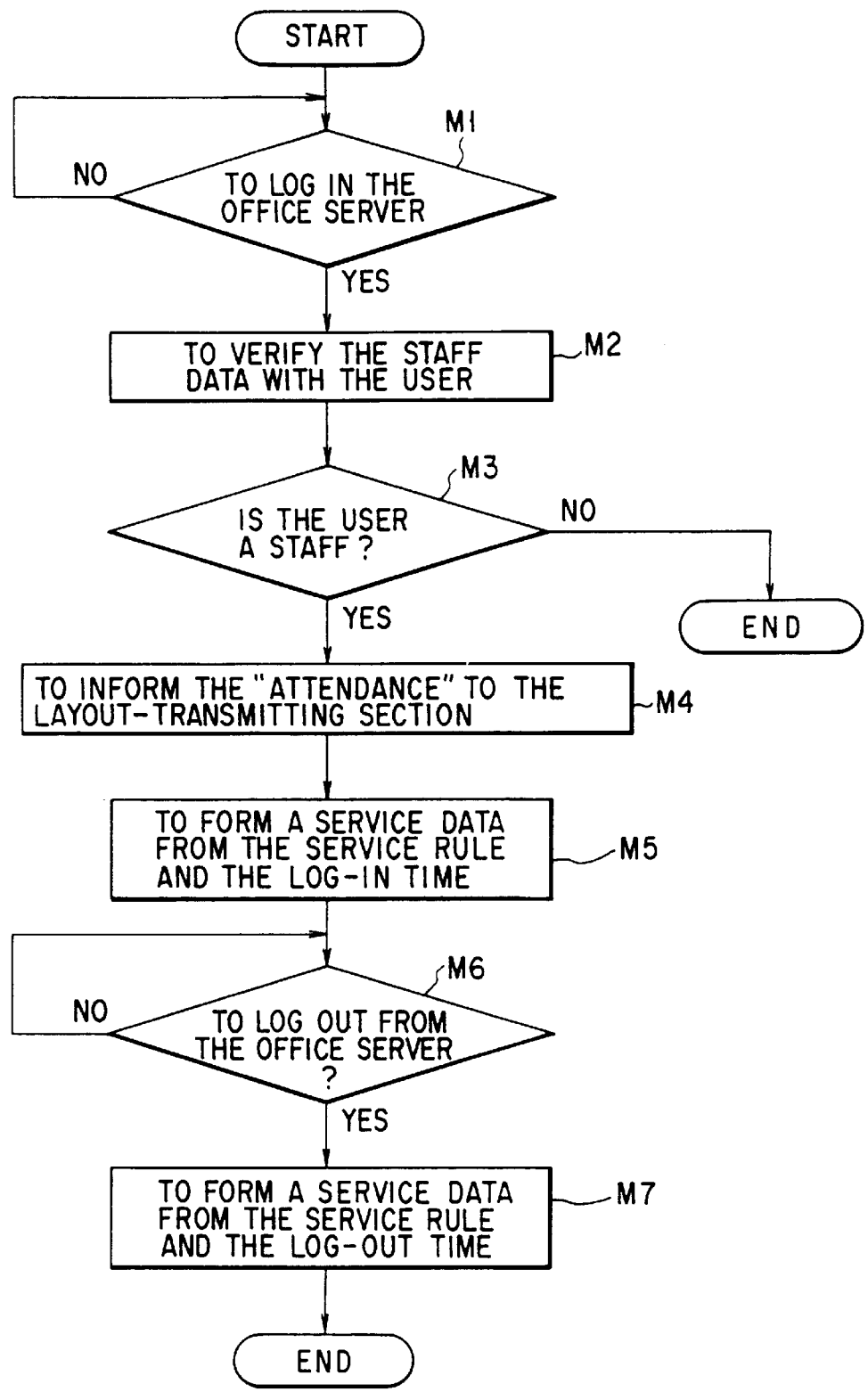
F I G. 42

POSITIONAL DATA BASE

| POSITIONAL DATA | USER ADDRESS | ROOM DATA | LOCAL COORDINATES | ADJACENT DATA |
|---|---|---|---|---|
| SECTION CHIEF A | 111.222.33.44 | OFFICE | (0.0  2.0) | IN THE VICINITY OF SECTION CHIEF A |
| CHIEF B | 111.222.33.55 | OFFICE | (3.0  4.0) | IN THE VICINITY OF CHIEF B |
| C | 111.222.33.66 | OFFICE | (1.0  2.0) | IN THE VICINITY OF C |
| D | 111.222.33.77 | LABORATORY | (3.0  2.0) | IN THE VICINITY OF D |
| ... | | | | ... |

507A ↗ 280

F I G. 46A

ADJACENT DATA

| ADJACENT DATA | | | |
|---|---|---|---|
| IN THE VICINITY OF SECTION CHIEF A | ((0.0  2.0  111.222.33.44), (1.0  2.0  111.222.33.66)) |
| IN THE VICINITY OF CHIEF B | ((3.0  4.0  111.222.33.55), (1.0  2.0  111.222.33.66)) |
| IN THE VICINITY OF C | ((3.0  4.0  111.222.33.55), (0.0  2.0  111.222.33.44)) |
| IN THE VICINITY OF D | nil |
| ... | |

507B ↗ 281

F I G. 46B

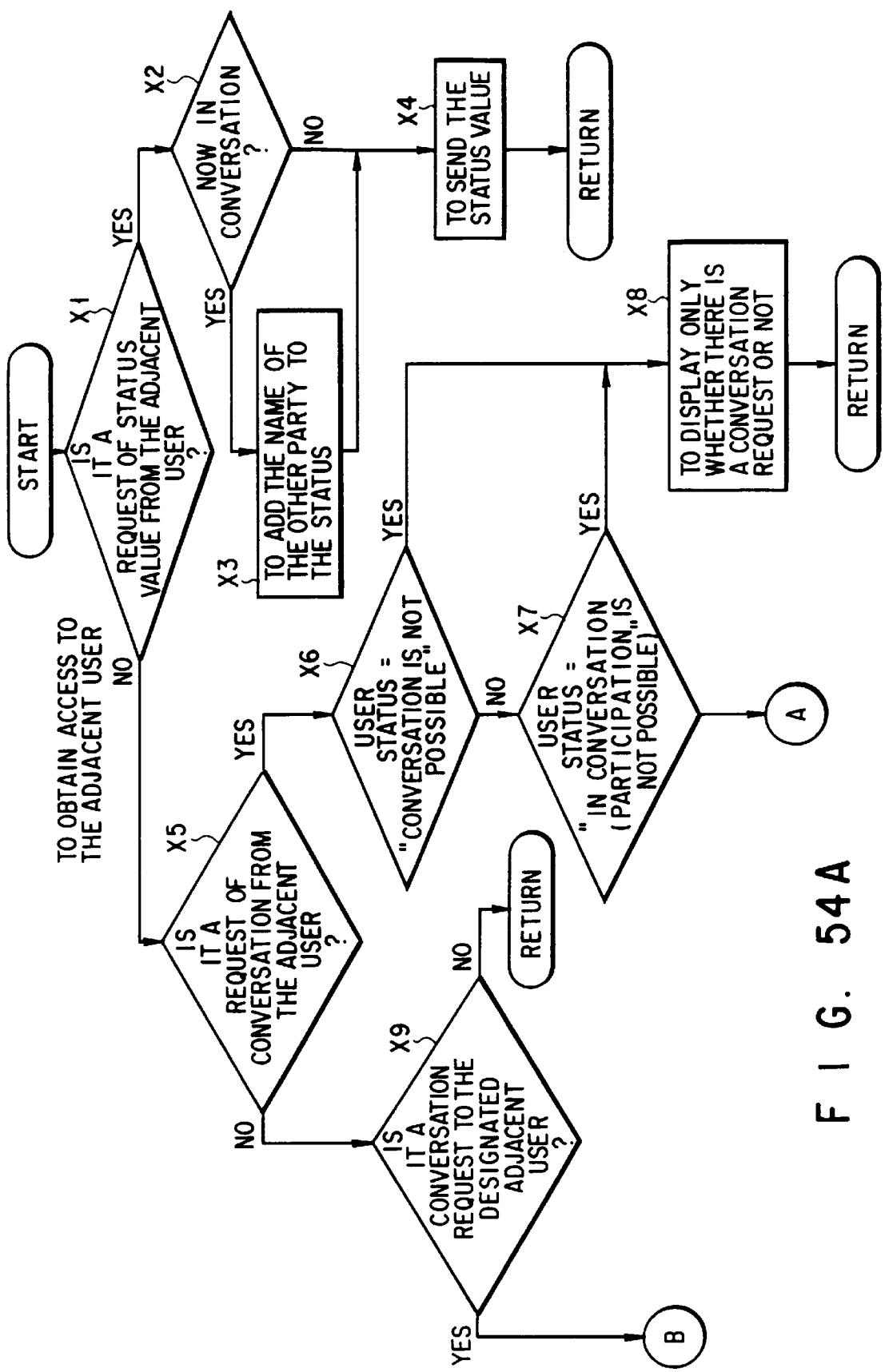
F I G. 54A

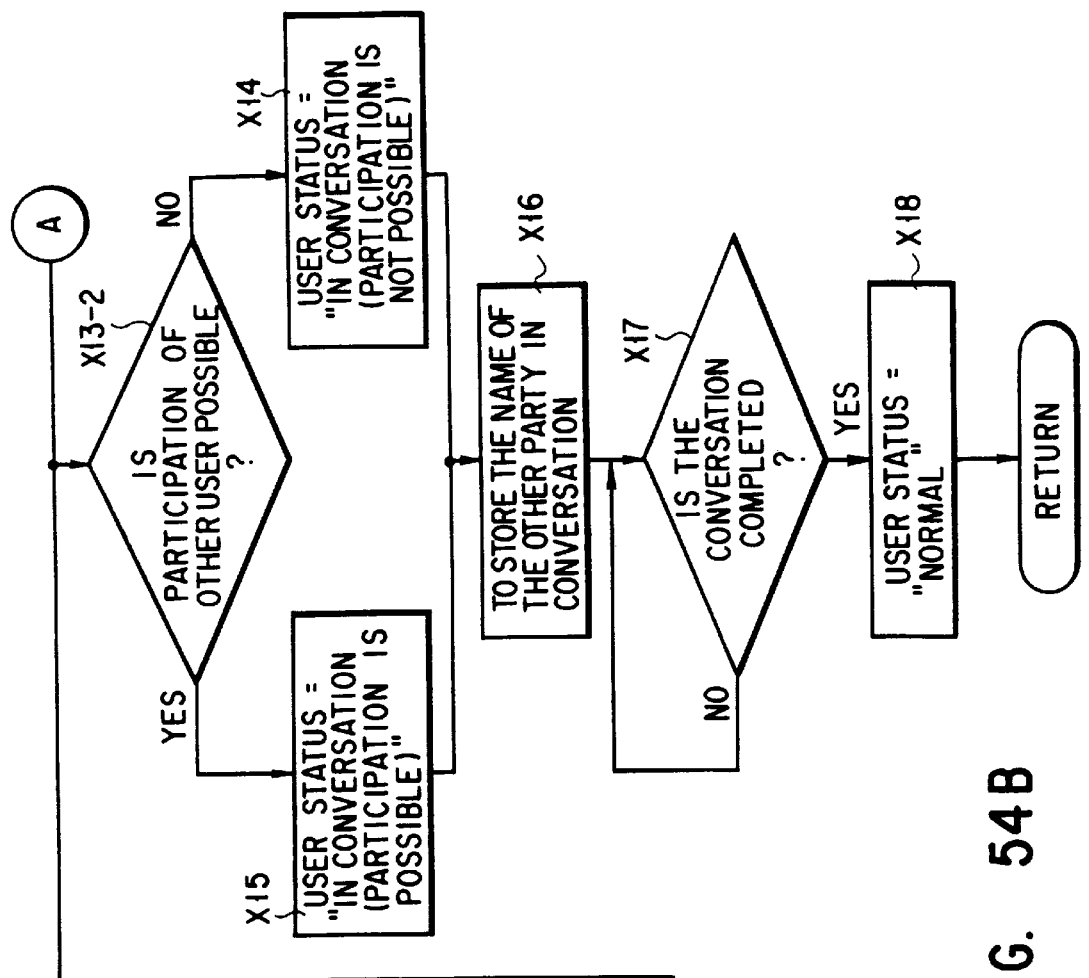
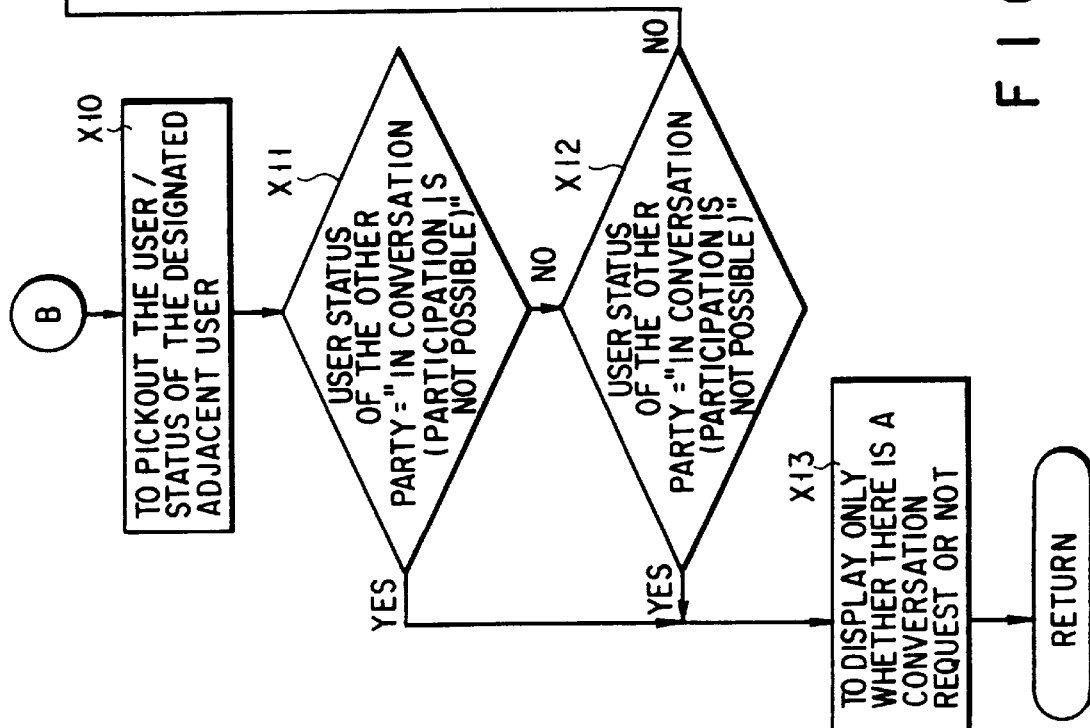
FIG. 54B

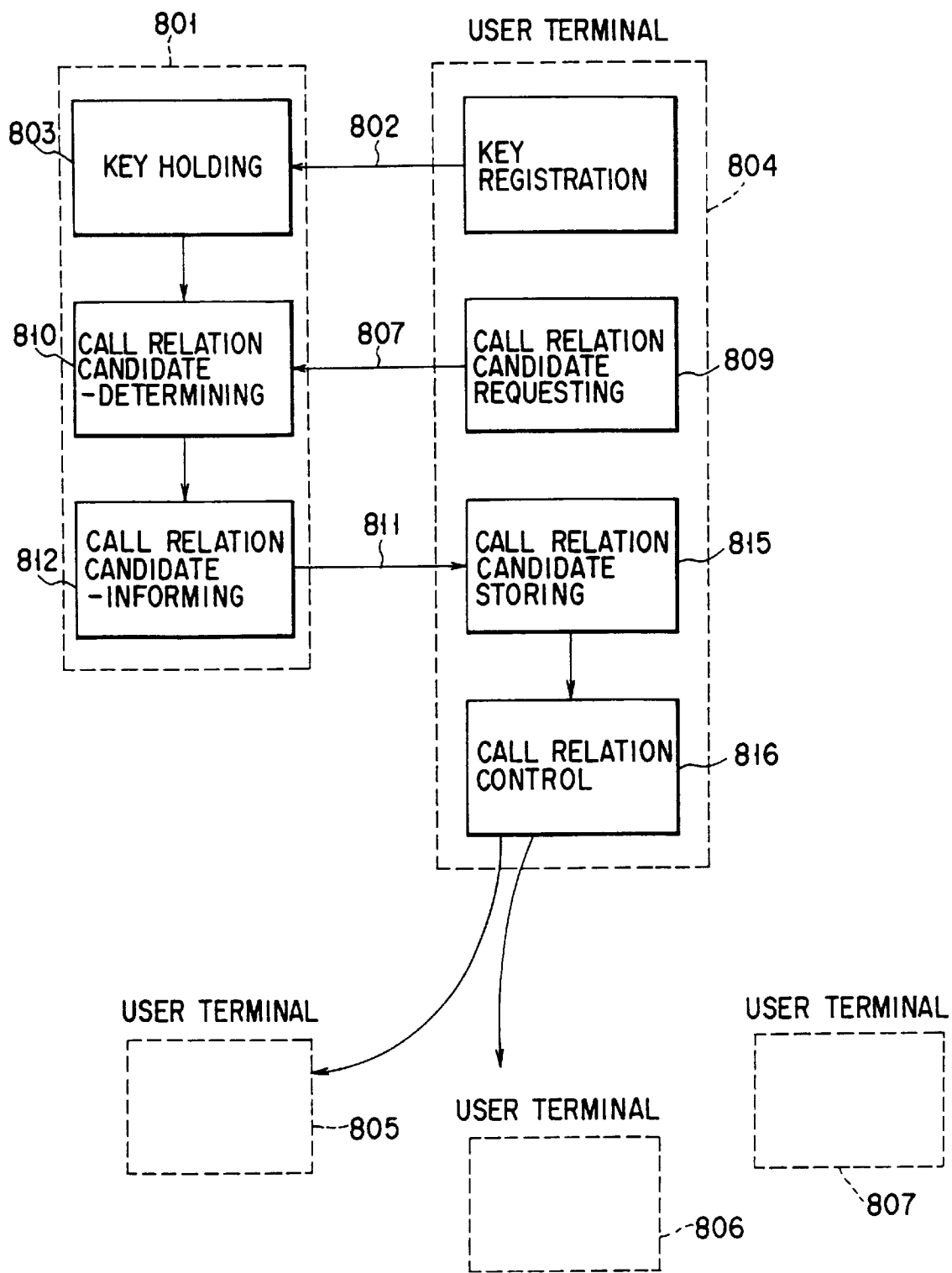
F I G. 64

| KEY NUMBER | ADRESS | POSITION AT SPACE A | POSITION AT SPACE B | INTEREST IN SPORTS | INTEREST IN MUSIC | OTHER INTERESTS | OCCUPATION | ... |
|---|---|---|---|---|---|---|---|---|
| 1 | 1010 | (12, 5) | 803 | 52 | 2 | MOUNTAIN CLIMBING | TEACHER | |
| 2 | 0010 | (100, 20) | 315 | 89 | 68 | GO/GARDENING | OFFICE WORKER | |
| 3 | 0101 | (33, 1) | 681 | 73 | 5 | FISHING | TEACHER | |
| 4 | 0011 | (5, 82) | 208 | 11 | 31 | COOKING | TALENT | |
| ...... | | | | | | | | |

F I G. 65

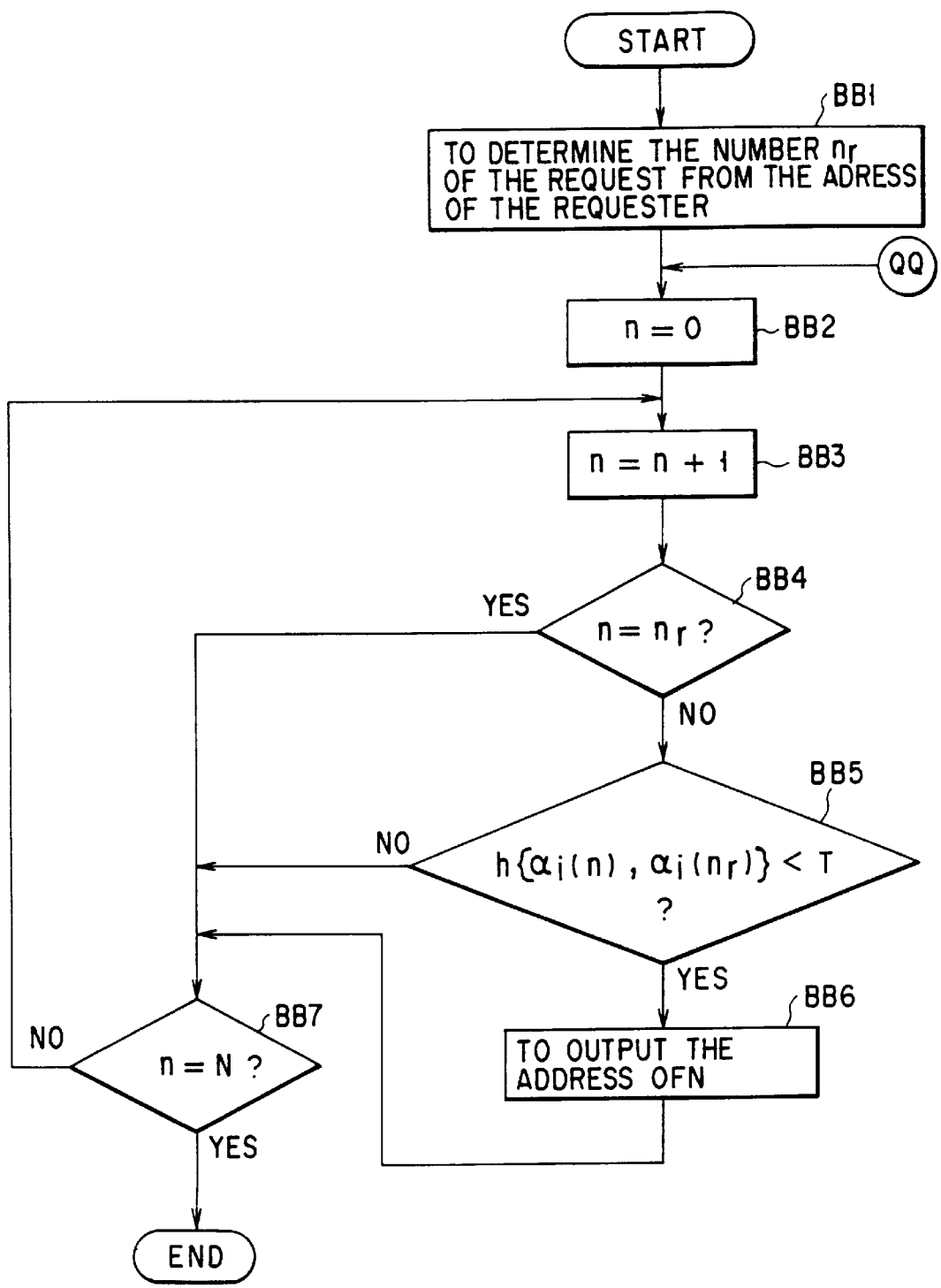
F I G. 66

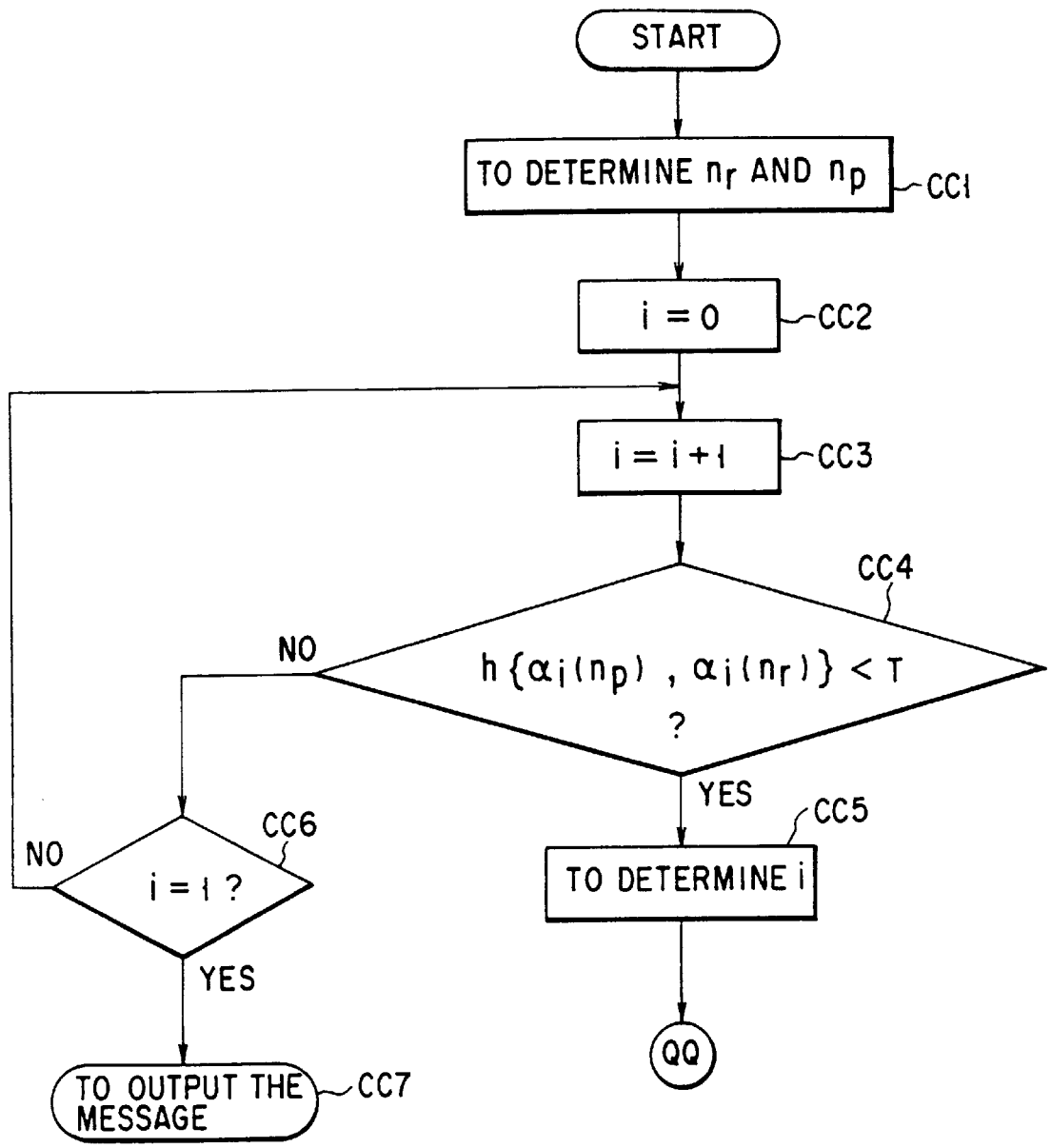
F I G. 67

COMMUNICATION NAVIGATION SYSTEM WHICH EASILY FINDS PERSON WHO IS INTERESTED IN THE SAME TOPIC

This application is a continuation of application Ser. No. 08/616,310, filed on Mar. 15, 1996, now abandoned.

BACKGROUND OF THE INVENTION

1. Field of the Invention

The present invention relates to a communication method and its system which can be favorably applied for the network in which plural client systems refer to informations kept by the server system via the network.

2. Description of the Related Art

Recently, the computer system has come into wide use and the communication technology has been rapidly developed, thus informations can be obtained through the network system. And, for example, WWW (World wide Web) and the like exist as the ones to play a big role in the prevalence of such network systems.

On the other hand, as a communication tool between person and person, applications such as telephone, electronic mail, network talk, internet chat and the like are well known.

However, these network systems and communication tools stand alone with each other, and for example, the shift from the reference of informations by network systems to the communication by communication tools, and the shift from the communication by communication tools to the reference by network systems cannot have been made without intervals.

Namely, even if there are plural persons who refer to the same information on WWW (e.g. who have the same values), it has been impossible that these persons who utilize these informations shift without intervals to the communication by means of the communication tools.

On the other hand, as a well known utility for the network communication, there can be mentioned "Habitat". "Habitat" is a system for providing a two-dimensional common space (map) to users, and is composed of a graphics display device on the user's terminal (PC) and a host group LAN-connected at the center station. The user who logs on the host is controlled as a task in the host, and the communication between users who share the region on the map is realized by the communication in the host or between the host of the center station, and the communication content is transferred to the user's terminal.

"Mosaic" is also well known as the network utility having the function of network navigation. "Mosaic" is a system to present the (basically) static data put on the network as a hyper text. This system is composed of a server called as httpd on the data server machine and a client such as Mosaic, chimera, or the like. The client accesses the server to interpret the text described in the html specification and to obtain the necessary data. The server transfers the data requested by the client, and if necessary at this time, checks the right to access to the data. The client presents the data transferred from the server (group) to the user according to the attribute thereof. Moreover, the client performs the data access to the server according to the instruction of the user (click of the hyper text).

As described above, conventionally, the network system and the communication tool exist as the one mutually independent, therefore it has been impossible, for example, that persons who refer to the same information on the optional server in the network system shift without intervals to the communication by means of the communication tool.

Furthermore, the kerf for presenting the network resources in the "Habitat" system is restricted to the two dimensional map, therefore it lacks the ability to present the network resources from various points of view. For example, the mobile operation thereof in response to the users' need, such as to present only users whose terminal is in the close location area on the map, or to switch the display from the two-dimensional map to the display by organization in which the user belongs. Furthermore, since "Habitat" is centrally controlled in the center, it is easy to maintain the adjustability of the common data, but on the contrary, the processing capacity of the center provides the size of the user. Accordingly, in order to construct a system of a quite large size, a vast sum of cost will be necessary. In the case of "Mosaic" system, the form to present the network resources is also restricted to the hyper text. In this system, the cost to set the server is quite low. However, the navigation function of the hyper text is static. Namely, it is not suited for the navigation for the data whose contents and locations change on the real-time basis.

The primary object of the present invention, therefore, is to provide a communication method and its system which makes it possible to properly perform the communication between users who are referring to informations kept in the same server system without using the server system.

Another object of the present invention is to provide a communication method and its system which is makes it possible to present the network resources changing on the real-time basis from various points of view, without applying excessive load to the center, and to switch the viewpoints optionally according to respective users' convenience.

SUMMARY OF THE INVENTION

The system of the primary object of the present invention has the following structure. Namely, it is characterized in that in a network system in which plural client systems refer to the informations kept by the server system via a network, a personal information control means which controls personal informations of the person who handles the client system which is referring to the informations is provided in the server system, and a personal information display means which displays the personal information controlled by the personal information control means in a list on the display screen as choices, and a communication channel-establishing means for establishing the communication channel with the client system corresponding to the choices selected and instructed when the selection and instruction are made on the screen are provided in the client system, and the communication between users who are referring to the informations kept by the same server system is properly performed without using the server system.

According to the present invention, when there are plural client systems which refer to the informations kept by the server system, the server system controls the personal information of the person who handles the client system, that is, the user of the information, or the reference to the personal information. This personal information comprises, for example, the photographic data, telephone number, electronic mail address and the like of the user, and when the client system accesses the server system, the client system may send its own personal information properly, or all the pre-registered personal informations of users may be controlled, and the information regarding the presence or absence of the access may be separately controlled.

On the other hand, the client system side displays in a list, for example, a photographic data among the personal informations kept by this server system on the display screen as choices. Thereby, the person who handles the client system is able to know the person who handles the other client system who is simultaneously referring to the information which is now referred by himself by the list display.

Here, when the person who handles the client system wants to communicate with the person who handles the other client system among other persons who handle client systems displayed in a list, by means of the communication tool, he selects the choices corresponding to the person who handles the client system via the input device such as a mouse, a keyboard or the like.

When this selection is done, the communication channel such as a telephone number or an electronic mail is established based on the personal information.

Thereby, the shift to the communication between users who are referring to the information kept by the same server system by means of a communication tool can be made smoothly, and its operability can be rapidly improved.

Furthermore, the present invention is characterized in that the personal information display means includes a means for setting the choice showing the person who handles the client system to the specific display form showing that the communication is now being done, when the communication channel is established between the client systems.

According to the present invention, when a communication is established between any users among users, for example, who are referring to the same information, it is expressed on the screen, thereby the communication status can be always grasped.

Furthermore, the present invention is characterized in that it includes a common file system for controlling the information from the client computer in relation to the information kept by the server system as a common information.

According to the present invention, not only the establishment of communications between optional users by means of the communication tool, but also the users' informations are accumulated as a common information, thereby it can provide a place for communication in a more natural form.

Furthermore, the present invention is characterized in that it includes a formation means to form the reproduction of its own system in the server system as a new server system, in response to the request from the client system.

According to the present invention, for example, in the place for communication which is formed by persons who refer to the same informations kept by a server system, it is made possible for a part of persons among the referrers of these informations to form a new place for communication, thereby it can provide a place for communication in a more natural form.

Furthermore, the present invention is characterized in that it includes a means for integrating at least two server systems among plural server systems formed by the formation means into one server system in the server system, in response to the request from the client system.

According to the present invention, the plural places for communication derived as described above can be easily integrated, thereby the easiness to use it can be rapidly improved.

Furthermore, the present invention is characterized in that in a network system in which plural client systems refer to the informations kept by the server via a network, there are provided a means for requesting to establish the communication channel to the other client system and sending a reference information showing that the information of which server system is now referred, and a means for starting the reference of the information kept by the server system shown by the reference information, when the communication channel has been established and the reference information has been sent by the means, to start the reference of informations kept by the server system by the establishment of the communication channel between client systems.

According to the present invention, when a client system which refers to the information of any server system starts the communication with other client system, it sends a reference information showing the information of which server system it is now referring to, and the client system of the other side can shift to refer to the same information immediately by only starting the communication to perform the access to the server system based on this reference information.

Furthermore, the system of the secondary object of the present invention has the following structure. Namely, it provides a communication system for providing a chance of communication between objects by using a center station and a terminal station, wherein the terminal station includes a registration means for registering the attribute of the object in the center station, a call relation candidate-requesting means for requesting call relation candidate objects to the center station, a call relation candidate-storing means for storing the entry of the call relation candidate objects informed by the center station, and a call relation control means for concluding or canceling the call relation with the call relation candidates stored in the call relation candidate-storing means, and the center station includes a holding means for holding the attribute of the object registered by the registration means of the terminal station, and the entry of the object, a call relation candidate-determining means for determining the call relation candidate object relating to respective objects based on the entry of the object or the attribute of the object, and a call relation candidate-informing means for informing the entry of the call relation candidate object relating to the object to the object in response to the request from the object.

According to the above-mentioned inventions, the action thereof is as follows. Namely, an object has a key information-registration means and informs the attribute of the object to the center station. Attributes of respective objects are stored in the key information-holding means in the center station. Thereby, it becomes possible for the object to register the attribute which changes on the real-time basis in the center station. The call relation candidate-requesting means of the object requests the call relation candidate object to the center station, according to need. At this time, it is also possible to specify some attributes of the call relation candidate. The call relation candidate-determining means of the center station receives this request, determines the call relation candidate regarding the object, and delivers it to the call relation candidate-informing means. The call relation candidate-informing means informs the entry of the call relation candidate to the object. At this time, the attribute of the call relation candidate object registered in the key information-holding means may be informed. The entry of the call relation candidate object informed from the center station is stored in the call relation candidate-storing means of the object. When the attribute of the call relation candidate object is informed from the call relation candidate-informing means, it is also stored therein. The call relation control means of the object refers to the call relation candidate stored in the call relation candidate-storing means and its entry to control the call relation with the call relation candidate. The call relation control means may select whether the call relation with the candidate is concluded (canceled) or not, based on the instruction of the user, before concluding (canceling) the call relation. When the attribute of the call relation candidate is stored in the call relation candidate-storing means, the attribute thereof can become the decision material of this selection.

BRIEF DESCRIPTION OF THE DRAWINGS

FIG. 9 is a flow chart for illustrating the operation procedure when communication is started between communication terminal devices of said embodiment;

FIG. 12 is a view showing the display image of the communication system of the fourth embodiment of the present invention;

FIG. 13 is a view showing a schematic structure of the communication system of said embodiment;

FIG. 26 is a view showing the data base example of the object;

FIG. 31 is a view showing the structure of the salesclerk object and the shop object;

FIG. 34 is a view showing an example of advertising data;

FIG. 35 is s view showing an example of customer data;

FIG. 37 is a view showing the relation between network entry and the attribute;

FIG. 38 is a view showing the network resources;

FIG. 39 is a view showing the whole structure of the system;

FIG. 40 is a view showing an example of virtual office models in FIG. 39;

FIG. 41 is a view showing the service data in FIG. 39;

FIG. 42 is a processing flow chart of the attendance control section in FIG. 39;

FIGS. 46A and 46B are views showing a data example of the positional data base in FIG. 39;

FIGS. 54A and 54B are processing flow charts of the access processing to the adjacent user in FIG. 48;

FIG. 64 is a block diagram of the communication system according to the other embodiment;

FIG. 65 is a flow chart showing the key information;

FIG. 66 is a flow chart showing the algorithm for finding a nearby terminal to its own terminal; and FIG. 67 is a flow chart showing the algorithm for finding a nearby terminal to its own terminal.

DETAILED DESCRIPTION OF THE PREFERRED EMBODIMENTS

Embodiments of the present invention will now be described with reference to the accompanying drawings.
(1st Embodiment)

Figure 1:
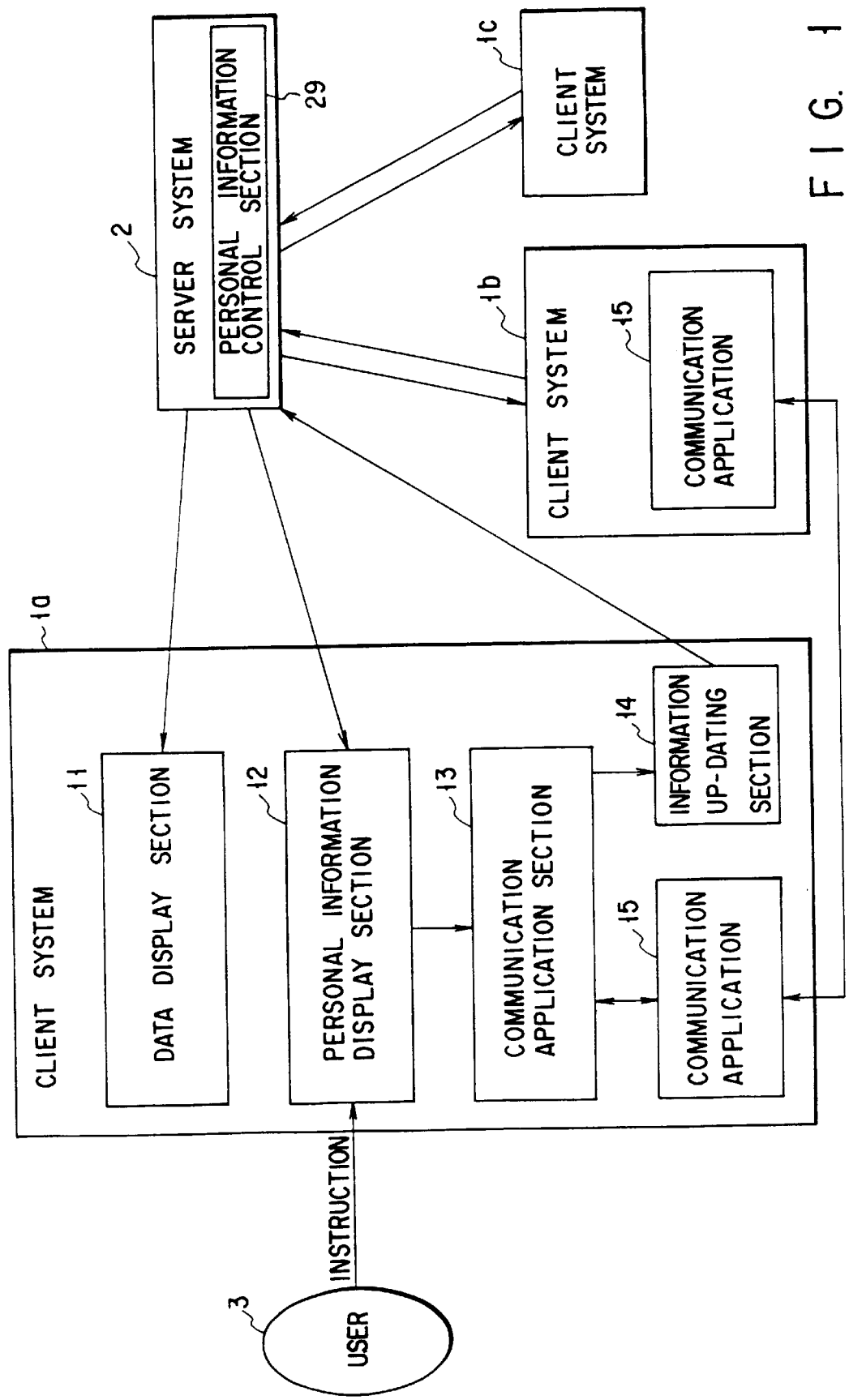
FIG. 1 is a view showing a schematic structure of the communication system of the first embodiment of the present invention.

FIG. 1 is a view showing the schematic structure of the communication system of the first embodiment.

The communication system according to said embodiment is assuming that it is constructed on WWW. Under this assumption, user 3 refers to various informations kept by server system 2 by operating client system 1a. Furthermore, other users operate client system 1b and client system 1c, respectively, to refer to various informations kept by server system 2.

If it is assumed that user 3 starts to obtain access to server system 2 by operating client system 1a, the information (home page) kept by server system 2 is displayed on the display screen by the data display section 11, and the personal information (for example, a photographic data) of the person to handle the client system who is now referring to the same information, kept in the personal information control section 29 is also displayed as choices (icon) by the personal information display section 12. FIG. 12 shows the display image at this time.

Figure 2:
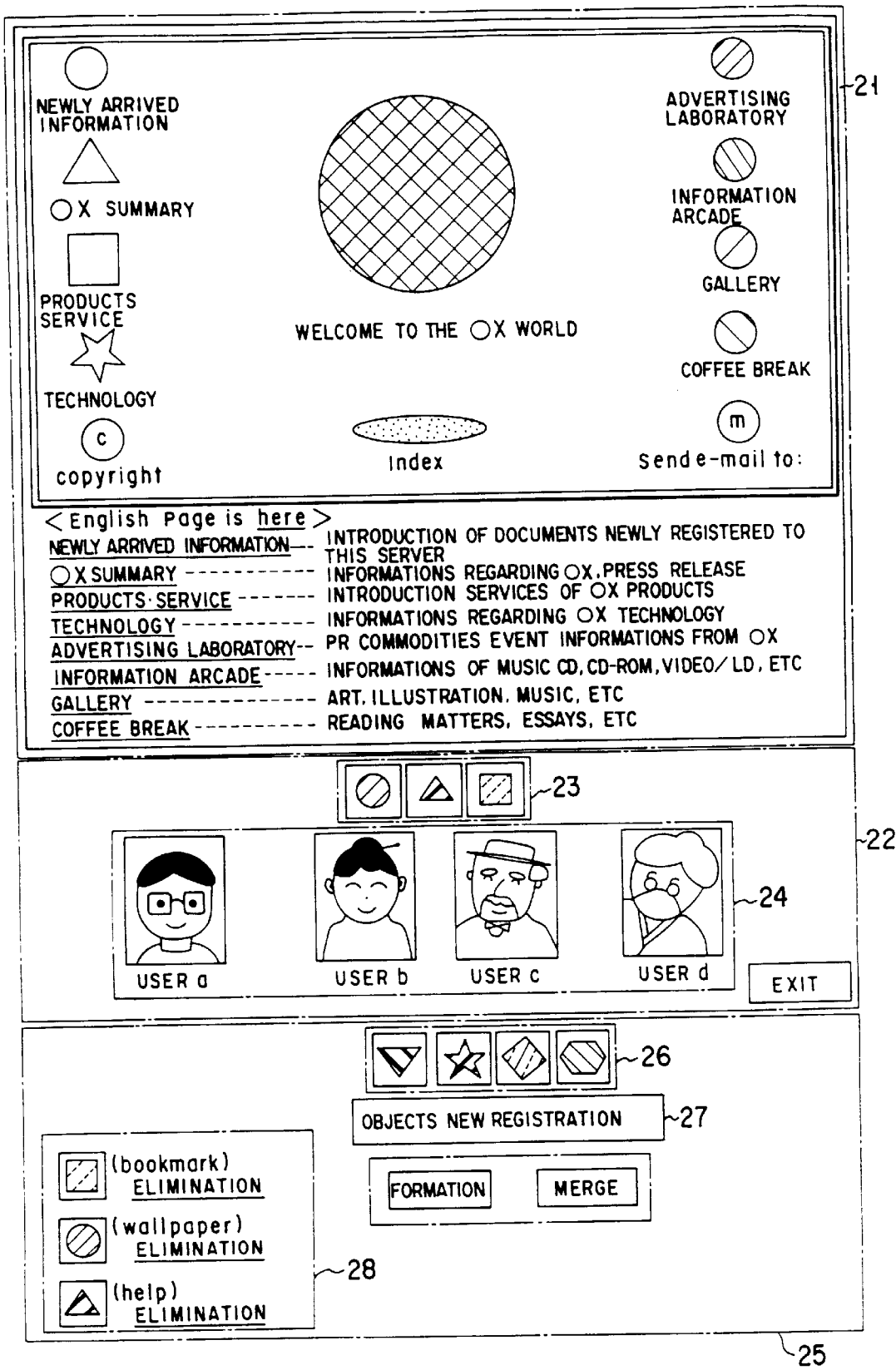
FIG. 2 is a view showing the display image of said embodiment.

As shown in FIG. 2, the home page of server system 2 is displayed in section 21 by the data display section 11. The informations kept by this server system 2 is composed of a hyper text structure so that users can efficiently obtain access to the desired respective informations. Incidentally, this hyper text structure means a data structure in which texts, images, voices, animations, and the like are systematically connected so that various topics can be retrieved regardless of the order thereof, thereby users can proceed efficient data retrieval by designating sequentially the informations related to the indicated information.

Furthermore, section 22 is a place displayed by the personal information display section 12, and in section 24 thereof, personal information of the person who handles each client system and who is now referring to the same information is displayed as an icon. And the personal information display section 12 displays as an icon the personal processing choices such as telephone or transmission of an electronic mail to each user, reference to the personal home page and the like.

Namely, user 3 can know other users who refer to the same information, at the time when he/she starts to refer to informations of server system 2. In addition, in the display of this personal information, his/her own personal information is displayed in a predetermined position, and the person who handles client system 1a is designated as user a in FIG. 2.

Here, the case where user 3 communicates with the other user (user b in FIG. 2) by means of the communication tool.

At this time, user 3 designates the icon of user b shown in 24 of FIG. 2 by the input device such as a mouse or the like, and also designates the icon of telephone shown in 23 of FIG. 2 (assuming that the communication between users is obtained by a telephone).

These instructions are delivered to the personal information display section 12, and the personal information display section which has received these instructions informs them to the communication application-executing section 13. And the communication application-executing section 13 which has received this information activates the communication application 15 which makes a telephone call to the designated person. In addition, when plural users are designated at this time, telephone calls to all designated users are to be made.

And the activation of this communication application 15 is informed to the information-updating section 14 by the communication application-executing section 13, and the information-updating section 14 which has received this information informs this effect as well as the client systems of the sender of telephone call and the receiver of telephone call to server system 2.

When server system 2 receives this information from the information-updating section 14, it informs this effect to the personal information display sections 12 of all client systems which are now referring to the home page. And the personal information display sections 12 which have received this information set up the icon corresponding to users who are in conversation to the specific display form showing that their line is busy. This display may be such that icons corresponding to users who are in conversation are connected with a line, with the display form of the icon remaining as it is.

Thereby, the shift to the communication between users who are now referring to the information kept by the same server system by means of a communication tool can be performed smoothly, and all users can grasp the situation of communication.

Now, the operation procedure of said embodiment will be described with reference to FIGS. 3 to 5.

Figure 3:
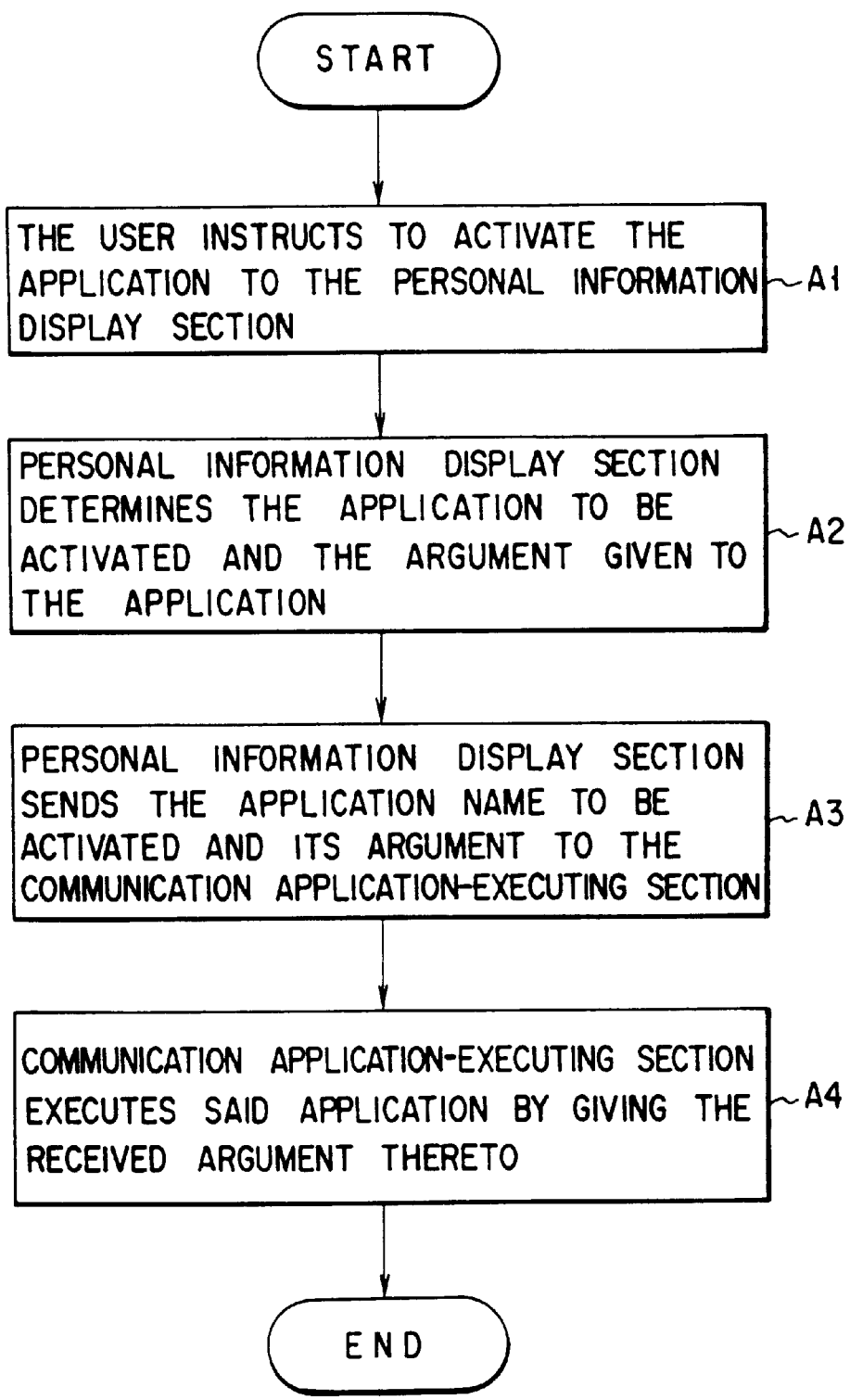
FIG. 3 is a flow chart for illustrating the operation procedure when the user of said embodiment starts communication with other users.

FIG. 3 is a flow chart for illustrating the operation procedure when the user starts communication with other users. Here, it is assumed that the user selects a "telephone" as the communication means.

When starting the communication with other users, user 3 designates icon 24 showing other users and icon 23 showing "telephone" by the input device such as a mouse or the like, to instruct to activate the communication application to the personal information display section 12 (Step A1 of FIG. 3).

Then, the personal information display section 12 determines the argument given to the communication application (Step A2 of FIG. 3), and transmits the determined communication application name and argument to the communication application-executing section 13 (Step A3 of FIG. 3).

And the communication application-executing section 13 which has received these communication application name and argument gives the argument to execute the communication application (Step A4 of FIG. 3).

Thereby, shift to the communication (telephone) with other users with whom the user wants to communicate can be made smoothly.

Figure 4:
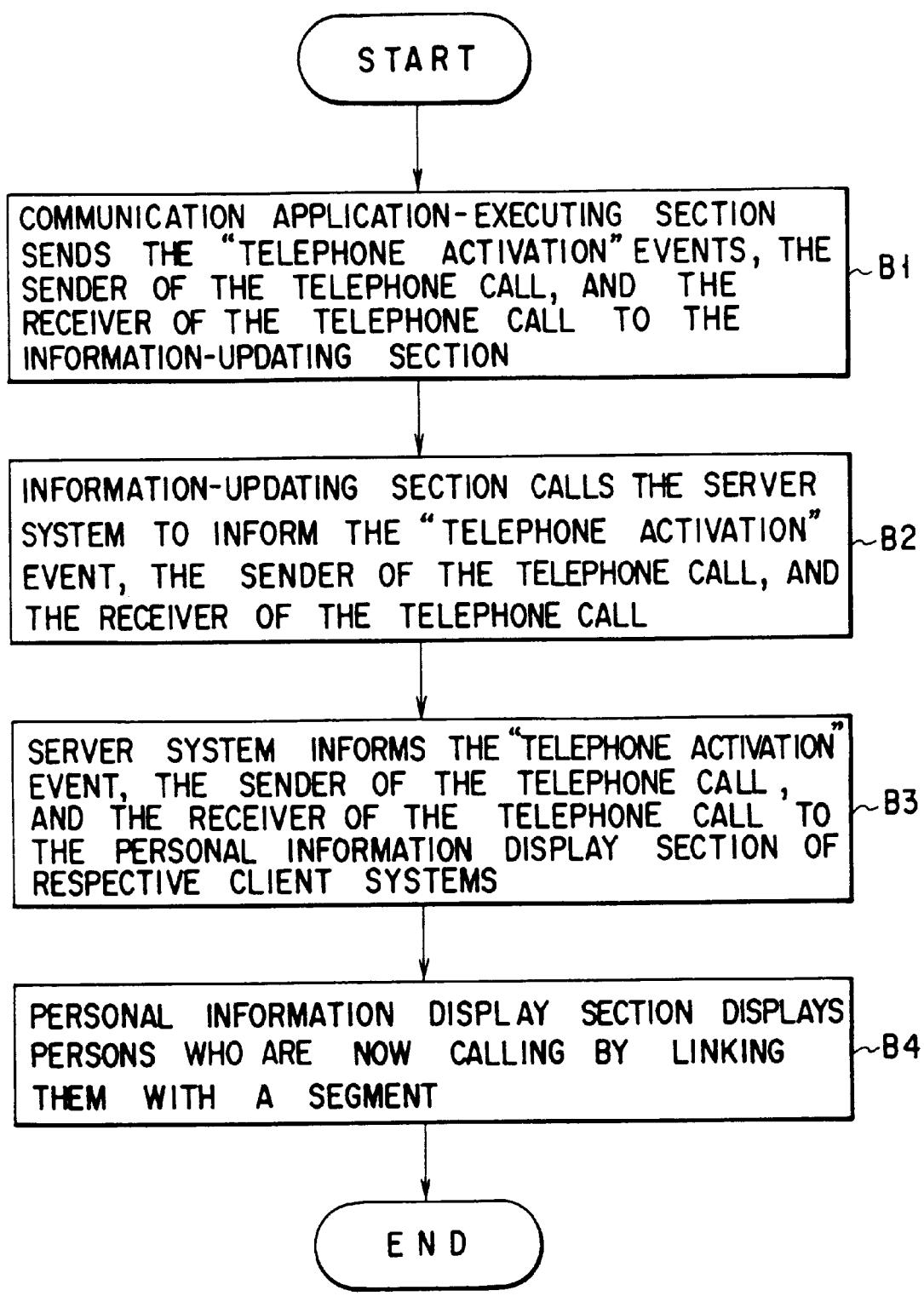
FIG. 4 is a flow chart for illustrating the operation procedure when the communication application of said embodiment is activated.

FIG. 4 is a flow chart for illustrating the operation procedure when the communication application is activated.

When the communication application is activated, the communication application-executing section 13 delivers this effect and the informations relating thereto (here, the event of "activation of telephone", and the information of the sender of telephone call and the receiver of telephone call) to the information-updating section 14 (Step B1 of FIG. 4). And the information-updating section 14 which has received this information transmits the event of "activation of telephone" and the information of the sender of telephone call and the receiver of telephone call to server computer 2 (Step B2 of FIG. 4).

The server system 2 which has received this information from this information-updating section 14 informs this effect to the personal information display sections 12 of all client systems which are now referring to the home page (Step B3 of FIG. 4). And, the personal information display sections 12 which has received this information displays the effect that the line of users who are in conversation is now busy by linking icons corresponding to these users with a segment mutually (Step B4 of FIG. 4).

Figure 5:
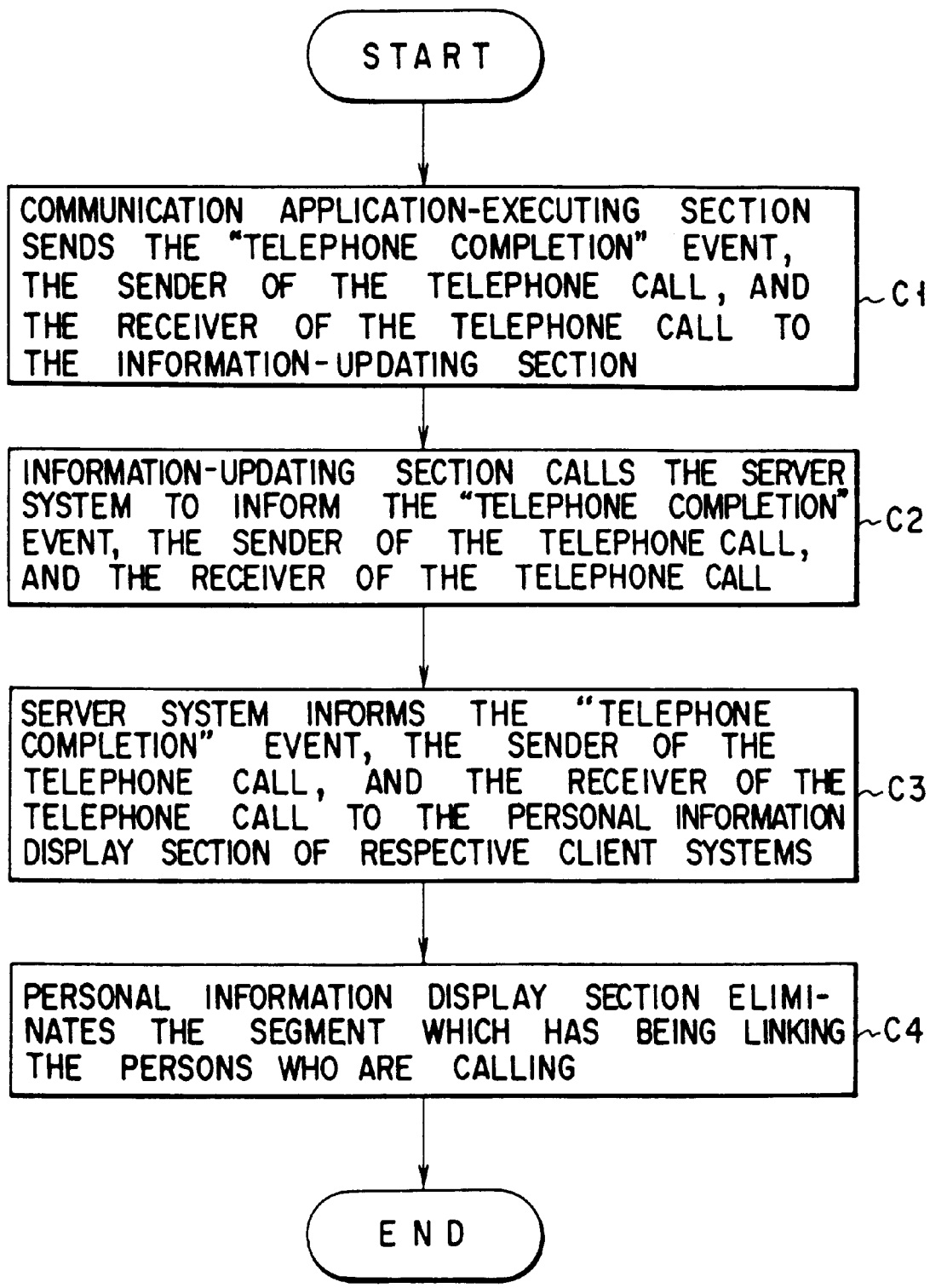
FIG. 5 is a flow chart for illustrating the operation procedure when the communication application of said embodiment is completed.

FIG. 5 is a flow chart for illustrating the operation procedure when the communication application is completed.

When the communication application has been completed, the communication application-executing section 13 delivers this effect and the information relating thereto (here, the event of "completion of telephone", and the information of the sender of telephone call and the receiver of telephone call) to the information-updating section 14 (Step C1 of FIG. 5). And the information-updating section 14 which has received this information transmits the event of "termination of telephone" and the information of the sender of telephone call and the receiver of telephone call to server computer 2 (Step C2 of FIG. 5).

The server system 2 which has received this information from this information-updating section 14 informs this effect to the personal information display sections 12 of all client systems which are now referring to the home page (Step C3 of FIG. 5). And, the personal information display sections 12 which has received this information displays the effect that the line is free by eliminating the segment which has being linked to icons corresponding to users who are in conversation (Step C4 of FIG. 5).

Thereby, each user can always grasp the situation of communication by telephones, electronic mails or the like.

(2nd Embodiment)

Figure 6:
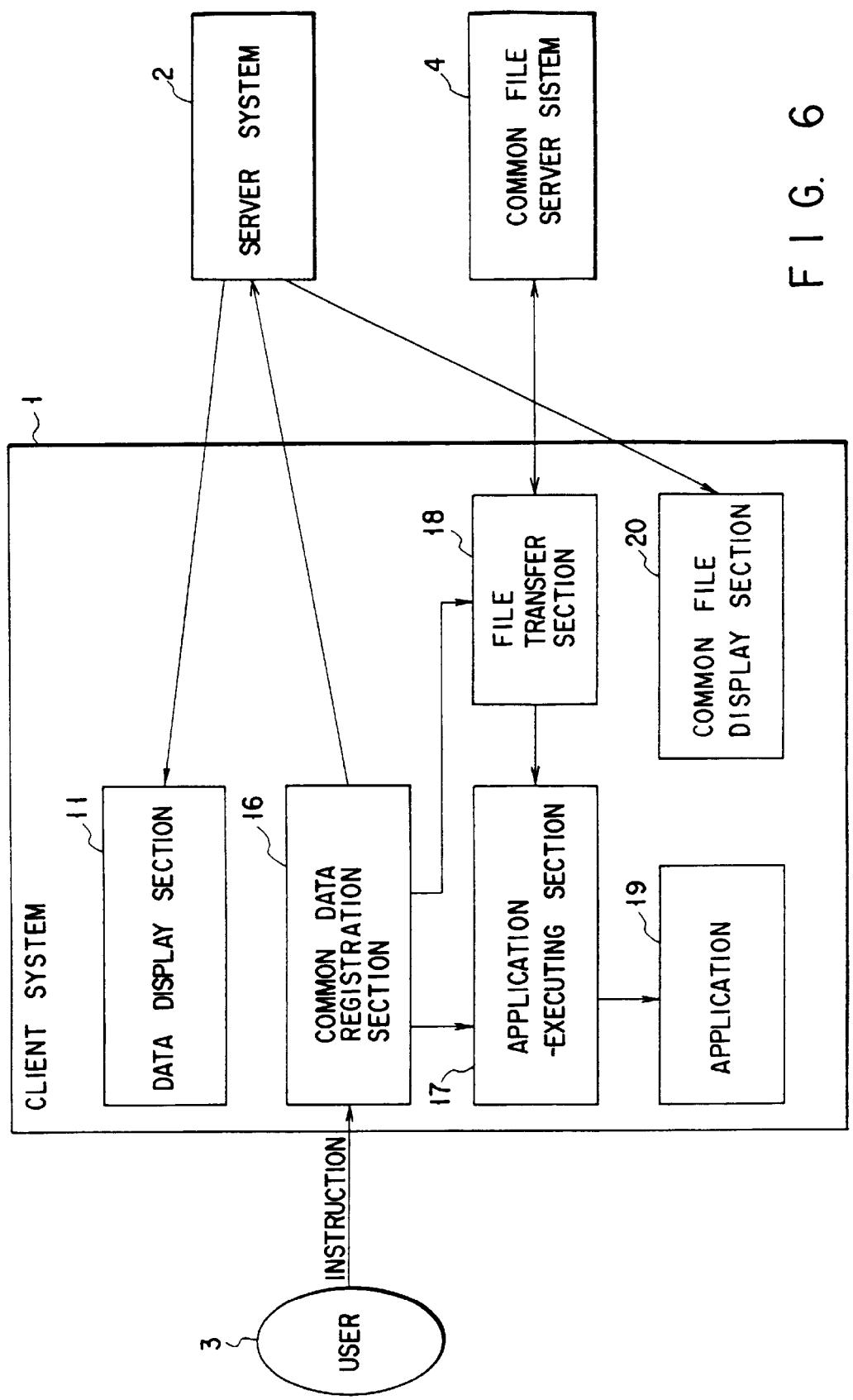
FIG. 6 is a view showing a schematic structure of the communication system of the first embodiment of the present invention.

FIG. 6 is a view showing the schematic structure of the communication system of the second embodiment.

The communication system according to said embodiment is provided with a common data registration section 16 at the side of the client system 1, an application-executing section 17, a file transfer section 18 and a common file display section 20, in addition to the structure of the communication system shown in the first embodiment, and further provided with a common file server system 4.

The common data registration section 16 displays various icons in section 25 of FIG. 2. Section 26 is used when a new common data is newly formed, and shows a highly functional editor, a table computing software, a simple-type editor and a bit map editing tool from the left side. Furthermore, section 27 is an icon for registering the already existing local data as the common data. And thus formed and registered common data is formed in an icon to be displayed in section 28.

Figure 7:
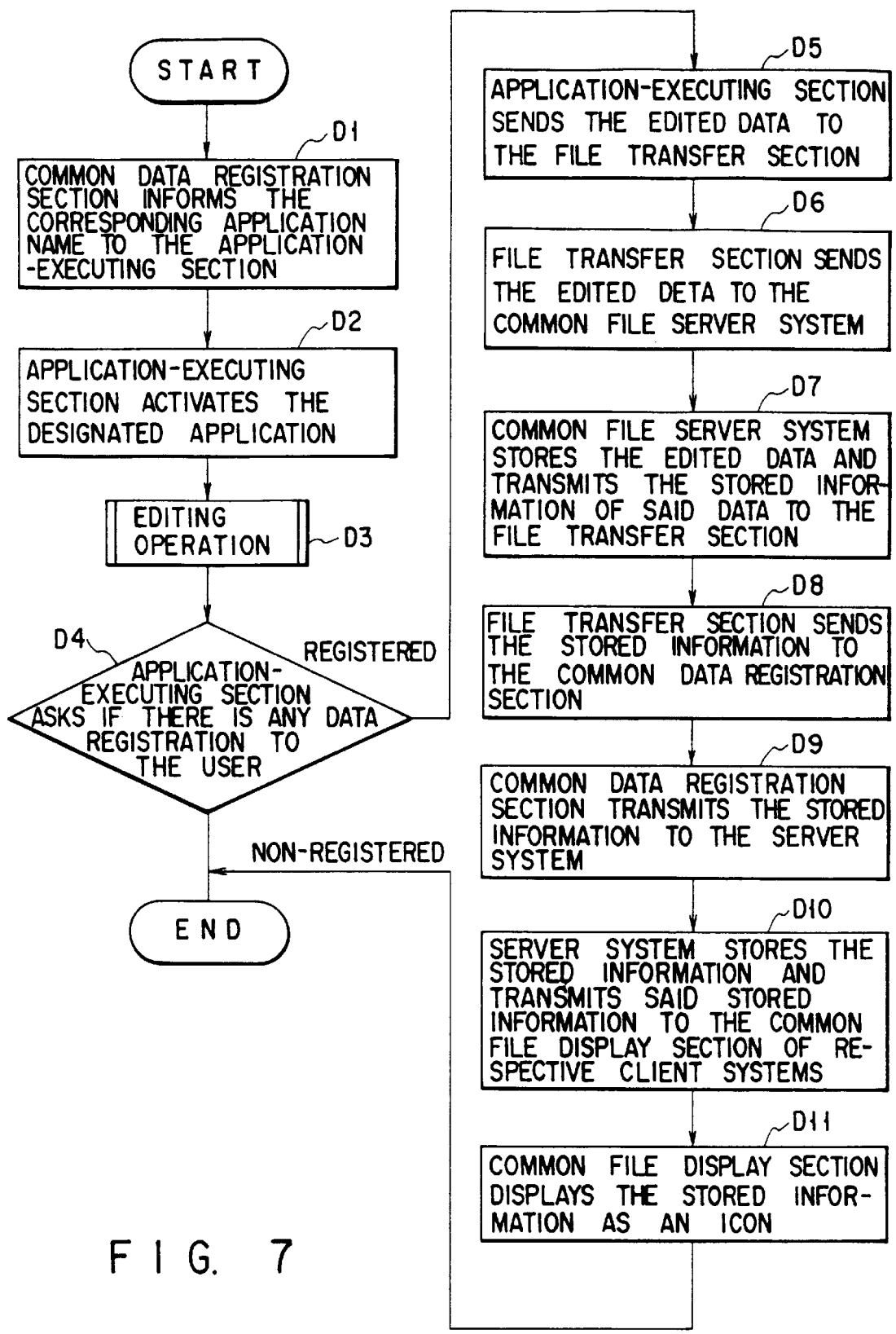
FIG. 7 is a flow chart for illustrating the operation procedure of the second embodiment.

FIG. 7 is a flow chart for illustrating the operation procedure of the second embodiment.

When it is assumed that user 3 designates any of icons in section 26 of FIG. 2, the common data registration section 16 informs this effect to the application-executing section 17 (Step D1 of FIG. 7). And the application-executing section 17 which has received this information activates the corresponding application 9 (Step D2 of FIG. 7).

Here, when user 3 completes the editing operation by application 9 (Step D3 of FIG. 7), the application-executing section 17 asks the user if the edited data is to be registered or not (Step D4 of FIG. 7). When it is to be registered, the application-executing section 17 transmits the edited data to the file transfer section 18 (Step D5 of FIG. 7), and the file transfer section 18 transfers this edited data to the common file server system 4 (Step D6 of FIG. 7).

The common file server system 4 stores this edited data, and the stored information of this edited data (file name, address and the like) are sent back to the file transfer section 18 (Step D7 of FIG. 7).

The file transfer section 18 which has received this stored information delivers this stored information to the common data registration section 16 (Step D8 of FIG. 7). And, the common data registration section 16 transmits the stored information of this common data to server system 2 (Step D9 of FIG. 7).

Server system 2 which has received the stored information of the common data stores this stored information, and transmits this stored information to the common file display section 20 of all client systems which are referring to the home page (Step D10 of FIG. 7). And the common file display section 20 which has received this stored information displays the stored information of this common file as an icon on the screen (Step D11 of FIG. 7).

Thereby, informations of users are accumulated as the common data, and a place for communication can be provided in a more natural form.

(3rd Embodiment)

Figure 8:
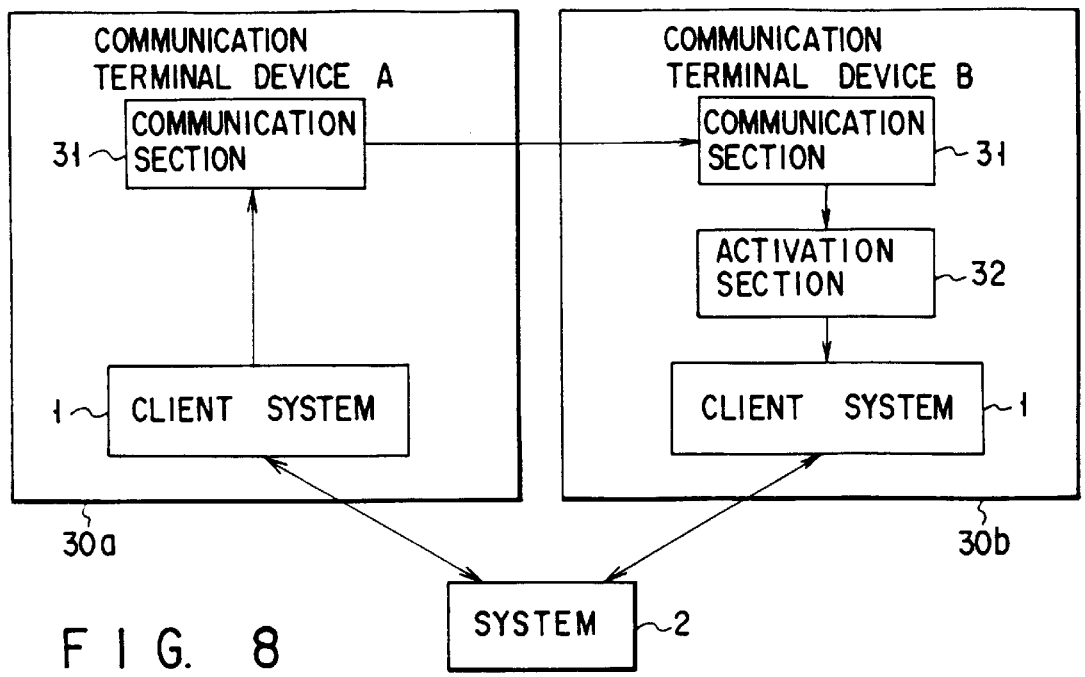
FIG. 8 is a view showing a schematic structure of the communication terminal device applying the communication system of the present invention.

FIG. 8 is a view showing the schematic structure of the communication terminal device applying the communication system described above.

As shown in FIG. 8, client system 1 of the communication terminal device 30a has already been connected to server system 2, therefore, here, when the communication is started from the communication terminal device 30a to the communication terminal device 30b, the example to connect the client system 1 of the communication terminal device 30b to said server system 2 simultaneously with the initiation of this communication will be described.

FIG. 9 is a flow chart for illustrating the operation procedure at this time.

First, the communication section 31 of the communication terminal device 30a receives the reference information of server system 2 from client system 1 (Step E1 of FIG. 9). And the communication section 31 communicates with the communication section 31 of the communication terminal device 30b (Step E2 of FIG. 9), as well as transmits the reference information of server system 2 received from client system 1 (Step E3 of FIG. 9).

The communication section 31 of the communication terminal device 30b which has received the reference information of this server system 2 delivers this reference information to the activation section 32 (Step E4 of FIG. 9), and the activation section 32 which has received this reference information activates the client system 1, as well as delivers the reference information to the activated client system 1 (Step E5 of FIG. 9).

The client system 1 of the communication terminal device 30b performs the connection to server system 2 based on this reference information.

Thereby, users can connect the client system of the other party to the same server system only by starting the communication by means of the communication terminal device, thus users can refer to the same home page immediately.

Figure 10:
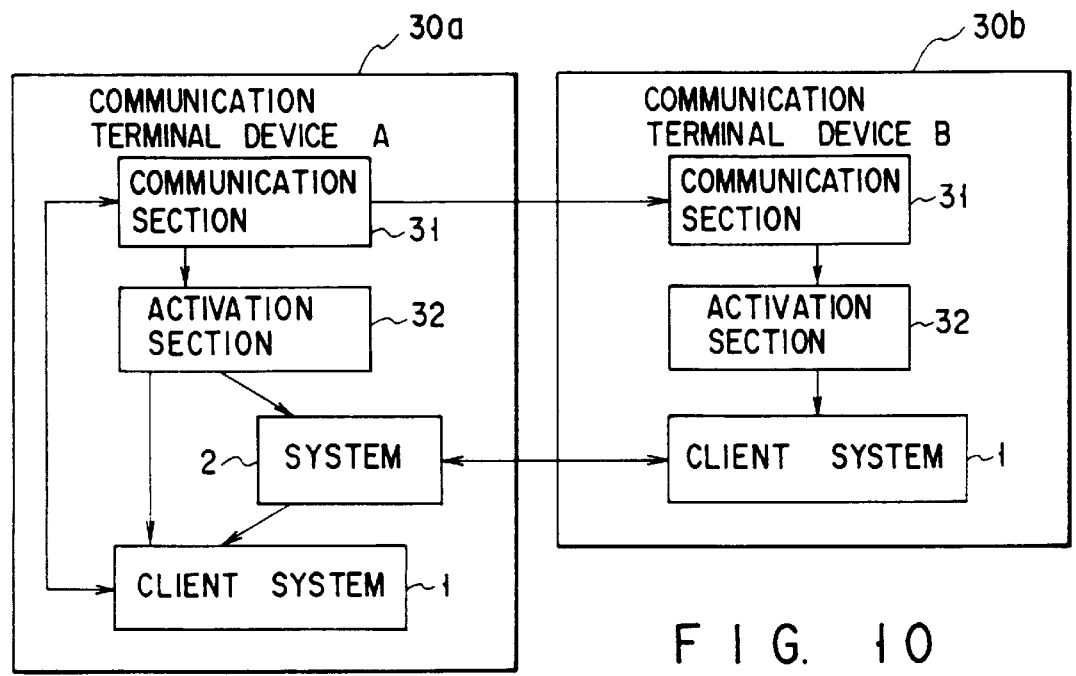
FIG. 10 is a view showing a schematic structure of the communication terminal device applying the communication system of the present invention.

Next, referring to FIG. 10 and FIG. 11, an example in which before communication is started from the communication terminal device 30a to the communication terminal device 30b, the communication terminal device 30a side activates newly server system 2 and client system 1 which refers to the information kept by said server system to connect the client system 1 on the communication terminal device 30b side to the server system 2 will be described.

Figure 11:
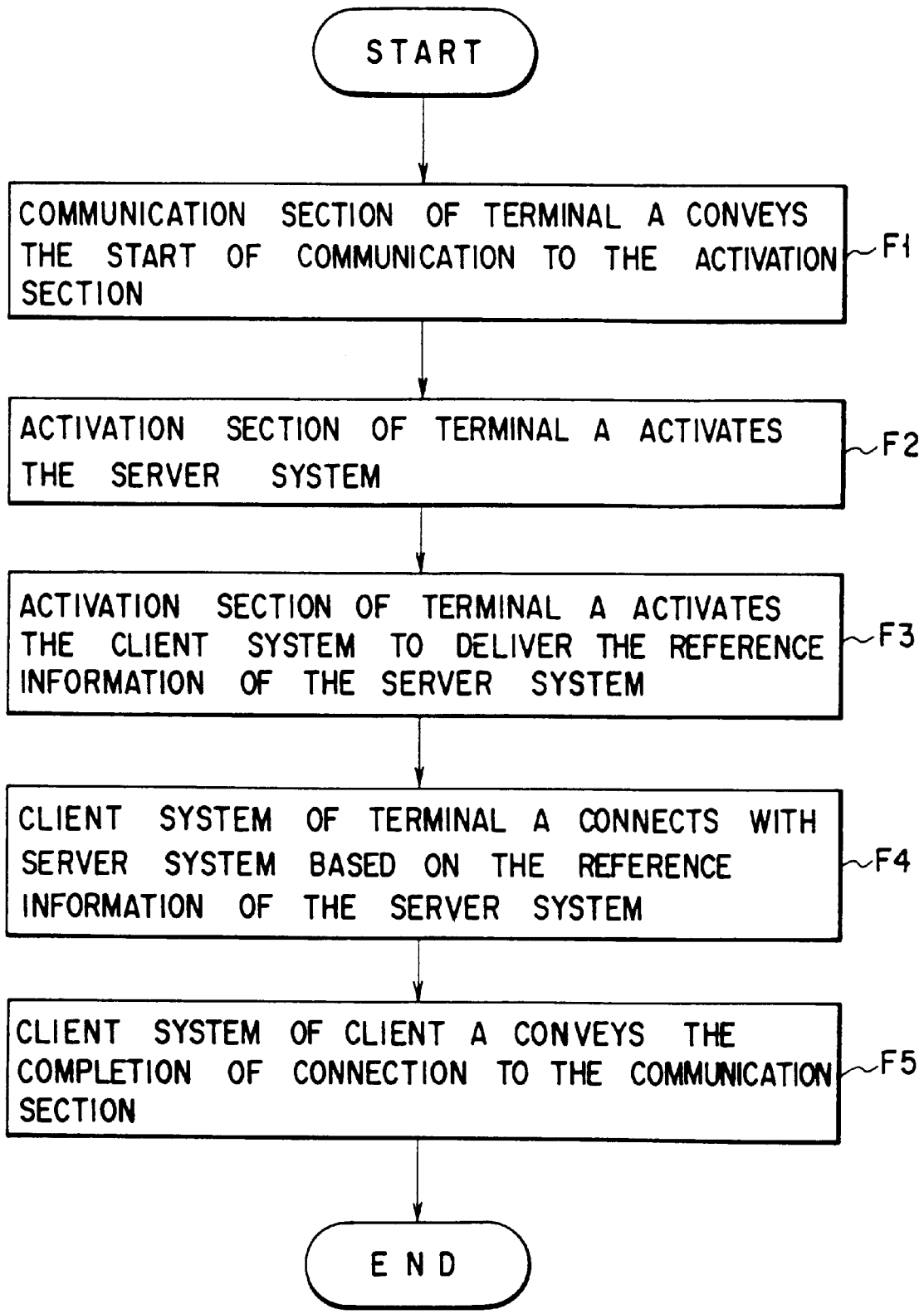
FIG. 11 is a flow chart for illustrating the operation procedure when communication is started between communication terminal devices of said embodiment.

FIG. 11 is a flow chart for illustrating the operation procedure at this time.

First, the communication section 31 of the communication terminal device 30a informs the start of communication to the activation section 32 (Step F1 of FIG. 11). The activation section 32 which has received this information activates first the server system 2 (Step F2 of FIG. 11), then activates the client system 1, as well as delivers the reference information to the server system 2 to the activated client system 1 (Step F3 of FIG. 11). And the client system 1 which has received this reference information performs connection to the server system 2 based on this reference information (Step F4 of FIG. 11), and at the time of completion of connection, informs this effect to the communication section 31 (Step F5 of FIG. 11). Thereafter, communication to the communication terminal device 30b of the other party is performed according to the procedure shown in FIG. 9, and connection to this newly activated server system 2 is performed on the communication terminal device 30b side.

Thereby, activation of the server system and the client system is made possible simultaneously with the start of communication by means of the communication terminal device, and as in the case described above, the client system of the other party can be connected to the same server system, thus users can refer to the same home page immediately.

(4th Embodiment)

Before explaining this embodiment, first consideration is made to the case in which person-to-person communication is performed by conversation in the physical world (namely, without using media such as telephone or the like). In this case, we assume the following matters shown below as a tacit understanding.

(1) Common theme, or topics exists.

(2) Simultaneous communication by means of language or non-language (gesture, body contact and the like) is possible.

(3) Transfer of information using media such as a paper or the like is possible. This is mainly used as an auxiliary means of simultaneous communication.

It is easily understood that if one assumption is lacked, smooth communication is hindered. Actually, (1) is an assumption for realizing conversation. If simultaneous communication is not possible, "conversation" in the usual meaning cannot be realized. Moreover, without the aid of writing materials (or the one similar thereto), it is difficult to communicate more or less complicated contents to other persons.

On the contrary, when the above-mentioned three assumptions are satisfied, people will not feel any difficulty to make usual conversation. When the above-mentioned three conditions are satisfied as given conditions, the conversation is hereinafter referred to as "complete communication". Furthermore, a field for the complete communication, that is, the situation where the above-mentioned conditions are satisfied is hereinafter referred to as "complete communication field", or as only "communication field".

In this communication field, accumulation of information to the field is caused by (3) (no matter how it is temporary). This is referred to as the "accumulativeness" of the communication field. Furthermore, particularly when the communication field is composed of three members or more, the communication field has a notable nature. When plural persons are in conversation, for example, such events that talking with only the nearby person or handing a message to a particular person are caused. Namely, the communication field contains "sub communication fields" which are smaller communication field (or at least the possibility thereof). In this meaning, the communication field relating to persons of three or more is "complex". In addition, in the complex communication field, the existence of the sub communication field gives some influence to the members who do not belong thereto or topics of the field. Here, this phenomenon is understood that "the complex communication field has a "complex effect"".

Furthermore, the communication field is not static. In the vigorous conversation, (though a big theme is always kept carefully), the present topics "sub theme" is constantly developing. Thus, the theme of conversation is often multi layer-type, but the development of the theme may bring a dynamic change to the communication field. Namely, a phenomenon called as "divergence" of the communication field is caused. The sub communication field have sometimes sub theme. Such phenomena as it is divided into discussions by sub theme, or the sub communication field becomes independent from the original communication field are often observed. These phenomena are the "divergence" of the communication field. In addition, in the former case, the diverged communication field is assumed to "merge" afterwards.

This divergence and mergence of the communication field are important phenomena. The divergence and mergence not only bring large benefits (no matter how they are discoverable or purpose-oriented). But also the activation and development of communication are secured by the divergence and mergence (or even by the possibility of formation of these phenomena). For example, assuming that the possibility of divergence and mergence are eliminated in the communication, it is obvious that the communication will have little freedom (therefore, perhaps become fruitless) for the members relating thereto. Therefore, considering the importance of divergence and mergence, the following conditions will be required in the communication field, in addition to the three conditions described above.

(4) Divergence to the sub theme and mergence of themes can be generated.

Hereinafter, the communication field satisfying this (4) is referred to as "communication field in the narrow sense". On the other hand, the case where (4) is not considered is referred to as "communication field in the wide sense".

Hereinbefore, the state of communication in the physical world has been considered by introducing a concept of "communication field". Therefore, next, this communication field will be applied to the communication in the network constructed by electronic media. First, the requirements of the above-mentioned communication field is replaced with a language of (electronic) network.

(1)' It may be such that common data open for the reference exist.

(2)' This may be as it is. Namely, simultaneous communication by means of multimedia (it is a matter of course that the larger the types of media, the better) is possible.

(3)' Common data base which is readable and writable exists. This data base has to be related to the reference data of (1)'.

When the system on the network provides the communication environment satisfying these three conditions, this system can be considered to be the one giving the "network communication field". Hereinafter, the network communication field may be referred to simply as "communication field".

(4)' In the network communication field in the wide sense satisfying said three conditions, a function to form a new communication field is provided. In addition, a function to merge plural communication field into one communication field is provided.

The communication field satisfying this (4)'s condition is referred to particularly as the (network) communication field in the narrow sense. On the other hand, the communication field which does not satisfy (4)' may be referred to as the communication field in the wide sense.

The reference data of (1)' functions as a theme in the communication field, or a source of topics. Therefore, in order to realize the simultaneous communication of (2)', the existence of the function to make "the people gathering" to the data reference recognize each other is set as a premise. Furthermore, the reference data, simultaneous communication, and GUI (Graphical User Interface) of common data base have to be displayed so as to understand that they are related to each other. With regard to (4)', it is necessary to provide a function that the communication field newly formed and the original communication field are referred to each other. In general, when the communication field is diverged, either branch knows that divergence is generated.

Under such background, the communication system of the present embodiment will be described with reference to FIGS. 12 to 14.

In FIG. 12, a screen of ?? according to the present embodiment is exemplified. The section of 21 in FIG. 12 is a reference data display section, that is, the usual WWW screen, and sections below this section 21 are for displays by the extension function.

First, people who gather to the data reference is displayed in the section of 22 in FIG. 12. In this section, mainly functions relating to the simultaneous communication are displayed. In the example shown in FIG. 12, photographs and names are displayed (Section 24 of FIG. 12). The icons above the photographs express, for example, "talk", "e-mail" and "reference to the home page" from the left side. When users click the image 24 of the displayed person after clicking either of these icons 24, the desired action (for example, telephone call) can be realized.

Below this simultaneous communication-related display section 22, common file-related section 25 is displayed. The icon 26 standing in a line first is for activating the PC application, and they show, for example, "highly functional word processor", "table computing tool", "simple-type word processor", and "image tool" from the left side in order. These icons 26 function as a kind of network launcher. In addition, when "object's new registration" button 27 is pushed, the file registration dialogue is displayed. And, the data displayed by icon 28 is a common file. These data are composed of, for example, AVI file, and by clicking this, animation with voices is reproduced.

Furthermore, icon 30 is used when a new server system is formed by reproducing the now referred server system, or when plural server systems are merged into one server system.

Next, the structure of the communication system of the present embodiment will be described with reference to FIG. 13.

All users are registered in the user data base 46 with their attributes, and the list request of the user who is now referring to the reference data (home page) 42 is sent to the information-exchanging server 41 via ?? 51. The information-exchanging server 41 activates the corresponding application among the execution application group 43 to deliver this list request as well as the attribute of the user who made this request to the attribute filter 44. The attribute filter 44 analyzes the attribute of the user who made this request and the list request, selects users determined to be proper for the request from the user data base 46, and returns it back to the execution application 43 as an user list.

The execution application 43 transfers this returned user list to 51 of the user who made this request via the information-exchanging server 41. Thereby, personal informations of other users who are considered to be fitted for the attribute of the user and the list request (for example, considered to have the same values) are displayed on the simultaneous communication-related display section 22.

Now, let's assume that an user starts the communication (telephone call and the like) with other users displayed on the simultaneous communication-related display section 22. At this time, the start of telephone call and the receiver of telephone call are informed to the information-exchanging server 41 from 51.

On the other hand, the information-exchanging server 41 activates the execution application 43 fitted to this information and delivers the informed information. And, the execution application 43 transmits it to the call relation control server 45, and the call relation control server 45 registers the call relation newly materialized in the call relation control data base 47. When the display of the simultaneous communication-related display section 22 is updated, the user list is sent to 51 as described above. At this time, the list of the call relation is transmitted at the same time, and 51 expresses the call relation by linking the users who are now in conversation with each other with a bracket, based on the transmitted list of the call relation. Thereby, the conversation state of other users can be obtained, and for example, the person to make a telephone call, timing of a telephone call, or the like can be selected.

Furthermore, when the user instructs the addition of a new file to the common file-related section 25, 51 activates the corresponding helper application 52 and makes this activated helper application transfer the file to be added to the common file (server) 61. The common file (server) 61 stores this file, and returns the index for this file to the helper application 52.

This index is transferred to the information-exchanging server 41 via 51, and the information-exchanging server 41 activates the corresponding execution application 43 to register it to the common file control data base 48. And thereafter, when the updating request of the common file-related section 25 is informed from 51 to the information-exchanging server 41, the corresponding execution application 43 is activated and the list of the common files is returned to 51 via the information-exchanging server 41. And, 51 updates the common file-related section 25 based on this list of common files. Thereby, the file added by the user is displayed by icon as a common file, and other users can refer to this file only by clicking this icon 28.

In addition, as the execution application group 43, execution files having the following functions are prepared.

1. New User Registration-related Function (1) Dialogue activation. To activate the user registration dialogue on the PC.

(2) User registration. To receive the name of user, mail address, and the image which the user intends to register, and to register them in the user data base 46. At this time, the Internet address of the user terminal is used as a key. In this case, IP address is handed from the information-exchanging server 41 as the environmental variable of the program. In addition, the name and image of user are added in the home page 42.

2. Activation of Communication Tool

To receive the ID of the communication tool and the ID of the target user. After retrieving the user data base 46 and drawing out necessary informations, to deliver the information to the communication tool activation module (helper application group 52) of the client system 50.

3. Completion of Reference

To delete the information of said user from the user data base 46. Also to delete the name and image of the user from the home page 42.

4. PC Application Activation-related Function (1) Application activation. To receive the application ID. To activate the application activation module (helper application group 52) on the PC, to deliver the application ID.

(5) File registration. To receive the common file name on the common file (server) 61 and user's comment to the file to update the home page 42.

5. New File Registration-Related Function (1) Dialogue activation. To activate the file registration dialogue on the PC.

(2) File registration. To receive the common file name to update the home page 42.

6. Common File Elimination

To receive the common file name and comment and eliminate the reference to said file from the home page 42.

7. Formation of New Server System

To reproduce a server system having the same operation environment with own server system to provide it as a new server system.

8. Integration of Plural Server Systems

To merge plural server systems to integrate into one server system.

Among them, the activation of PC application from the server system 40 is conducted via 51. In addition, this execution application group 43 is executed in parallel therewith from plural users via the information-exchanging server 41. Therefore, when read/write for the data having the possibility shared by plural execution application processes is performed, exclusive control such as locking or the like is applied.

On the other hand, execution files having following functions are prepared as the helper application group 52 of the client system 50.

1. User Registration Dialogue

To urge the input of the name, mail address and image file name of the user, and the reference of the home page which the user holds personally (if any). By adding these informations, to activate the user registration script (execution application group 43) of server system 40. The reason why the reference to the home page is input is that it saves time to register the reference one by one by using file registration function. It is not necessary to input again these informations unless there is any change, by utilizing the user registration dialogue once.

2. Communication Tool Activation Module

To receive the ID and the like of the communication tool, and to activate it by giving necessary argument to said communication tool. Here, as the communication tools, there can be mentioned, for example, "irchat", "talk (on the text base)", "Speak Ereely (one kind of Internet audio talk)". In addition, the electronic mail is not a simultaneous communication tool, but it is desired to support it, too.

3. Application Activation Module

To receive the application ID and activate said application. After completing the application, to ask if the edited file is registered as the common file or not. If it is to be registered, to transfer the edited file to the common file (server) 61, and activate the file registration script (execution application group 43) of the server system 40 with the comment and name of the file.

4. File Registration Dialogue

To display the file selection dialogue and transfer the selected file to the common file (server) 61. In addition, to transfer the name and user's comment to the file to the server system 40, and activate the file registration script (execution application group 43).

Among them, activation of the script of the server system 40 and transfer of data accompanied with it are under the instruction of the information-exchanging server 41.

Now, the operation principle of the communication system of the present embodiment will be described with reference to FIG. 14, taking the new common file registration as an example.

Figure 14:
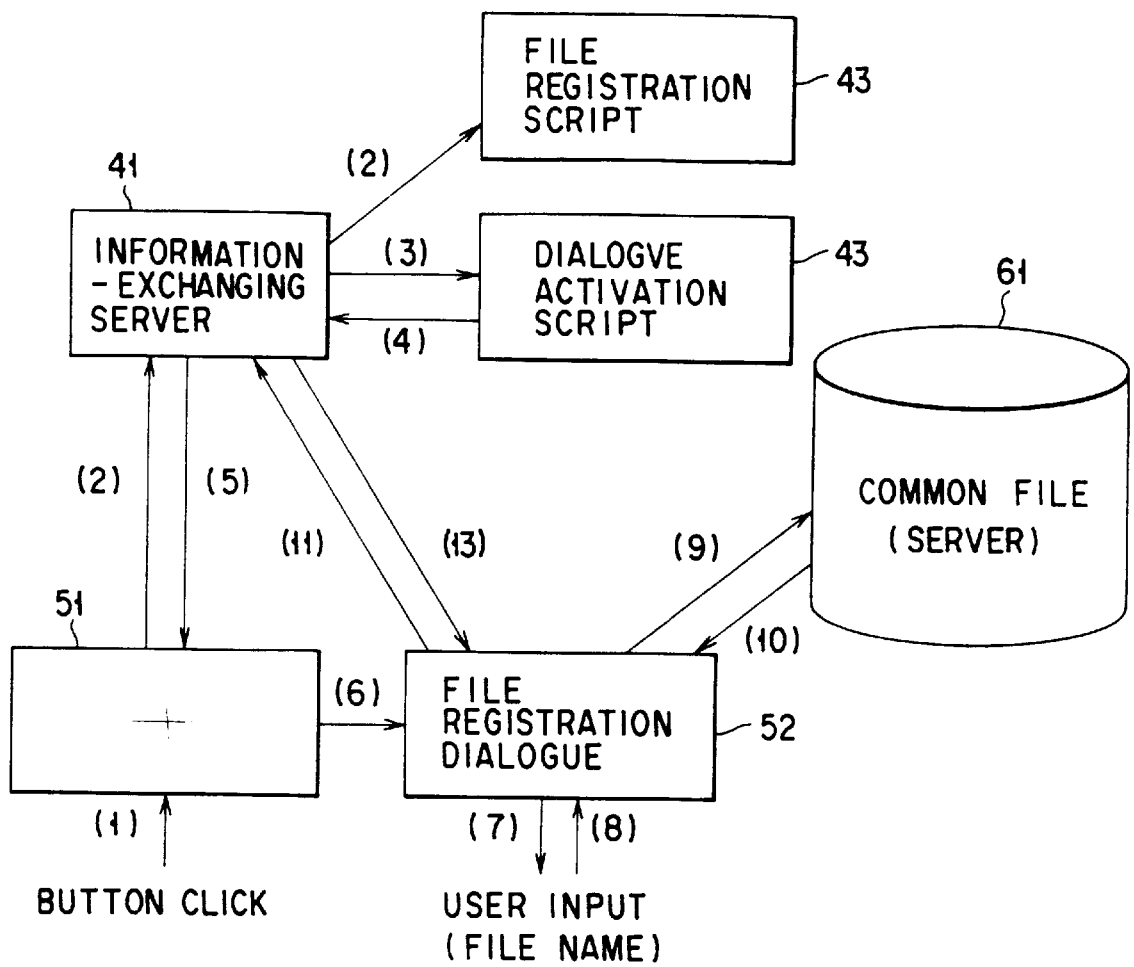
FIG. 14 is a conceptual view for illustrating the operation principle of the communication system of said embodiment.

The button click on the home page ((1) of FIG. 14) is informed to the information-exchanging server 41 of server system 40 by 51 ((2) of FIG. 14), and corresponding dialogue activation script (execution application group 43) is activated by the informationexchanging server 41 ((3) of FIG. 14).

When the activation of this dialogue activation script (execution application group 43) is completed ((4) of FIG. 14), it is informed from the informationexchanging server 41 to 51 ((5) of FIG. 14), and the file registration dialogue (helper application group 52) on the PC is activated by 51 ((6) of FIG. 14). This dialogue is a display to urge the user to file selection ((7) of FIG. 14), and when the user selects the file by inputting the file name or the like ((8) of FIG. 14), the file registration dialogue (helper application group 52) transfers the selected file to the common file (server) 61 ((9), (10) of FIG. 14), as well as requests the activation of the file registration script (execution application group 43) to the information-exchanging server 41 ((11) of FIG. 14), thereby the procedure of file registration is completed ((12), (13) of FIG. 14). At this time, the file registration script receives the common file name and updates the home page, as described above.

Thereby, this file is displayed in an icon on the home page as the common file, and thereafter users who are referring to this home page can refer this file only by clicking the icon.

In addition, the operation principle among this information-exchanging server 41, execution application group 43, 51, and helper application group 52 is similar with the one related to the new user registration.

Thereby, the communication field in a more natural form can be constructed on the network.

The invention described above is characterized in that a communication system in which plural client systems refer to the informations kept by the server system via a network includes:

a personal information control means which controls personal informations of the person who handles the client system which is referring to said informations, a personal information display means which displays the personal information controlled by said personal information control means in a list on the display screen as choices, and a communication channel-establishing means for establishing the communication channel with the client system corresponding to the choices selected and instructed when the selection and instruction are made on said screen.

Furthermore, the communication system may include a formation means which is provided in said server system, and forms a reproduction of the own system as a new server system according to the request from said client system.

Furthermore, the communication system may further include a means for integrating at least two server systems among plural server systems formed by said formation means as one server system, according to the request from said client system, which is provided in said server system.

Figure 15:
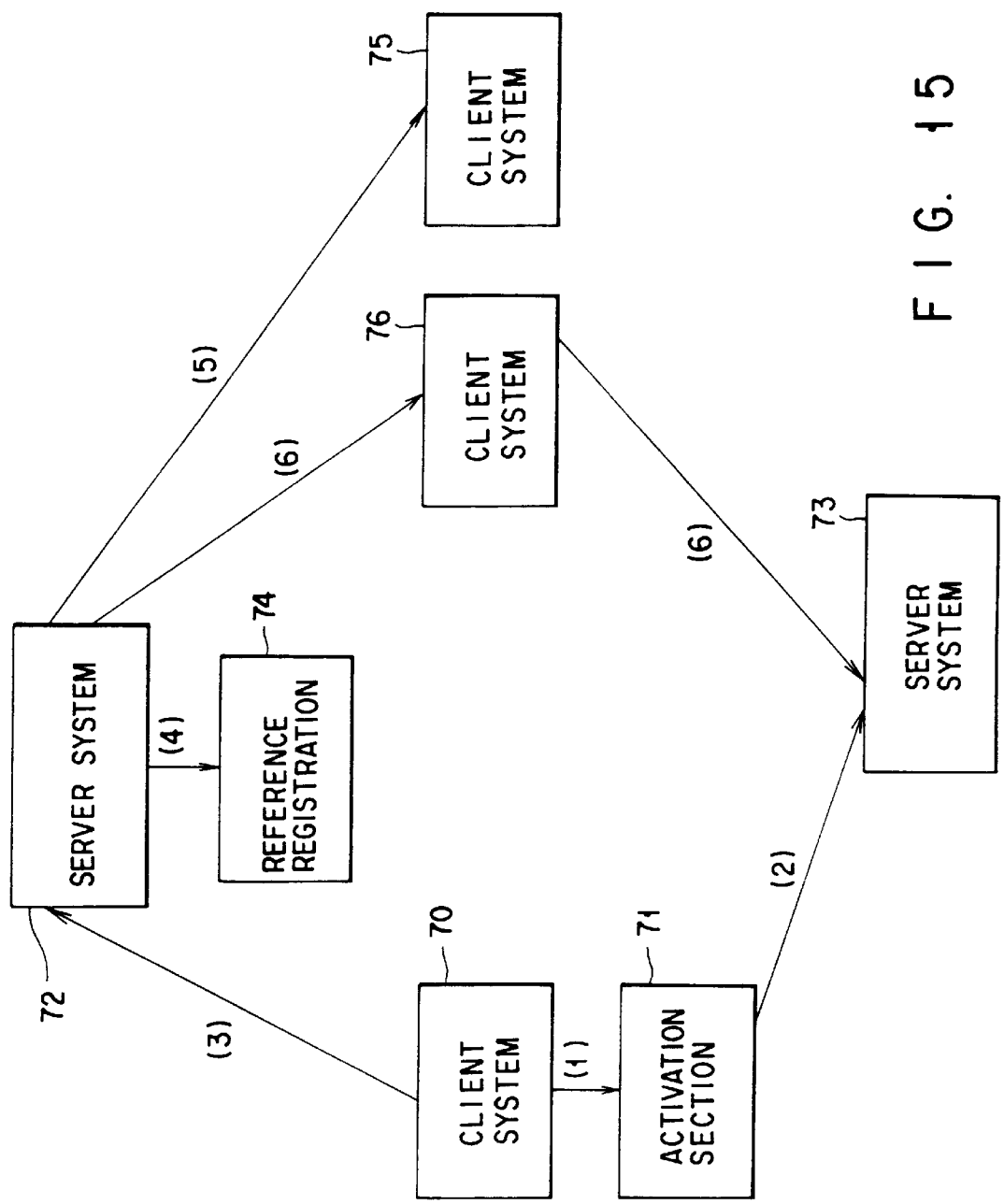
FIG. 15 is a view illustrating the formation in the communication system of said embodiment.

Now, an example to form a reproduction of own system as a new server system according to the request from the client system will be described in time series with reference to FIG. 15.

(1) Client system 70 instructs the activation section 71 to activate a new server system 73.

(2) Activation section 71 activates the new server system 73.

(3) Client system 70 also instructs to refer to server system 72.

(4) Reference to the new server system 73 is registered in the common data base 74.

(5) Client system 75 obtains reference to the new server system 73.

(6) Client system 76 can obtain access to the new server system 73.

Figure 16:
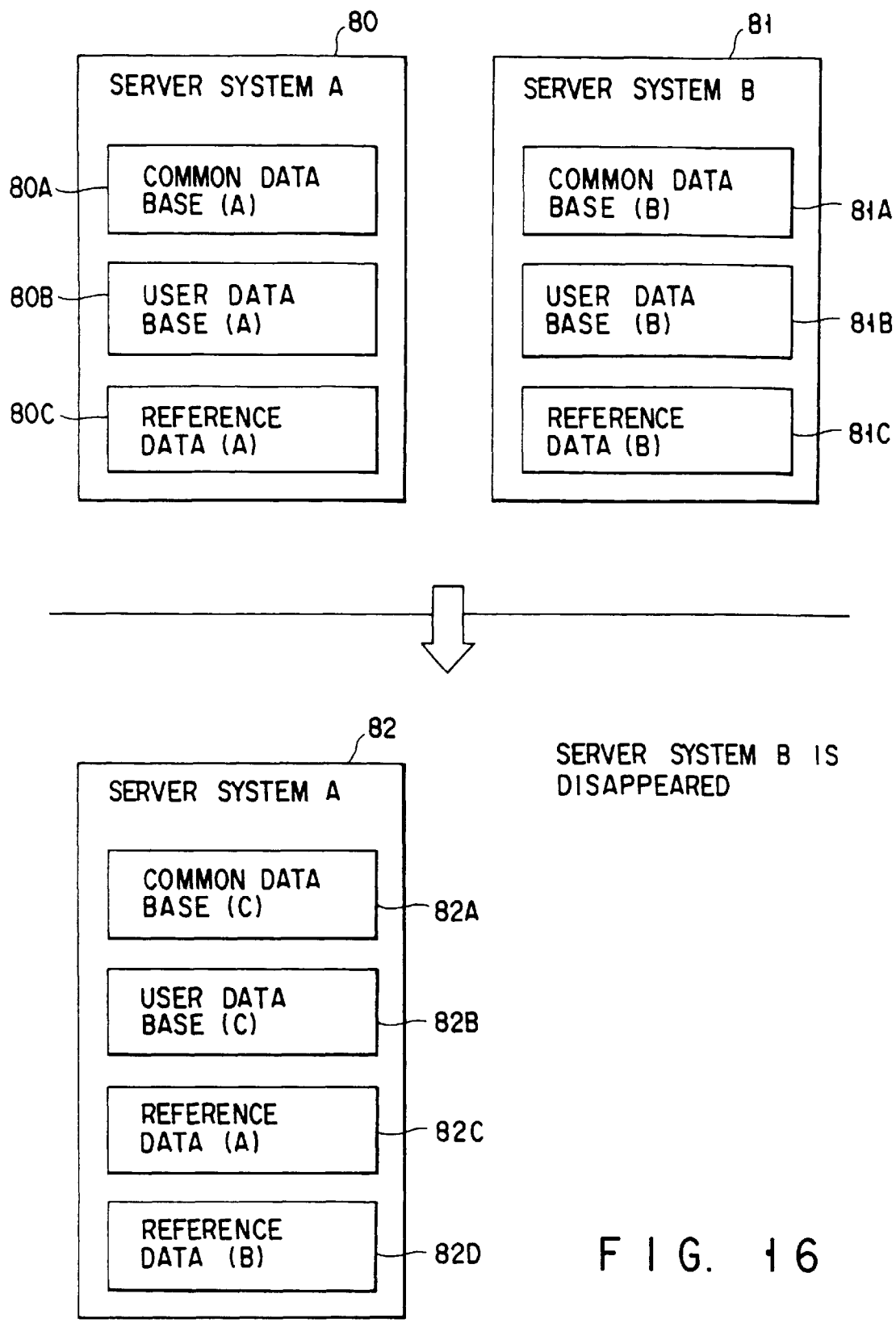
FIG. 16 is a view illustrating the merge in the communication system of said embodiment.

Next, an example to integrate (merge) at least two server systems among plural server systems formed as described above as one server system will be described with reference to FIG. 16. Namely, there are a server system A80 having common data base (A) 80A, user data base (A) 80B and reference data (A) 80C, and a server system A81 having common data base (B) 81A, user data base (B) 81B and reference data (B) 81C. These server system A80 and server system 81 can be integrated into a server system A82 having common data base (C) 82A, user data base (C) 82B, reference data (A) 82C and reference data (B) 82D.

User data base (c)=user data base (A)+user data base (B)

Common data base (C)=common data base (A)+common data base (B)

Figure 17:
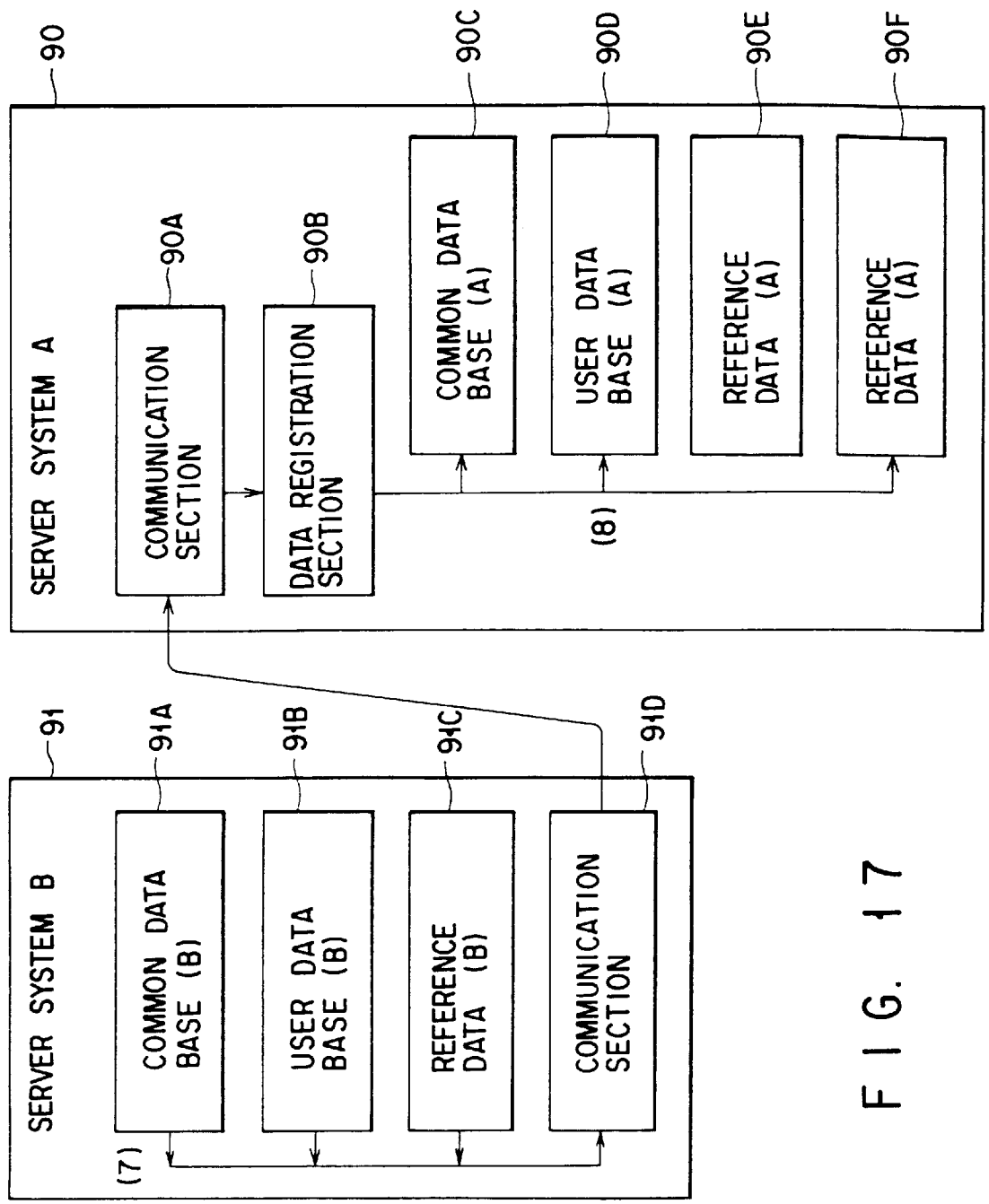
FIG. 17 is a view illustrating the details of the merge in the communication system of said embodiment.

In the above description, the sign "+" means to merge each item. For example, when common data base (A) has data $d_{a,1}, d_{a,2}, \ldots$, and common data base (B) has data $d_{b,1}, d_{b,2}, \ldots$, common data base (C) has data $d_{a,1}, d_{a,2}, \ldots, d_{b,1}, d_{b,2}, \ldots$ The above-mentioned merge is realized, as shown in FIG. 17, by the data transfer (7) and the additional registration (8) via communication sections 90A and 91A of server A and server B.

As described above in detail, according to the present invention, informations of other users who are referring to the same information can be obtained on the real-time basis, for example on WWW, and individual communication among these users can be performed smoothly, as well as respective informations of users can be accumulated as common data.

Thereby, the communication field in a more natural form which has not been seen conventionally can be provided on the network system.

Figure 18:
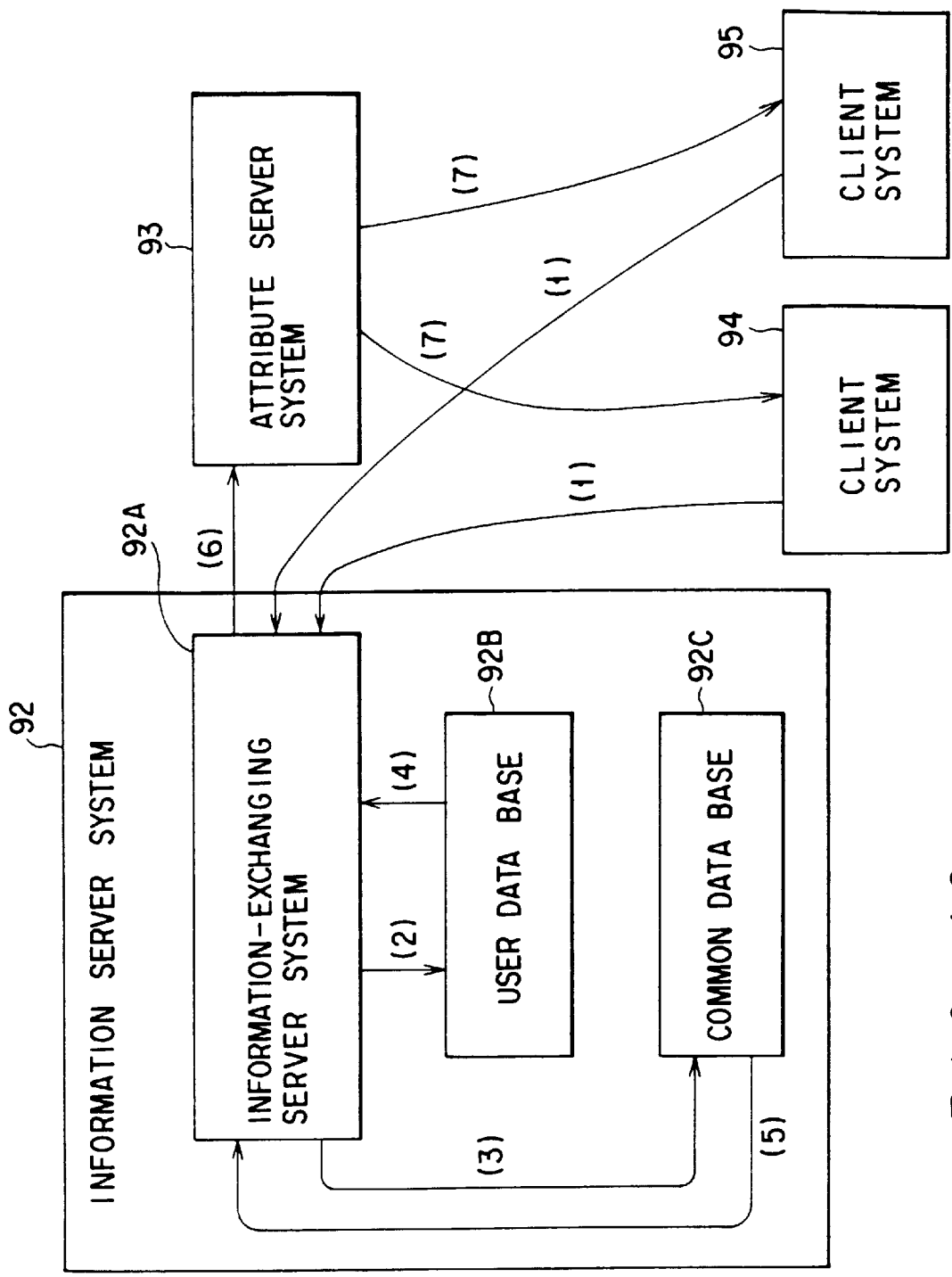
FIG. 18 is a view showing an example to combine a communication field and an attribute control device.

Next, an example in which the invention relating to the formation of communication field described above and the invention relating to the attribute control shown in FIG. 19 and thereafter are combined in the network system including the information server system 92 having information exchange server system 92A, user data base 92B and common data base 92C, attribute server system 93 and client systems 94, 95 will be described in time series with reference to FIG. 18.

(1) Client systems 94, 95 access to the information server system 92 (call relation candidate request).

(2) In response thereto, the information with attribute is registered with respect to the user data base 92B of the information server system 92.

(3) Also with respect to the common data base 92C of the information server system 92, the information with attribute is registered.

(4) Data read is performed from the user data base 92B by the information exchange server system 92A.

(5) Data read from common data base 92C is also performed by the information exchange server system 92A.

(6) The information with attribute is transferred from the information exchange server system 92A to the attribute server system 93.

(7) The filter-treated information is transferred from the attribute server system 93 to respective client systems 94 and 95.

In the above description, with regard to the call relation candidate request (1) from respective client systems 94, 95, the information server system 92 transfers the content of the user data base 92B which has stored the attribute or common data base 92C to the attribute server system 93.

Furthermore, the attribute server system 93 retrieves the information sent from the information server system 92, and determines the data to be transferred to clients systems 94, 95 which issued the call relation candidate request. Here, the client system which issued the call relation candidate request is assumed to be A, and it is assumed that said client system A has issued the candidate request with adding an attribute of "user of other sex". Then, a list with attributes of all users is sent from the user data base 92B to the attribute server system 93. The attribute server system 93 examines the attribute "SEX" to retrieve users of other sex. However, at this time, the user having the attribute of "only the user of the same sex" is to transfer the list of the call relation candidate request obtained by listing-up to the client system A.

Now, the embodiments will be described with reference to the drawings.

Figure 19:
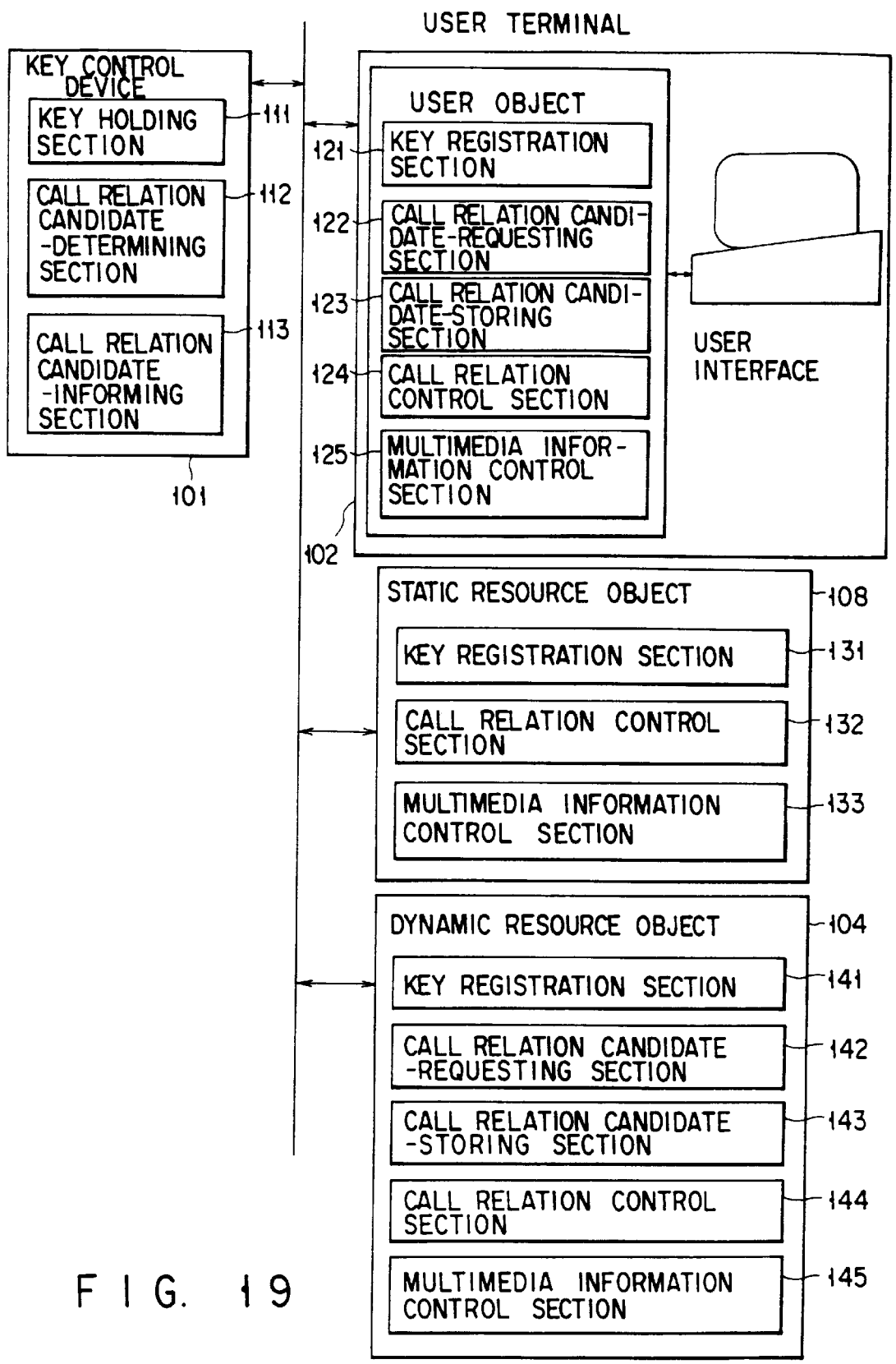
FIG. 19 is a view showing the whole structure of the system according to one embodiment of the present invention.

In FIG. 19, the communication system according to the 8th embodiment of the present invention is shown. According to said drawing, the center station 101 comprises a key information-holding section 111, a call relation candidate-determining section 112 and a call relation-informing section 113, and in the key information-holding section 111, the position and the size of objects in the virtual three-dimensional space is held as, for example, one of attributes of object. Network resources are divided into three types, that is, an user object 102, a static resources object 103, and a dynamic resources object 104.

The user object 102 is, for example, process of the user, and has a multimedia information control section 125 in order to display the status of the system to the system user and to receive the instructions for objects from the user. Also it has a call relation control section 124 for storing the information to be referred to before establishing the call relation with other objects.

In the respective operation of this user object 102, the system user operates the multimedia information control section 125 and instructs to log in the system. The multimedia information control section 125 instructs the key information registration section 121 to register the network entry of the object and the attribute of the object in the center station 101. Here, it is assumed that the position and the size of the object in the three-dimensional space and the location area of the user terminal 102 are included as the attribute of the object.

The static resources object 103 is a so-called "waiting object", for example, not-moving object such as a theater and the like, and it is like a data base. The key information registration section 131 of the static resources object is used only when the static resources object 103 is registered in the center station 101, and thereafter waiting for the communication request to come from other objects.

The dynamic resources object 104 is a "self-propelling object", for example, a moving object such as an automobile, and a process such as an agent and a demon. The dynamic resources object 104 has a key information registration section 141, and can update, for example, a position in the three-dimensional space for every certain period of time.

Figure 20:
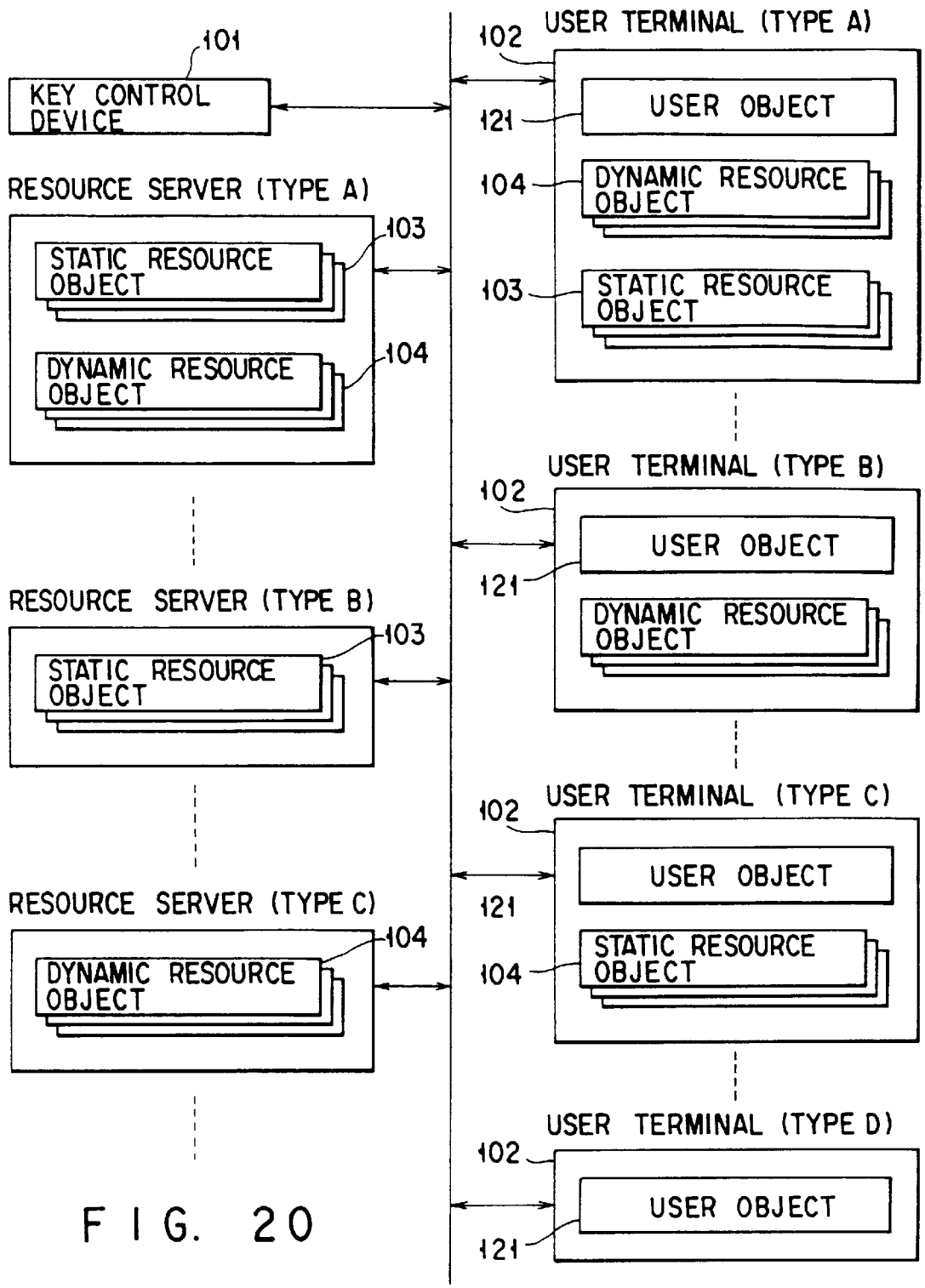
FIG. 20 is a view showing the structure of the system in combination with objects in FIG. 1.

In the actual network, various forms can be taken by combining these objects, as shown in FIG. 20.

Respective objects 102, 103 and 104 instruct multimedia information control section 125 belonging in, for example, user terminal 102 to request the call relation based on the position in the three-dimensional space to the call relation candidate request section 122, when respective key information registration sections 121, 131 and 141 complete registration. The call relation candidate request section 122 requests the center station 101 to inform the call relation candidates based on the position in the three-dimensional space. The network entry of the call relation candidates and the attributes thereof informed from the center station 101 are stored in the call relation candidate-storing section 123. The call relation candidate-storing section 123 informs the update of the call relation candidates to the call relation control section 124. At the time of log-in, it is a matter of course that the call relation is not stored in the call relation-storing section 123. The call relation control section 124 can retrieve the call relations stored in the call relation-storing section 123 to examine if specific call relation is established or not. The call relation control section 124 stores objects which are now inhibited to conclude any call relation. It may be specified by the network entry of objects or may be specified by the attribute of the object. To be specified by the attribute of the object means that the "call relation is not established with the object having (not having) certain attribute".

The call relation control information stored in the call relation control section 124 is set up by users. The call relation control section 124 can retrieve the call relation control informations stored in the call relation control section 124 to examine if conclusion of a specific call relation is allowed or not. When users set up properly the call relation control informations, they can utilize the call relation control information-setting means of the call relation control section 124 as follows:

(1) Not to establish the call relation with acquaintances or friends having private company, at the time of access to the system on business.

(2) Not to establish the call relation for certain period of time with an unfavorable person whom the user met before.

FIGS. 21, 22, 23 and 24 show the operations of the call relation control section 124, 132 and 144.

Figure 21:
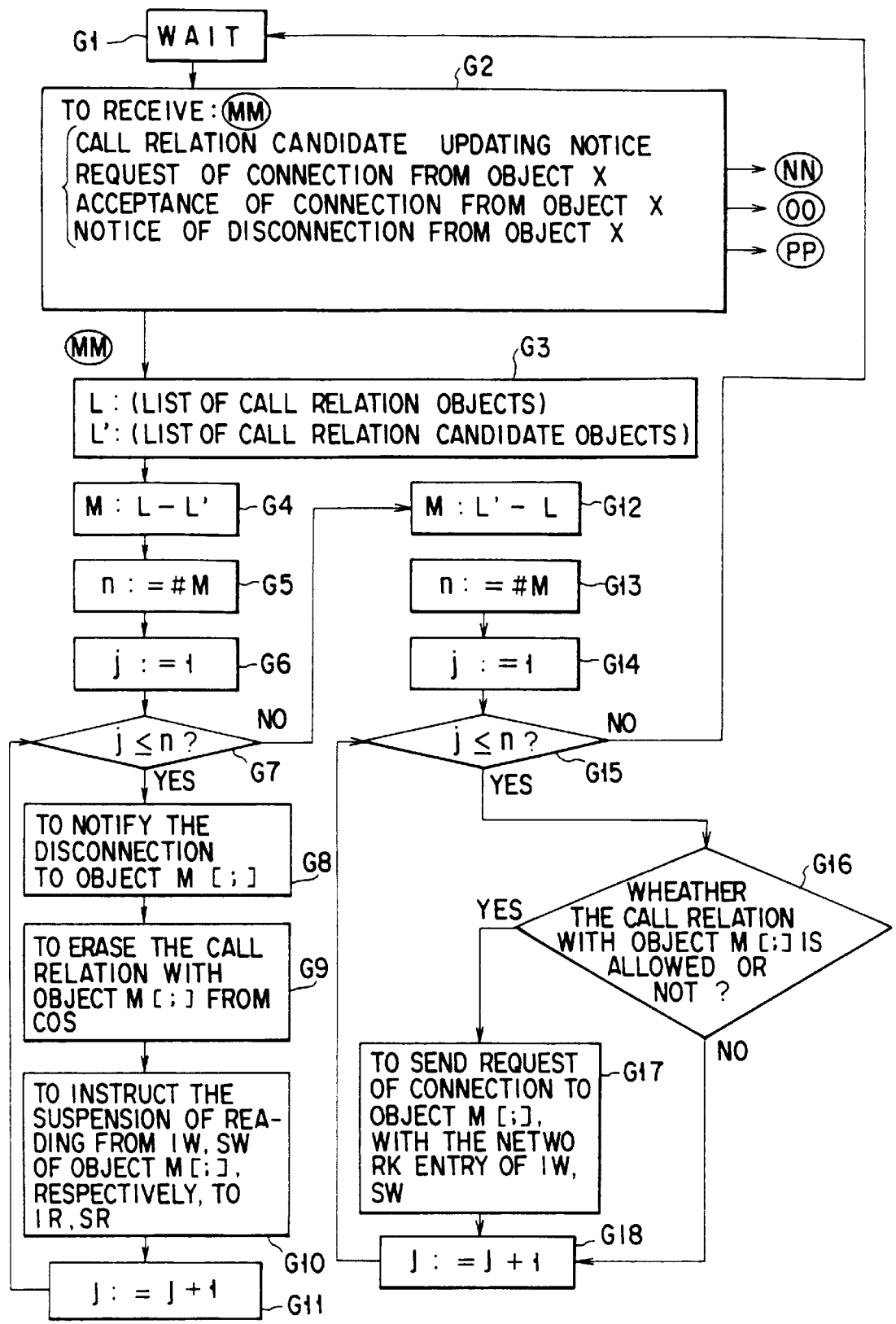
FIG. 21 is a flow chart showing the algorithm of the call relation control.

Referring to FIG. 21, when the call relation control section receives the call relation candidate update information, request of connection from object X, acceptance of connection from object X, and disconnection notification from object X, respective processings corresponding thereto (G1–G18) are performed.

Figure 36:
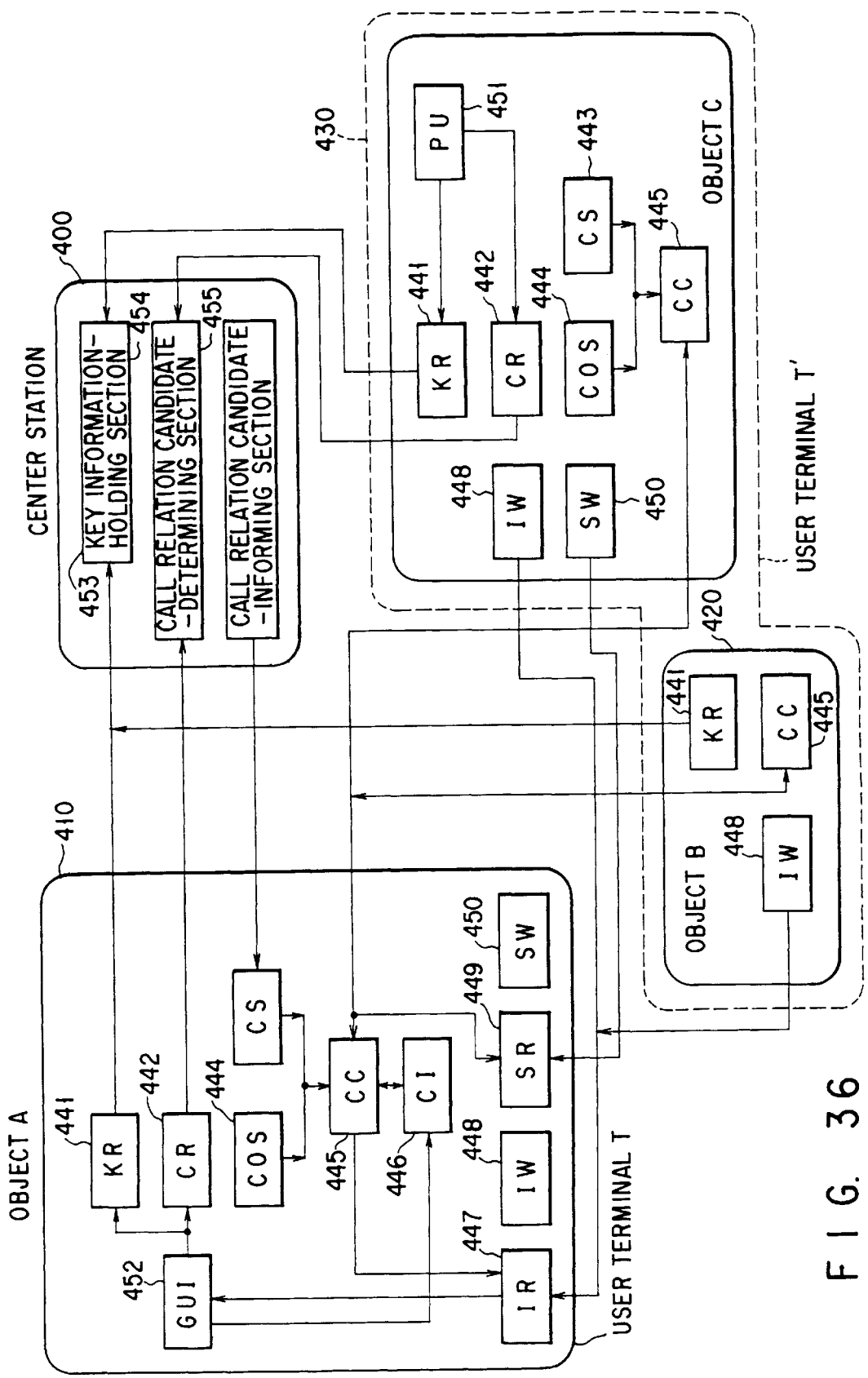
FIG. 36 is a block diagram of the communication system according to the other embodiment.

Namely, when the call relation control section receives the call relation candidate update information, the list L of the call relation objects and the list L' of the call relation objects are read, and update of the call relation candidates is executed for the object M; based on these lists. In addition, in this FIG. 21, COS shows the call relation-storing section as shown in FIG. 36, and IW and SW show the image information-storing section and the acoustic information-storing section, respectively.

Figure 22:
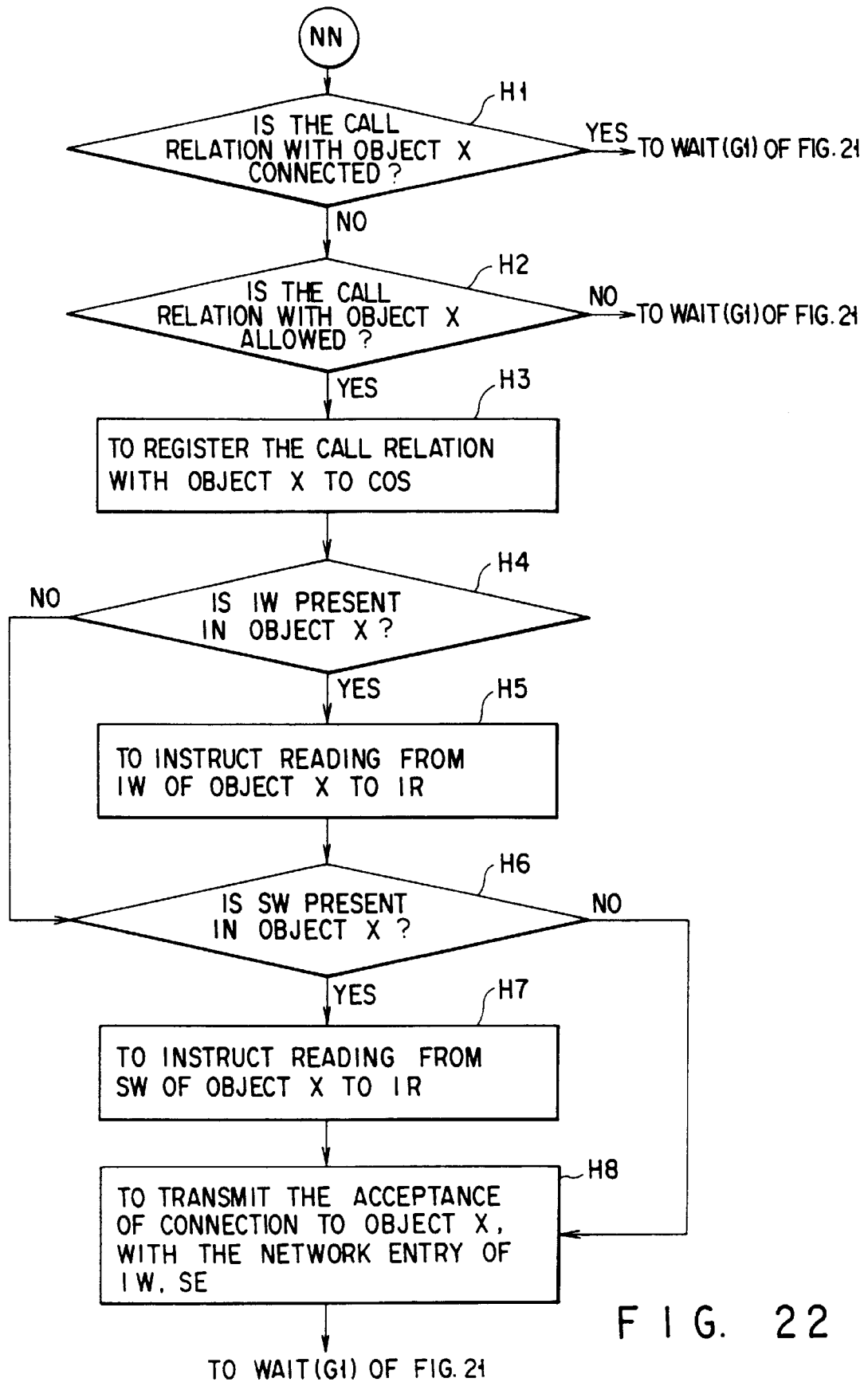
FIG. 22 is a flow chart showing the algorithm of the call relation control.
Figure 23:
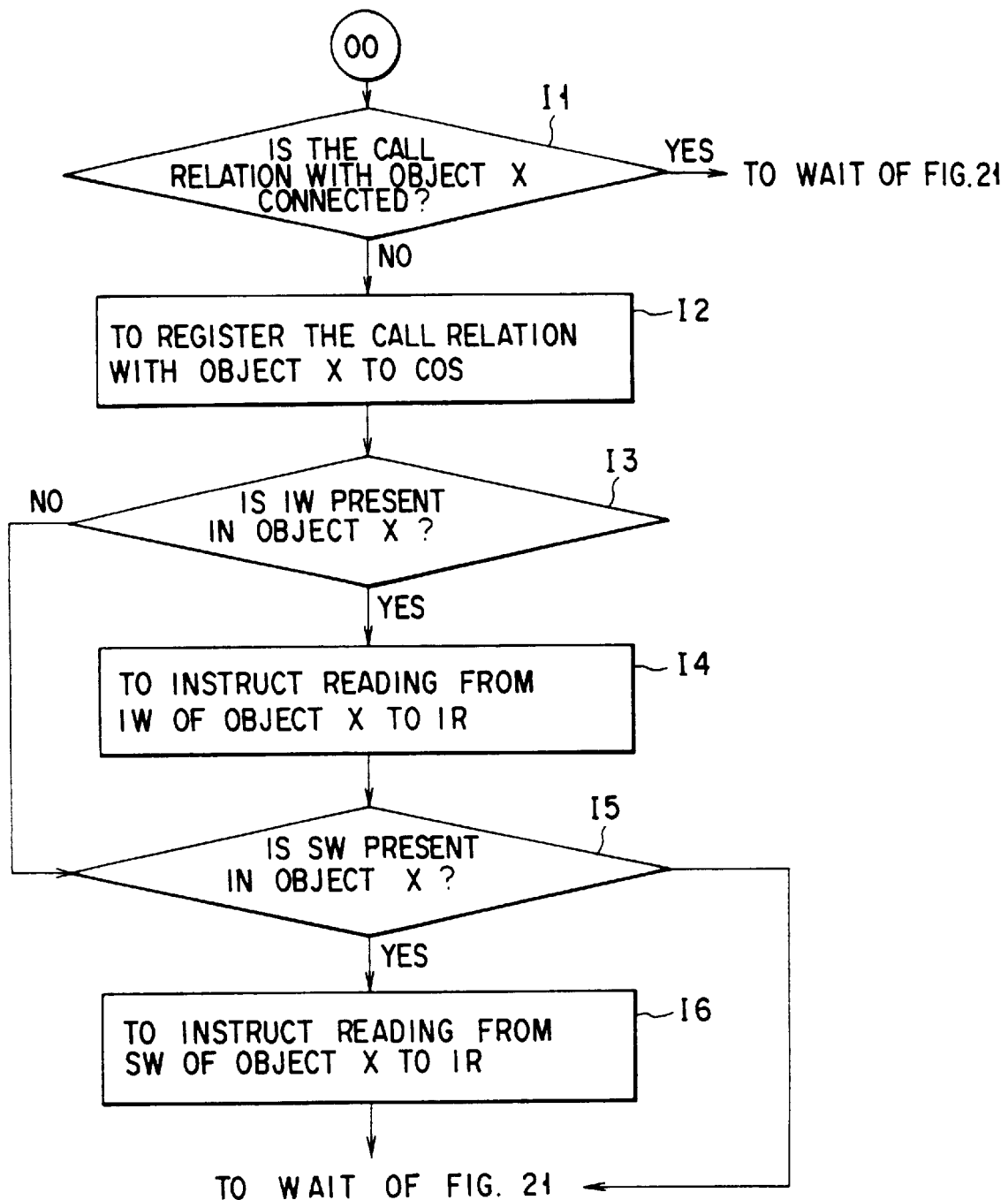
FIG. 23 is a flow chart showing the algorithm of the call relation control.

Referring to FIG. 21, when the request of connection is received, the processing for connection (H1–H8) is executed according to the flow chart of FIG. 22. Furthermore, the acceptance of connection is received, the processing for acceptance of connection (I1–I6) is executed according to the flow chart of FIG. 23. Similarly, when the disconnection notification is received, the processing for disconnection notification (J1–J3) is executed according to the flow chart of FIG. 24. In addition, in FIG. 24, IR and SR show the image information read section and the acoustic information read section, respectively, as shown in FIG. 36.

The multimedia information control section 125 stores the multimedia data related to the object, and transmits the stored data in response to the access through the network. The multimedia information control section 125 reads the data from the network entry given by the call relation control section 124. When the call relation control section 124 instructs the suspension of data read to the multimedia information control section 125, the multimedia information control section 125 suspends the read if it is now reading, and disconnects the connection with the multimedia information control section 125. If it is not reading, nothing is performed. The multimedia information control section 125 displays the read data.

The respective operations of the dynamic resources object 104 and the static resources object 103 are similar to those of user object 102. However, the dynamic resources object 104 can update the position on the three-dimensional space for every certain period of time, and instructs the key information registration section 141 to change the attribute of the object and register the new attribute to the center station 101. Then, it instructs the call relation candidate request section 142 to request a new call relation candidates. It is because the object to establish the call relation should have been changed due to the change of position.

In the user object 102, when the user changes the position through the multimedia information control section 125, the call relation has to be updated similarly. This procedure is realized by the instructions to the key information registration section 121 and then to the call relation candidate request section 122 as in the case of dynamic resources object 104.

Next, the operations of respective sections of the center station 101 will be described.

Figure 25:
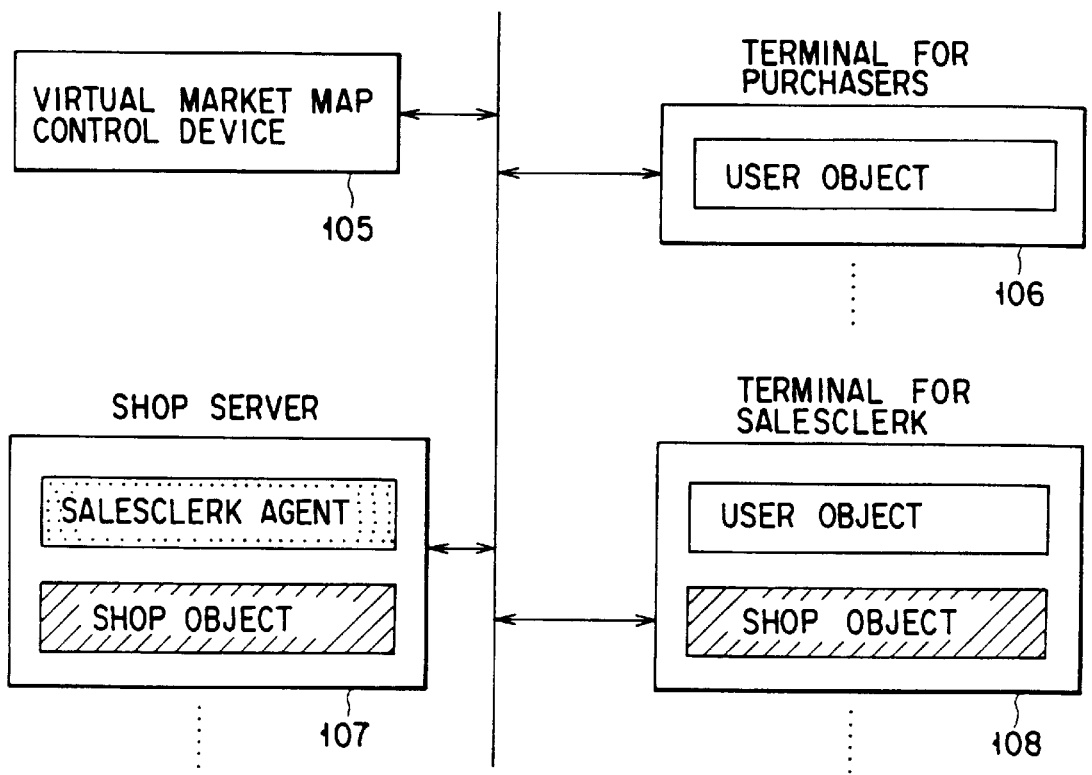
FIG. 25 is a view showing the object structure in the virtual market.

The key information-holding section 111 holds the network entry and the attribute sent from, for example, the key information registration section 121 of object 102 in a list such as shown in FIG. 25. Hash table is formed with regard to some general attributes for convenience of retrieval and registration. The call relation candidate-determining section 112 retrieves the list of the key information-holding section 111 in response to the request from the call relation candidate request section 122 of object 102, determines the call relation candidate relating to said object 102, and sends it to the call relation candidate-informing section 113. The request from the call relation candidate request section 122 is given, for example, in the following form:

GETNB object name (3d, d)

GETNB object name (3d, d), (loc, T city)

wherein d represents a real number. The first request requests to give the call relation candidates within the distance d from the center of said object 102 in the virtual three-dimensional space. In the second example, in addition to it, it requests the call relation candidate objects whose terminal location area is T city. The call relation candidate-informing section 113 transfers the list of the call relation candidates sent from the call relation candidate-determining section 112 to the call relation candidate-storing section 123 of said object with the attributes thereof.

Next, the 9th embodiment will be described. This 9th embodiment is an embodiment when a virtual market is realized by the 8th embodiment described above.

FIG. 25 shows the structure of this virtual market. The virtual market map control device 105 controls the data of objects existing in the virtual space coordinates and its space, and provides or receives the data to/from each object via the network according to need. In the network, there exist a terminal for shoppers 106 which is used by shoppers, a terminal for the salesclerk 108 which is used by a salesclerk, and a server 107 which has a shop agent which is the dynamic resources object having a behavior such as a vending machine or the like.

FIG. 26 is one example of the data which the virtual market map control device 105 has, and which is informed to respective terminals and respective servers as the call relation candidateslist. In addition, this data is changed dynamically by log-in and log-out of the user to the market.

By the way, when the virtual market is actually operated, the form of the communication is assumed as follows:

(1) Shoppers are many with respect to the number of shops.

(2) Most parts of the conversation is between customers and salesclerks.

(3) Conversations "between customer and customer" and "between salesclerk and salesclerk" are relatively very few.

Therefore, the call relation control section matched with these forms can be considered.

Figure 27:
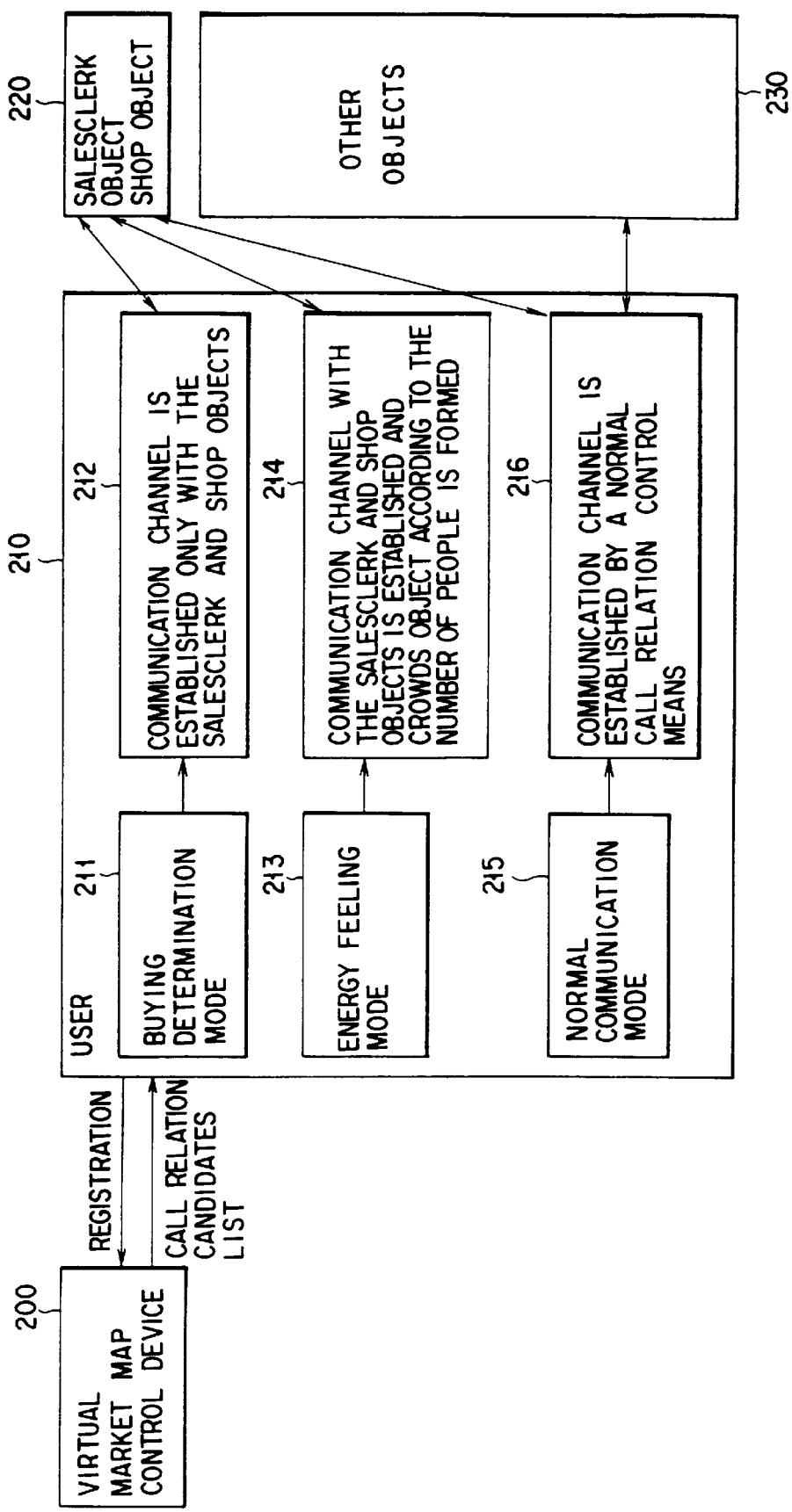
FIG. 27 is a view showing the structure of the object such as customers.

FIG. 27 shows one example of the call relation control section in the user object specified for shoppers. According to FIG. 27, the following three modes can be selected as a form of shopping by users.

"Buying determination mode" is used when the article (or shop) to buy is clearly determined, and communication with other customer object is not required, and by establishing the communication only with a salesclerk and a shop, communication volume can be greatly reduced without worrying about crowds. "Energy-feeling mode" is used when articles (or shops) to buy are vague, and there is no need of communication with other customer objects, though ambient situation (popularity and energy of shops) being required, and the "crowd" object is formed showing the flow of other customers, at the same time communication with only a salesclerk and a shop is established. Thereby, it can be visualized which shop gathers customers, which can be utilized for the determination of shopping, and at the same time the communication volume can be reduced.

"Normal communication mode" is used when it is wanted to wander about the market without particular purpose, and establishes communication with all objects selected by the normal call relation control. Thereby, conversation of "customer-to-customer" and "salesclerk-to-salesclerk" is realized.

Figure 28A:
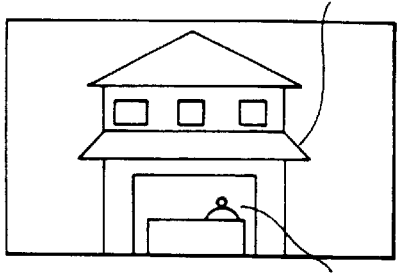
FIGS. 28A to 28C are views showing the difference of displays by mode.
Figure 28B:
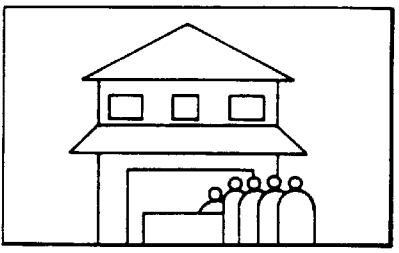
Figure 28C:
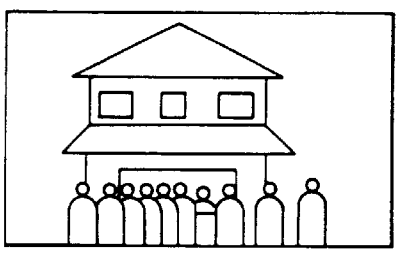

FIGS. 28A to 28C shows how the display is conducted in the terminal for shoppers by the above-mentioned three modes. FIG. 28A is a display in the "buying determination mode", and it is not required to see other customers. FIG. 28B is a display in the "energy-feeling mode", and can be seen as the other one crowd object, and can feel the degree of popularity of a shop. FIG. 28C is in the "normal communication model", and communication with all customers gathering in the shop is possible, and individuals can be identified.

Figure 29:
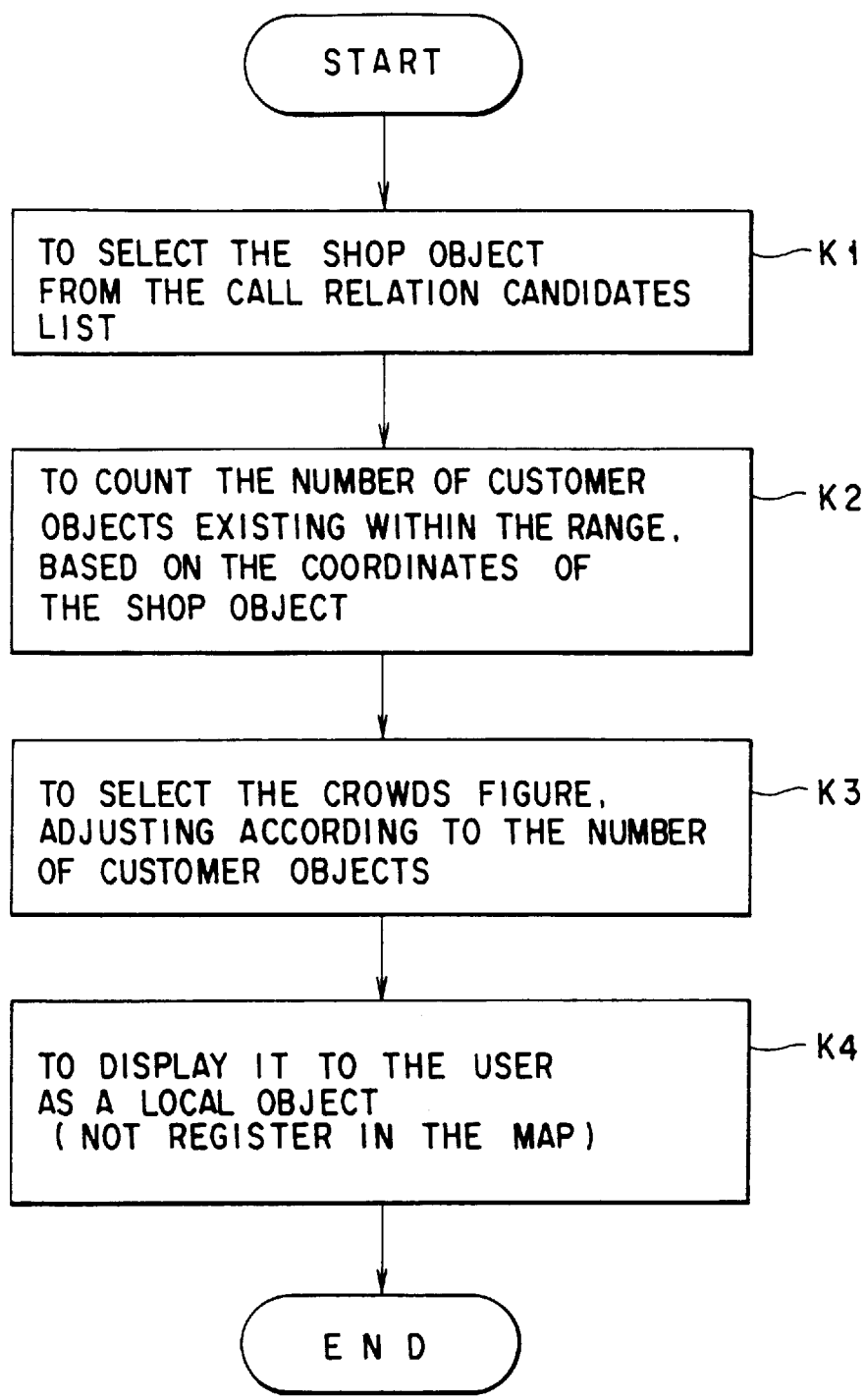
FIG. 29 is a flow chart showing the formation algorithm of the crowds object.

FIG. 29 is a flow chart of formation processing of the crowd object in the "energy-feeling mode". First, a shop object is selected from the call relation candidates list (K1), and the number of customer objects is counted on the basis of range such as "within the radius of r" (K2). Then, the "crowd figure" is selected according to the number (K3), and displayed in the terminal. Since this crowd object is local, information to the virtual market map control device is not carried out (k4).

Figure 30A:
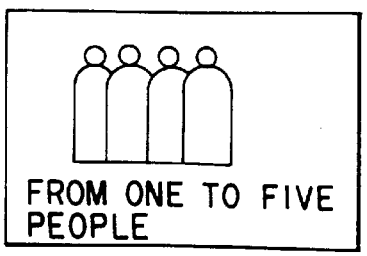
FIGS. 30A to 30C are views showing the display samples of the crowds object by number of persons.
Figure 30B:
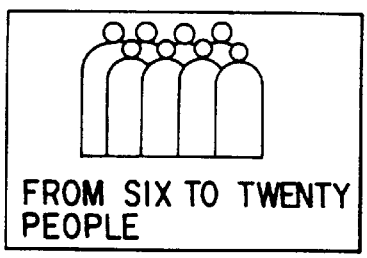
Figure 30C:
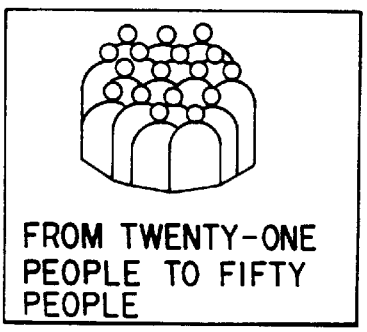

These three modes can be dynamically changed or mingled, and for example, it is possible to wander about the town after "buying determination" is completed, or separate a specific object in the crowd objects to establish the communication channel. FIGS. 30A to 30C show an example of crowds figure according to the number of persons, and the user can feel by intuition the number of persons.

Next, considering the dialogue from the standpoint of shops, means for conducting advertising of the shop or commodities efficiently according to customers will be described.

FIG. 31 is one embodiment for realizing a salesclerk object and a shop object, and is composed of an user object 310 of the terminal for salesclerks and a shop object 311. The user object for salesclerks 310 classifies customers from the customers data 313 kept by the call relation candidates list and the shop object at the customers separation section 316, and according to the classification, the contents of advertising is controlled, and automatically dispatched to the respective shoppers objects with which the call relation is established via the advertising-informing section 317.

FIG. 34 shows one example of the advertising data 312. Here, it is classified by, for example, properties such as articles to be offered at a bargain price, list of commodities which are dealt in the shop, and introduction of the shop. Also, the normal business talk is performed directly between the shopper and the salesclerk via the communication.

The shop object 311 is composed of a customer data 313, a commodity data 314, and a shop data 315. In the commodity data 314, the stock of articles is controlled, and in the shop data 315, data for the graphic display is stored.

Figure 32:
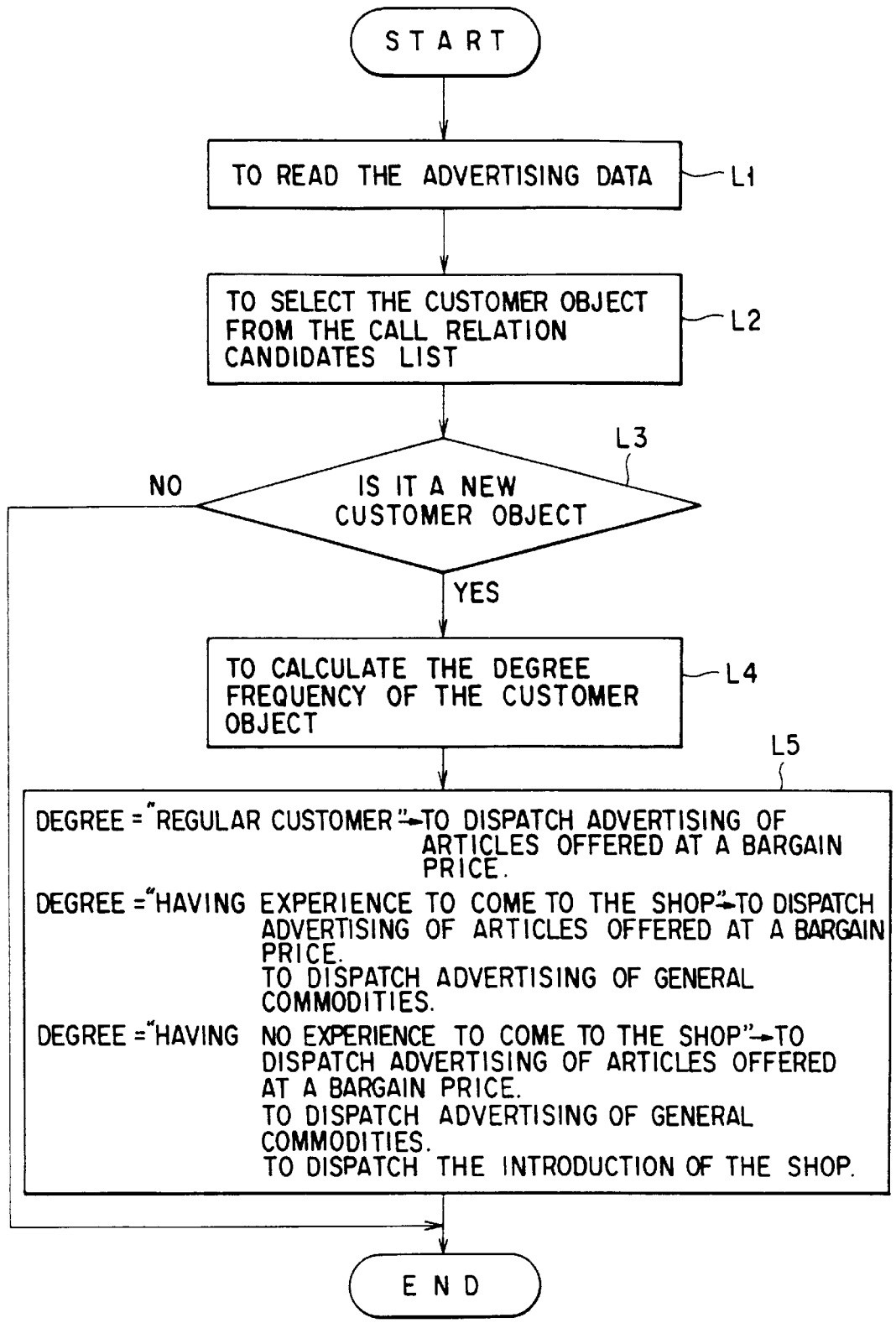
FIG. 32 is a flow chart showing the algorithm of the advertising notification processing.

FIG. 32 shows a flow chart of the advertising notification processing. First, the advertising data is read (L1), and the object of customers newly visited the shop is extracted (L2–L3) among the call relation candidates list. The each extracted object is compared to the customer data to determine the degree of frequency of the customer. FIG. 35 shows one example of the customer data. Here, the importance level of customers is calculated by using a certain evaluation function from the data of the number of utilization and the utilized amount, and it is designated as the degree of frequency of customers.

If the degree exceeds a certain threshold and is judged to be as a "regular customer", only the data of articles to be offered at a bargain price is sent to the customer, therefore it saves time to dispatch useless data such as being determined that the customer has already known. Furthermore, when it is judged that the customer has once visited the shop, advertising of the article to be offered at a bargain price and advertising of general articles are dispatched. To altogether new customers, more advertising materials are dispatched to support the expansion of customers.

Furthermore, it is also possible to control the advertising according to the tendency of customers by analyzing the customer data in more detail.

Furthermore, in the present embodiment, the control is performed according to the degree of frequency of customers, if the call relation candidates list has informations of sex, age, family structure, and the like as the attribute, it is also possible to control by using these informations. And customers can control to accept or reject to receive these advertising, and need not to receive advertising in which he/she has no interest.

Figure 33A:
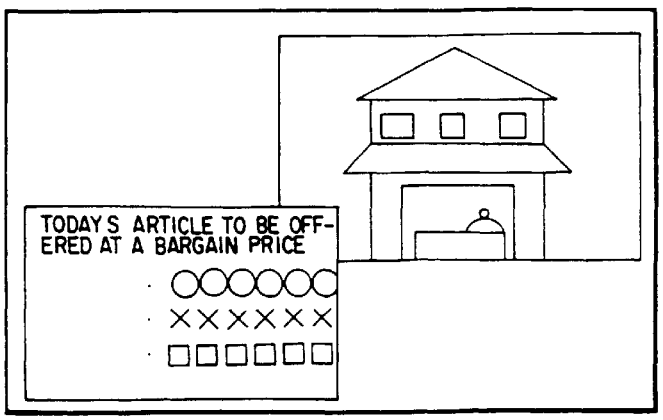
FIGS. 33A to 33C are views showing the difference of displays by degree of frequencies.
Figure 33B:
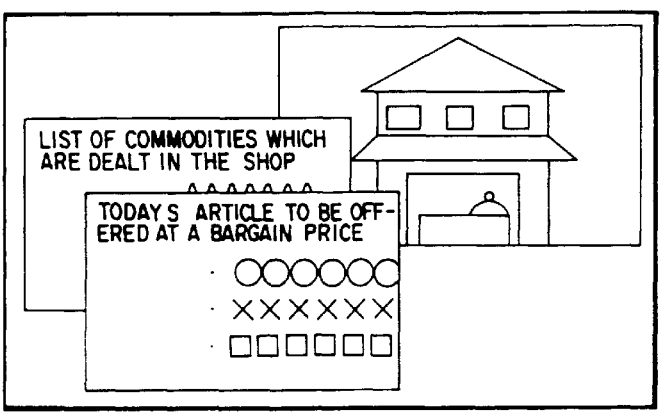
Figure 33C:
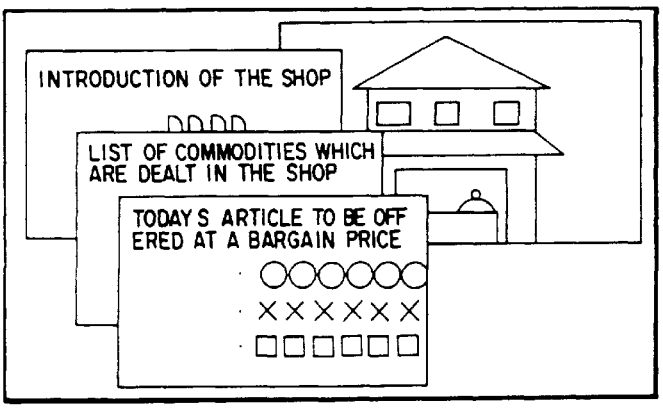

FIGS. 33A to 33C show the advertising situation which the customer receives when he/she approaches the shop. FIG. 33A is a display for "regular customers", FIG. 33B is a display for the customer who has once visited the shop, and FIG. 33C is a display for a new customer, and the advertising contents are different, respectively.

According to the 9th embodiment described above, a virtual market can be realized by using a dynamic communication section which can be realized by the 8th embodiment, and by using the call relation control section adapted to the nature of the market, efficient communication and advertising in the virtual market can be provided.

The 10th embodiment will be described with reference to FIG. 36. According to this embodiment, it is assumed that in the key information-holding section of the center station, the position and the size of the object in the virtual three-dimensional space is held as one attribute of the object.

Object A410 has GUI 452 for displaying the situation of the system to the system user and receiving the instruction to the object from the user. Also object A410 has a call relation control information-storing section CI 446 which stores the information to be referred before the call relation with other objects is established.

Object B420 is a so-called "waiting object". The key information registration section 453 of object B is used only when the object B420 is registered in the center station, and thereafter it waits for the request of communication to come from other objects.

Object C430 is a "self-propelling object", and has a position update section PU 451 for updating the position of object C in the three-dimensional space for every certain period of time.

Object B420 and object C430 are on the same user terminal T.

Next, the operation of respective sections of object A410 will be described.

The system user instructs the system to log in by operating the GUI 452. GUI 452 instructs the key information registration section KR 441 to register the network entry of the object and the attribute of the object to the center station 400. Here, it is assumed that the position and the size of the object in the three-dimensional space, and the location area of the user terminal are contained as the attribute of the object.

When the key information registration section KR 441 completes the registration, GUI 452 instructs the call relation candidates request section CR 442 to request the call relation based on the position in the three-dimensional space. The call relation candidates request section CR 442 requests the center station 400 to inform the call relation candidates based on the position in the three-dimensional space.

The network entry of the call relation candidates and the attribute thereof informed from the center station are stored in the call relation candidate-storing section CS 443. The call relation candidate-storing section CS 443 informs the update of the call relation candidates to the call relation control section CC 445. The call relation-storing section COS 444 stores the call relation which is now established, but at the time of log-in, it is a matter of course that the call relation is not stored in the call relation-storing section COS 444. The call relation control section CC 445 can retrieve the call relations stored in the call relation-storing section COS, to examine if any specific call relation is established or not.

The call relation control information-storing section CI 446 stores the objects with whom the conclusion of the call relation is inhibited. It may be specified by the network entry of the object, or may be specified by the attribute of the object. To be specified by the attribute of the object means that "the call relation is not established with the object having (not having) certain attribute". The call relation control informations stored in the call relation control information-storing section CI 446 is set up by the user. The call relation control section CC 445 can retrieve the call relation control informations stored in the call relation control information-storing section CI 446 to examine if conclusion of a specific call relation is allowed or not. When users set up properly the call relation control informations, they can utilize the call relation control information-setting section as follows:

(1) Not to establish the call relation with acquaintances or friends having private company, at the time of access to the system on business.

(2) Not to establish the call relation for certain period of time with an unfavorable person whom the user met before.

Figure 24:
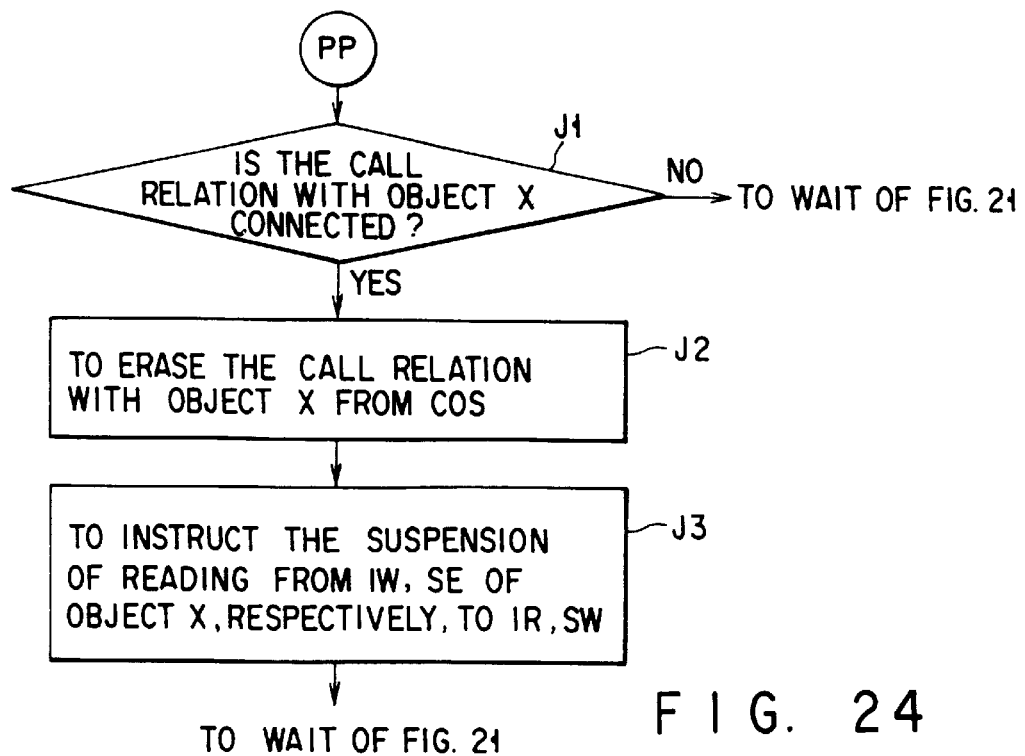
FIG. 24 is a flow chart showing the algorithm of the relation control.

The operation of the call relation control section CC 445 is similar as that of flow charts shown in FIGS. 21 or 24. Namely, the image (acoustic) information-storing section IW (SW) 448 (450) stores the image data (acoustic data) related to the object, and transmits the stored data in response to the access through the network.

The image (acoustic) information read section IR (SR) 447 (449) reads the image (acoustic) data from the network entry of the image (acoustic) information-storing section IW (SW) 448 (450) given from the call relation control section CC 445. When the call relation control section CC 445 instructs the image (acoustic) information read section IR (SR) 447 (449) to suspend the data read, the image (acoustic) information read section IR (SR) 447 (449) suspends the read if it is now reading, and disconnects the connection with the image (acoustic) information-storing section IW (SW) 448 (450). If it is not reading, nothing is performed. The image information read section IR 447 sends the read-out image data to GUI 452, and GUI 452 displays it. The acoustic data read by the acoustic information read section SR 449 is sent to the acoustic data reproduction device of the user terminal, and reproduced therein.

The operations of respective sections of object B420 and object C430 are similar to those of respective sections of object A410. However, object C430 has a position update section PU 451 for updating the position of object in the three-dimensional space for every certain period of time. The position update section PU 451 changes the attribute of the object, which is the position in the three-dimensional space, and instructs the key information registration section KR 451 to register the new attribute in the center station. Then it instructs the call relation candidate request section CR 445 to request new call relation candidates. It is because the object to establish the call relation should have been changed due to the change of position.

When the user changes the position through GUI 452 in object A419, the call relation must be updated similarly. This procedure is realized by the instructions to the key information registration section KR 441, and then to the call relation candidate request section CR 442, as in the case of object C430.

Next, the operations of respective sections of the center station 400 will be described.

The key information-holding section 453 holds the network entry and the attribute sent from the key information registration section KR 441 of the object in a list such as shown in FIG. 37. Hash table is formed with regard to some general attributes for convenience of retrieval and registration. The call relation candidate-determining section 454 retrieves the list of the key information-holding section 453 in response to the request from the call relation candidate request section CR 442 of the object, determines the call relation candidate relating to said object, and sends it to the call relation candidate-informing section 455. The request from the call relation candidate request section CR 442 is given, for example, in the following form:

GETNB object name (3d, d)
GETNB object name (3d, d), (loc, T city)
wherein d represents a real number. The first request requests to give the call relation candidates within the distance d from the center of said object in the virtual three-dimensional space. In the second example, in addition to it, it requests the call relation candidate objects whose terminal location area is T city.

The call relation candidate-informing section 455 transfers the list of the call relation candidates sent from the call relation candidate-determining section 454 to the call relation candidate-storing section CS 443 of said object with the attributes thereof.

By the system according to the embodiment described above, GUI 452 of object can present the network resources in the form, for example, shown in FIG. 38. It is seen that object C430 looks like a facility such as a two-storied house, and object B420 looks like a tortoise. Moreover, the sound of piano from the house and murmur of tortoise are reproduced from the speaker of the user terminal T.

When the system user of terminal T wants to display only objects whose terminal locates in T city, the user has only to instruct the call relation candidates request section CR 442 to issue the second GETNB command described above through GUI 452. Alternatively, the following method may be used. Namely, the call relation control information is set up so that the call relation control information-storing section CI 446 displays only objects located in T city. Then, instruct the call relation control section CC 445 to scan the call relations stored in the call relation-storing section COS 444 to check if the call relation control information is satisfied or not, and to disconnect the call relations which do not satisfy the control information. According to this method, desired display can be easily obtained without access to the center section.

Next, the 11th embodiment will be described. This embodiment assumes that network users and the objects connected to the network want to obtain some information through the network communication from other network users and objects, respectively, or have some knowledge or information to give others, and wants to give it through the network communication to other network users and objects. One example of attributes to be registered to the center station by the key information registration section of object A will be as follows.

(KNOW (mathematics (geometry (topological manifold (homology theory, homotopy theory))))),
(KNOW (mathematics (computer mathematics theory of computation))),
(ASK (computer (numerical analysis (structural analysis, multivariate analysis)))),
(INTEREST (music (classical music (Mozart (the Romanticists Brahms))))

Namely, this object has knowledge of geometry and computer mathematics among mathematics, and is ready to open it to the public. With regard to mathematics, it has knowledge relating to geometry, particularly, homology theory and homotopy theory of topological manifold. Furthermore, with regard to computer mathematics, it has knowledge relating to theory of computation. Furthermore, this object asks the knowledge relating to the computer. What is required is the knowledge relating to structural analysis and multivariate analysis among numerical analysis. Also, this object (namely, the user who is accessing to the network through this object) has an interest in classical music, and likes Mozart and Romantic school, particularly Brahms.

It is assumed that GETNB command as described below is issued from the call relation candidate request section of other object A' to the key control device.

GETNB object name, (ASK (painting impressionist school)), (INTEREST Mozart), by (INTEREST Mozart), it is seen that object A' has an interest in Mozart. Therefore, the call relation candidate-determining section of the center station determines the call relation candidate including object A, and the call relation candidate-informing section informs it to object A'. Accordingly, by the mechanism described in the third embodiment, the call relation is established between object A' and object A. The call relation-informing section also send the registered attribute of object A, therefore in the call relation candidate-storing section of object A', the attribute of said object A is stored. The users of object A' refer to it properly, and, for example, can know that object A asks the knowledge relating to structural analysis. Since the user of object A' knows a specialist of structural analysis, he/she can inform the access method to that person to object A.

According to the communication system according to the above 10th embodiment and 11th embodiment, network resources varying on the real-time basis can be presented in various points of view, without imparting excessive load to the center. Furthermore, the points of view can be optionally and easily switched according to the convenience of respective users.

The 12th embodiment will be described with reference to FIG. 39. According to this embodiment, it is largely divided into the office server 501 and the user work environment 511, and the communication between them is performed by the computer network. The office server 501 is composed of model server 504 and position server 508. The model server 504 comprises layout-transmitting section 505 and attendance control section 506, and these two exchange informations with the virtual office model 502 and the service data section 503, respectively. Furthermore, the position server 508 comprises user information control section 509 and adjacent user-transmitting section 510, and exchanges communication with position data base 507.

The office data control section 512 receives the data of office from the layout-transmitting section 505 via the network, and performs graphical display to users with user interface 517. The user data control section 513 controls the operation of users, and logs in the attendance control section 506 via the network, receives data regarding staffs from the layout-transmitting section, and sends the mobile information in the virtual office to the user information control section 509, and receives the updated adjacent data from the user-transmitting section 510. Also the user data control section 513 controls the communication with other workers, and displays a person graphically to the user with the user interface 517 based on these informations and personal image data 514. Furthermore, when the change of angle by a point of view is caused, the user data control section 513 sends data regarding the point of view to the office data control section 512, and the office data control section reflects the change on the screen.

The user work files 515 and 516 can be held locally in the user work environment 511 which is the file for works necessary for the original business of the user, or can be held via the network.

Now, respective sections in FIG. 39 will be described. FIG. 40 is an example of the virtual office model 603 in FIG. 39. The virtual office model 603 is composed of a layout data 604A in which three-dimensional graphical data is expressed hierarchically, a service rule 604B which describes the rule of service in the office, and a personnel data 604C relating to the seat of the staff in the virtual office. These data are used in the model server 504.

FIG. 41 shows an example of service data 203 in FIG. 40, in which informations relating to the remote service to the virtual office are described. This data is controlled by the attendance control section 506.

FIG. 42 is a processing flow chart of the attendance control section 506 in FIG. 39, and when the user logs in the office server 507 through the network (M1), the attendance control section 506 verifies the user with the personnel data 604C (M2). If the user is a staff thereof (M3), the attendance control section 506 informs the "attendance" to the layout-transmitting section 505 (M4), and records the time of log-in in the service data 503 (MS). Thereafter, when the user logs out, the time is recorded in the service data 503 (M7).

Figure 43:
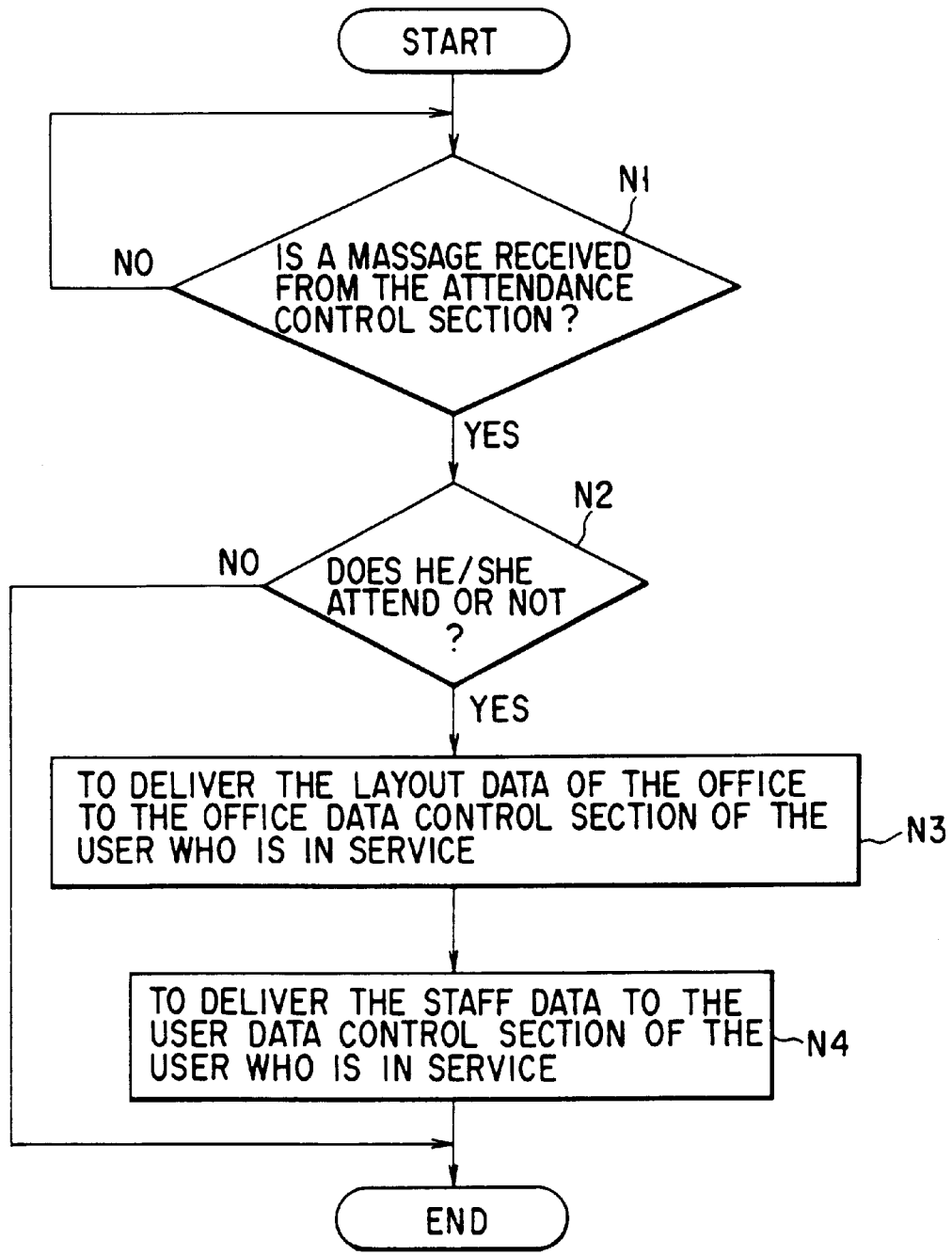
FIG. 43 is a processing flow chart of the user layout-transmitting section in FIG. 39.

FIG. 43 is a processing flow chart of the layout-transmitting section 505 in FIG. 39, and when the layout-transmitting section 505 receives the message of "attendance" from the attendance control section 506 (N1), it picks out a layout data 604A from the virtual office model 602, and transmits the data to the office data control section 512 kept in the environment of the user (N3). At the same time, the personnel data 604C is transmitted to the user data control section 513 (N5).

Figure 44:
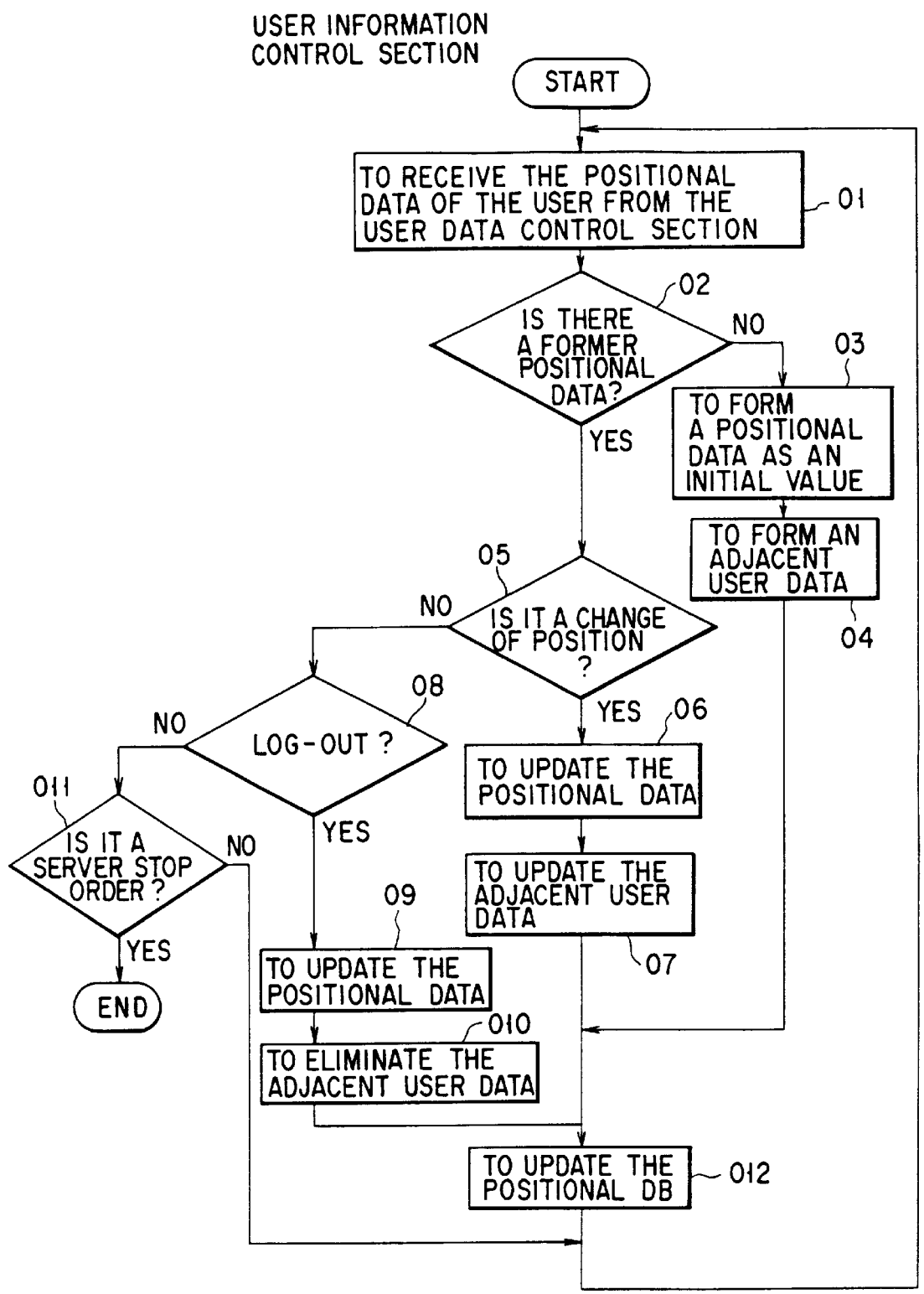
FIG. 44 is a processing flow chart of the user information control section in FIG. 39.

FIG. 44 is a processing flow chart of the user information control section 509 in FIG. 39. The user information control section 509 receives the positional data or the log-out information of the user on the virtual office from the user data control section 513 (O1). When the user "come to the office", whether there is a former positional data or not is checked (O2) to form a positional data as the initial value (O3), and an adjacent user data is also formed (O4). Whether the user changes the position on the virtual office or not is checked (O5), and if there is any change, the positional data is updated (O6), and the adjacent user data is also updated (O7). If the user logs out or not is checked (O8), and if there is any change, the positional data and the adjacent user data are eliminated (O9–O12). The change of these data is reflected on the positional data base 507.

Figure 45:
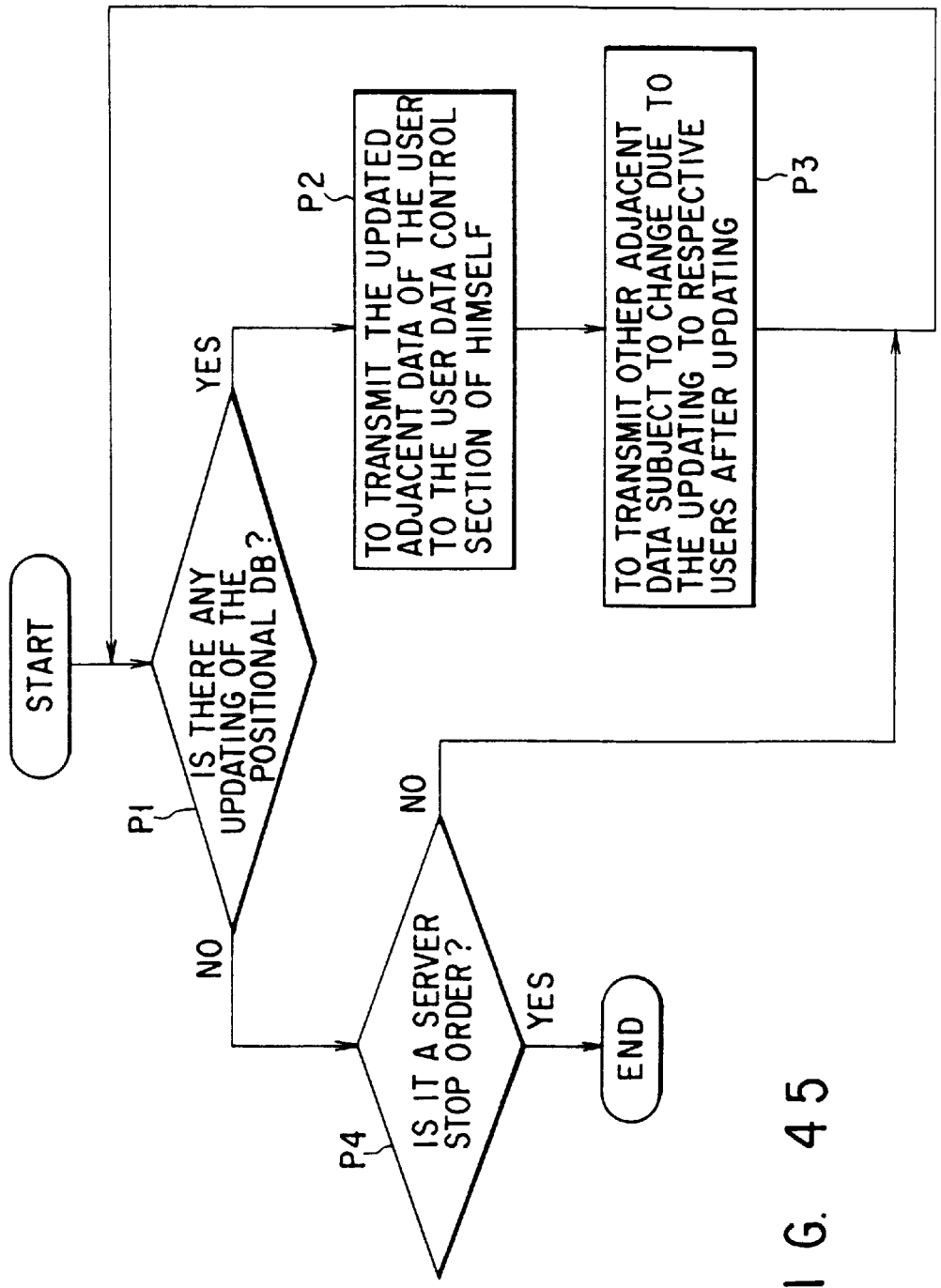
FIG. 45 is a processing flow chart of the adjacent user-transmitting section in FIG. 39.

FIG. 45 is a processing flow chart of the adjacent user-transmitting section 510 in FIG. 39. The adjacent user-transmitting section 510 monitors whether the positional data base 507 is updated or not (P1), and if there is any update, a new adjacent data is transmitted via the network to the user who updated the positional data (P2), and new adjacent data are transmitted to all users who received update of the adjacent data in the other workers (P3). When the positional data base is not updated, whether there is a server stop order or not is checked (P4), and if there is an order, processing is completed, and if not, return to step (P1).

FIGS. 46A and 46B are data examples of the positional data base 507 in FIG. 39. The positional data base 507 is composed of a positional data 507A in FIG. 46A and an adjacent data 507B in FIG. 46B. In the positional data 507A, address on the network of the worker, coordinates data on the virtual office, and the adjacent data name of the worker are described, and in the adjacent data 507B, the coordinates on the virtual office of all workers existing in the vicinity of the worker and the addresses on the network are described. These data are updated every time there are update of positions, event such as "attendance", "quitting" and the like by the user information control section 509.

Figure 47:
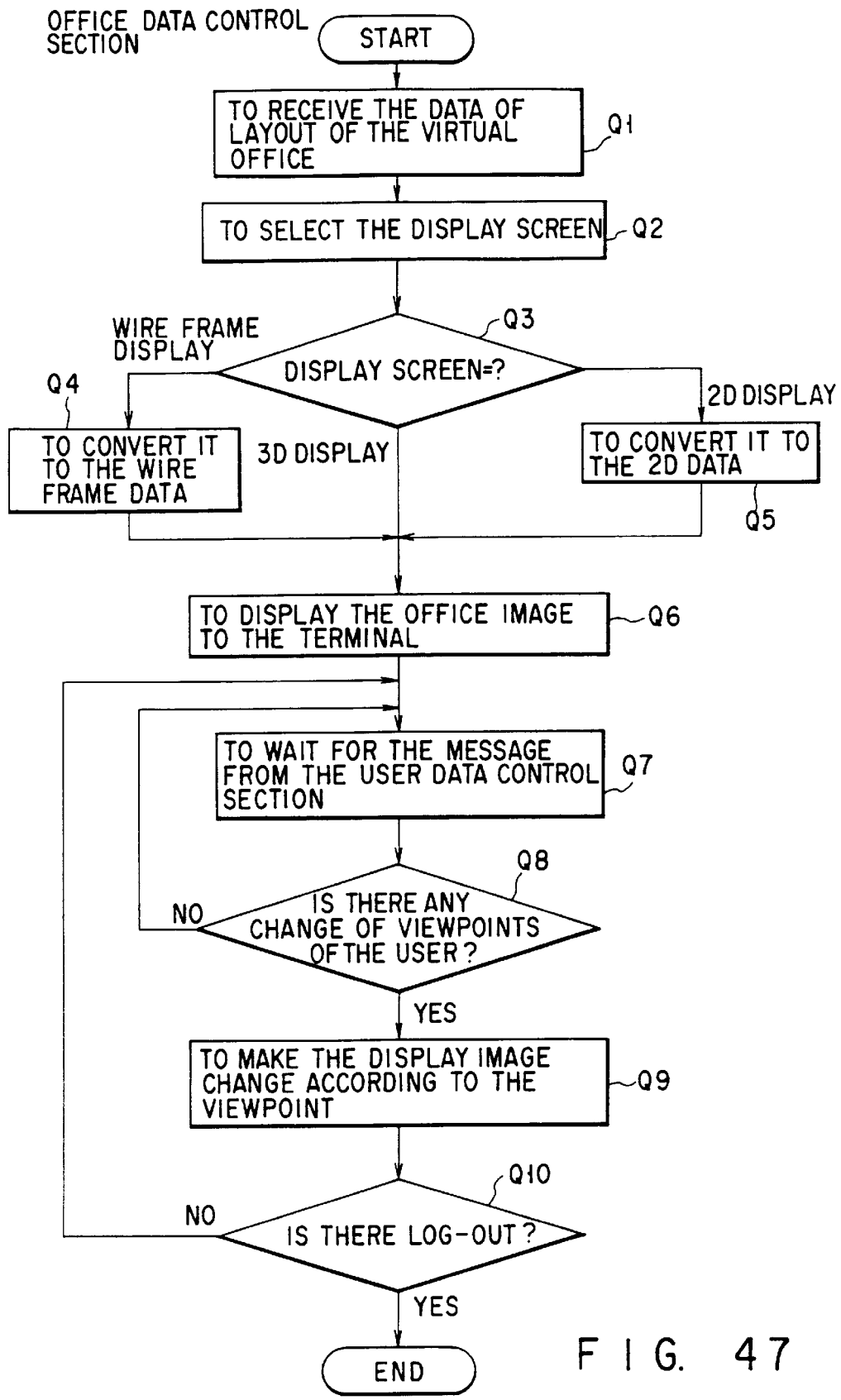
FIG. 47 is a processing flow chart of the office data control section in FIG. 39.

FIG. 47 is a processing flow chart of the office data control section 512 in FIG. 39. When the office data control section 512 receives the layout data from the layout-transmitting section 505 (Q1), it converts the data into a display method specified by the user for display (Q2–Q6). Thereafter, it changes the display of the virtual office according to the message regarding the change of viewpoints from the user data control section 513 (Q7–Q10).

Figure 48:
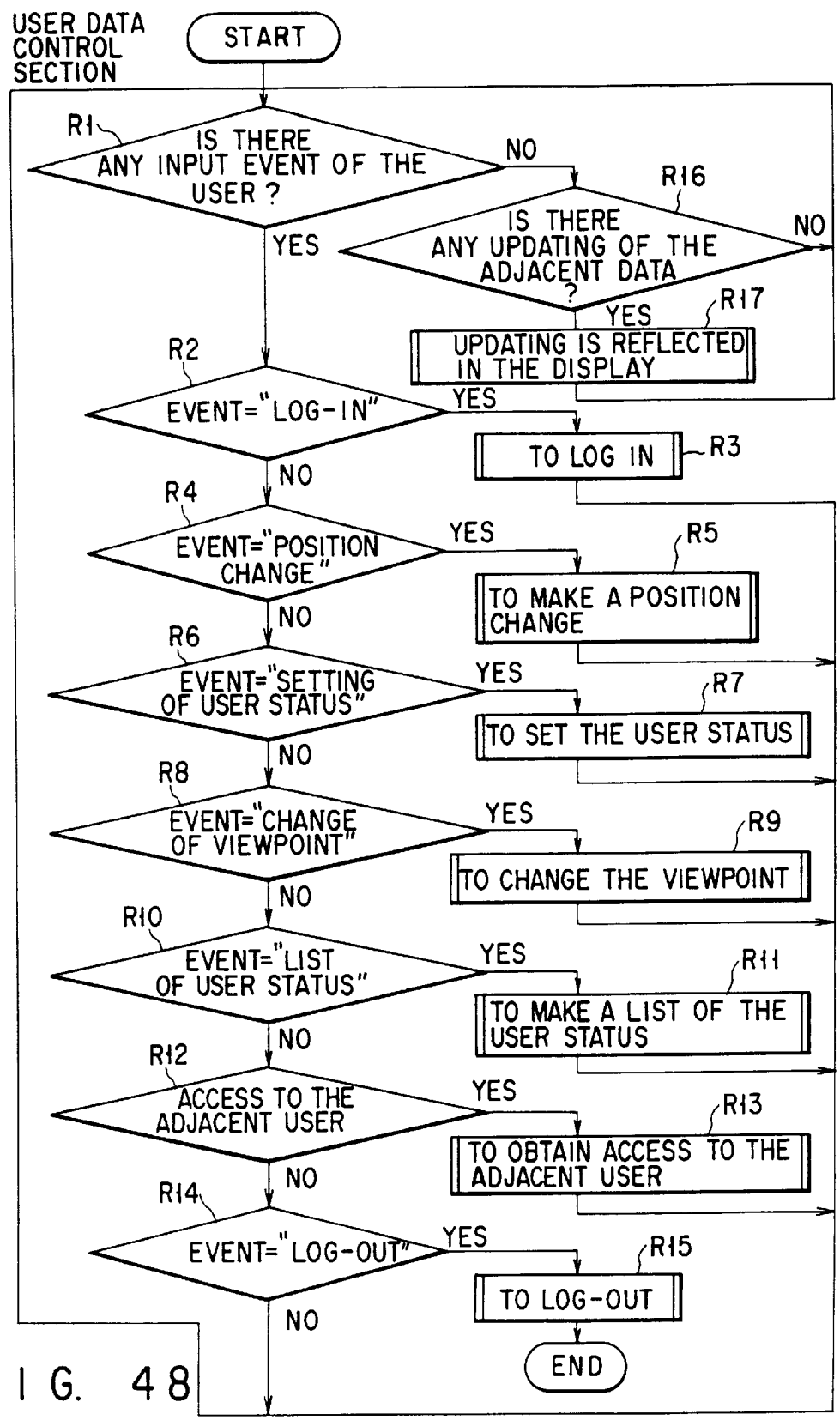
FIG. 48 is a processing flow chart of the user data control section in FIG. 39.

FIG. 48 is a processing flow chart of the user data control section 513 in FIG. 39. The user data control section 513 performs respective processings for every event. Namely, whether there is an input event or not is confirmed (R1), and when it is YES, the processings for confirmation of steps R2, R4, R6, R8, R10, R12 and R14 are conducted sequentially, and processings corresponding thereto R3, R5, R7, R9, R11, R13 and R15 are conducted. If there is no event, whether there is any update of adjacent data or not is confirmed (R16), and when it is YES, display of update is performed (R17).

Figure 49:
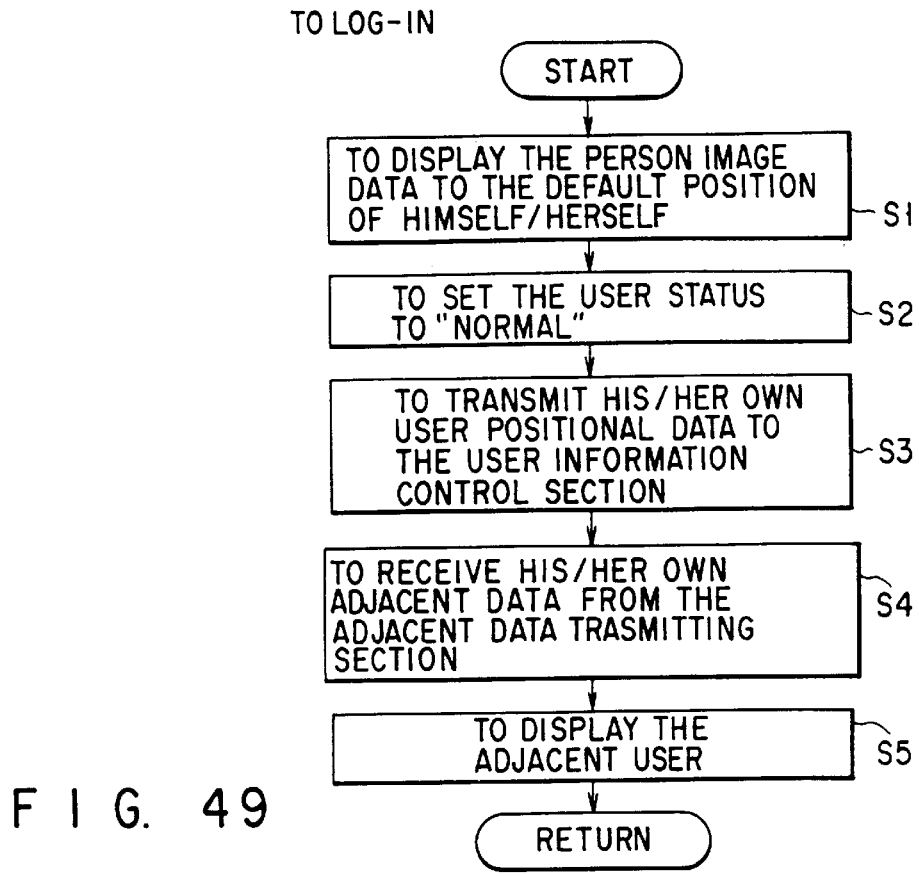
FIG. 49 is a processing flow chart of the log-in processing in FIG. 48.

FIG. 49 is a processing flow chart of the log-in processing R3 in FIG. 48. When the log-in event is received, a person image is taken out from the person image data 514, and displayed in the virtual office based on the personnel data 604C (S1). The value of the user status is set to "Normal" which capable of communicating with other workers (S2), and the positional data is transmitted to the user information control section 509 (S3). Newly formed adjacent data is received from the adjacent user-transmitting section (S4), and the adjacent user is displayed on the virtual office (S5).

Figure 50:
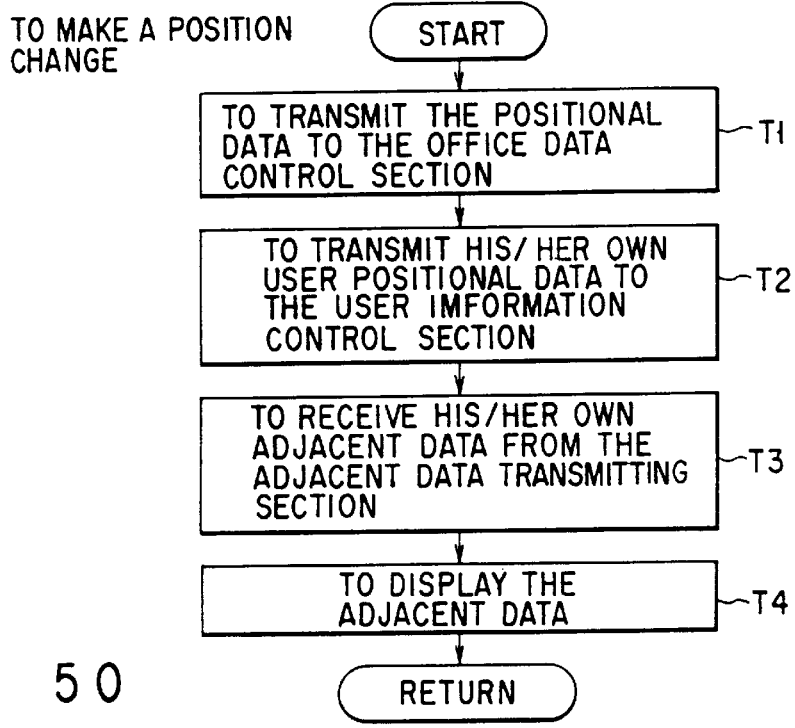
FIG. 50 is a processing flow chart of the position change processing in FIG. 48.

FIG. 50 is a processing flow chart of the position change processing R5 in FIG. 48. When the position change event is received, the positional data is sent as a change of viewpoint to the office data control section 512 (T1), and at the same time the positional data is transmitted to the user information control section 509, and the updated adjacent data is received from the adjacent data-transmitting section 510 and reflected on the screen (T2–T).

Figure 51:
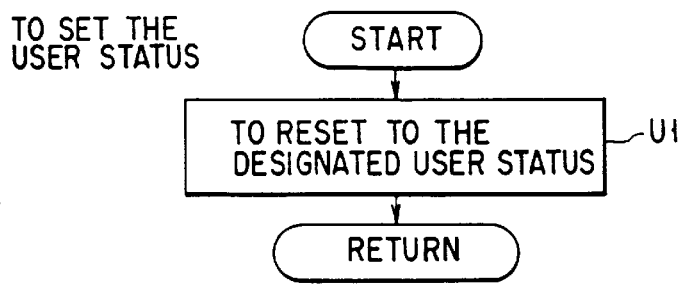
FIG. 51 is a processing flow chart of the user status processing in FIG. 48.

FIG. 51 is a processing flow chart of the user status processing R11 in FIG. 48. When it is reset to the specified user status (U1), for example, the value of the user status is set to "conversation not possible", conversation with other persons can be rejected, on the contrary, if it is set to "Nor-mal", it is possible to declare to other people that conversation is now possible. Furthermore, during conversation, the display becomes automatically "the line is busy". During conversation, attributes of "participation is possible" which allows participation of the third party and "participation is not possible" which does not allow other people's participation can be given.

Figure 52:
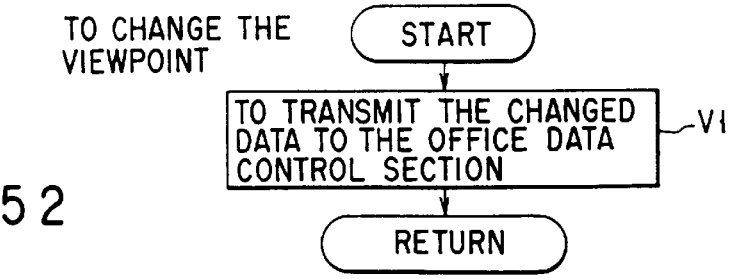
FIG. 52 is a processing flow chart of the "change of viewpoint" processing in FIG. 48.

FIG. 52 is a processing flow chart of the processing R9 to change the viewpoint in FIG. 48. According to this processing, at step S (V1), the change of viewpoint without shift of position to the virtual office is transmitted to the office data control section 512.

Figure 53:
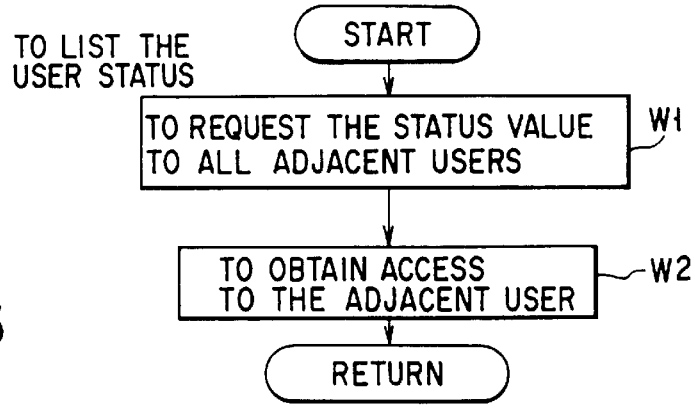
FIG. 53 is a processing flow chart of the "making a list" processing of the adjacent user status in FIG. 48.

FIG. 53 is a processing flow chart of the processing R11 to make a list of the adjacent user status in FIG. 48. By this event, the value of user status of the currently adjacent user is inquired to respective user work environments through the network (W1), and the value is displayed on the screen (W2).

FIGS. 54A and 54B are processing flow charts of the access processing R13 to the adjacent user in FIG. 48. In this processing, whether there is any request for status value or not is confirmed (X1), and if there is any request, the value is sent (X2–X4). If there is no request, whether any request for conversation is received from outside or not is confirmed (X5), and if it is YES, whether the status is "conversation is not possible" or "the line is busy (participation is not possible)" is confirmed sequentially (X6, X7), and if these steps X6 and X7 are YES, only there is a request or not is informed (X8), otherwise, conversation is started (X13–X18). On the contrary, when the user accesses to other user (X9), the status of the other party is similarly confirmed whether it is "conversation is not possible", or "the line is busy (participation is not possible)" (X10, X1, X12), and if it is YES, only there is a request or not is informed (X13), otherwise, the conversation is similarly started. In addition, the user can determine during conversation whether participation of the third party is allowed or not (X15–X14), thus can control the conversation.

Figure 55:
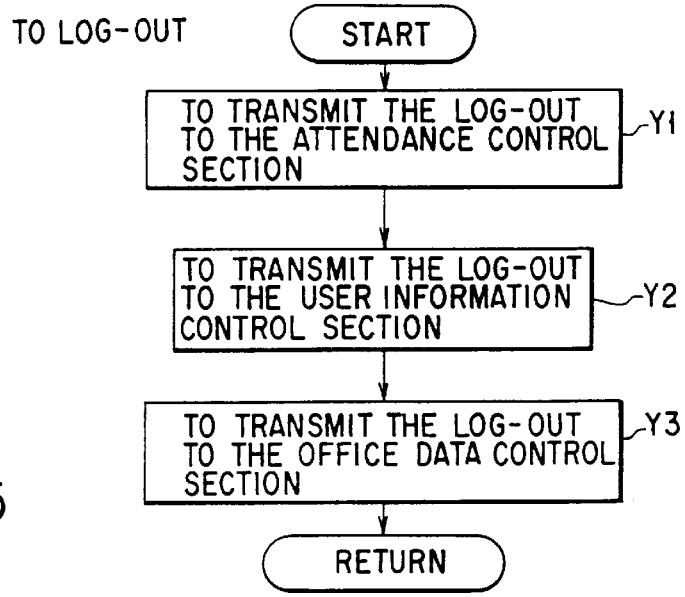
FIG. 55 is a processing flow chart of the log-out processing in FIG. 48.

FIG. 55 is a processing flow chart of the log-out processing R15 in FIG. 48, and according thereto, the log-out message is transmitted to the attendance control section 506, the office data control section 512, and the user information control section 509 at steps Y1, Y2 and Y3, respectively.

Figure 56:
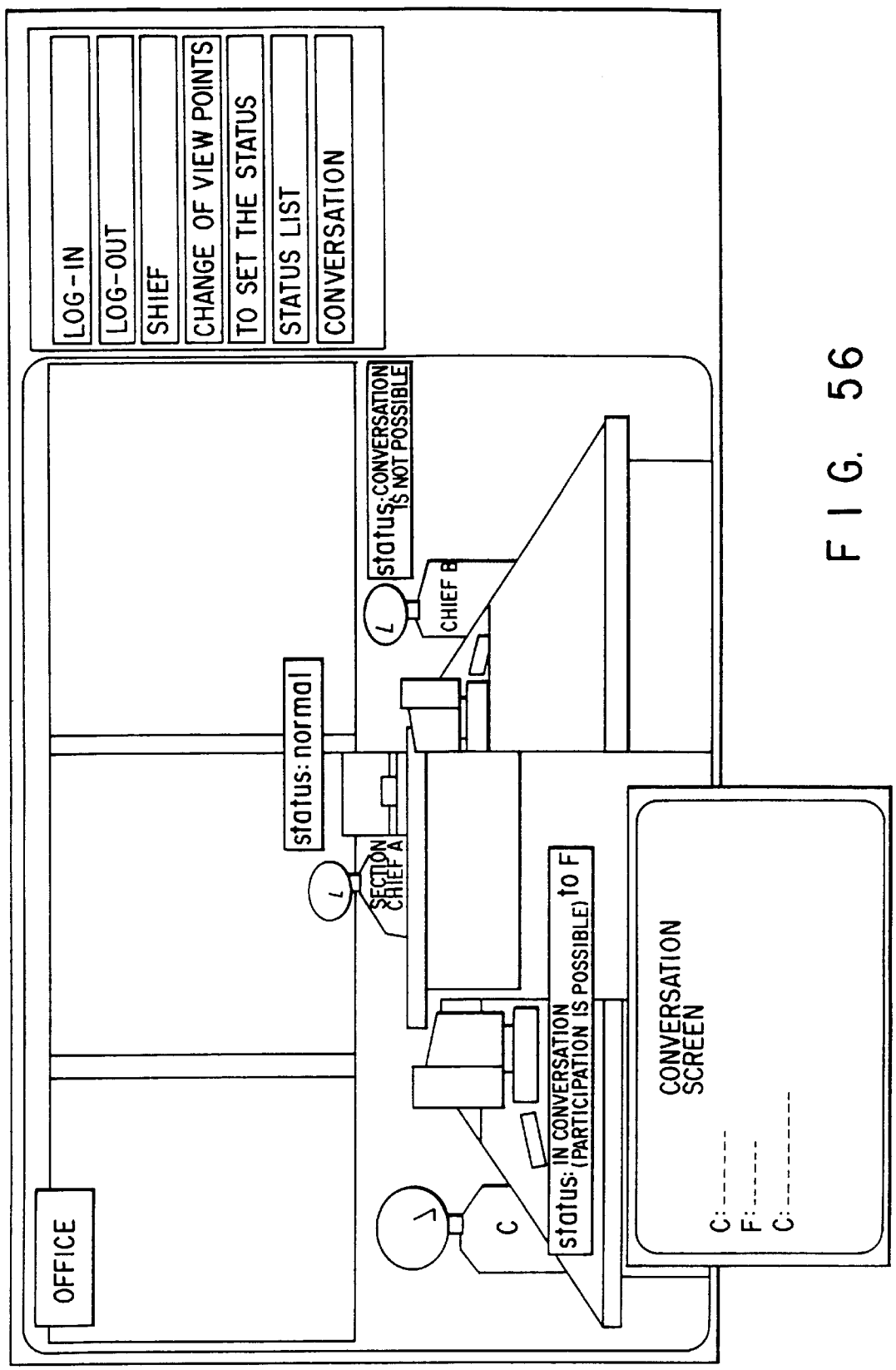
FIG. 56 is a view showing a display example of the virtual office.

FIG. 56 is a display example of the virtual office realized by the present invention, and according to this sample, four people are now working, and it shows that the user F and a fellow worker C are in conversation now.

Figure 57:
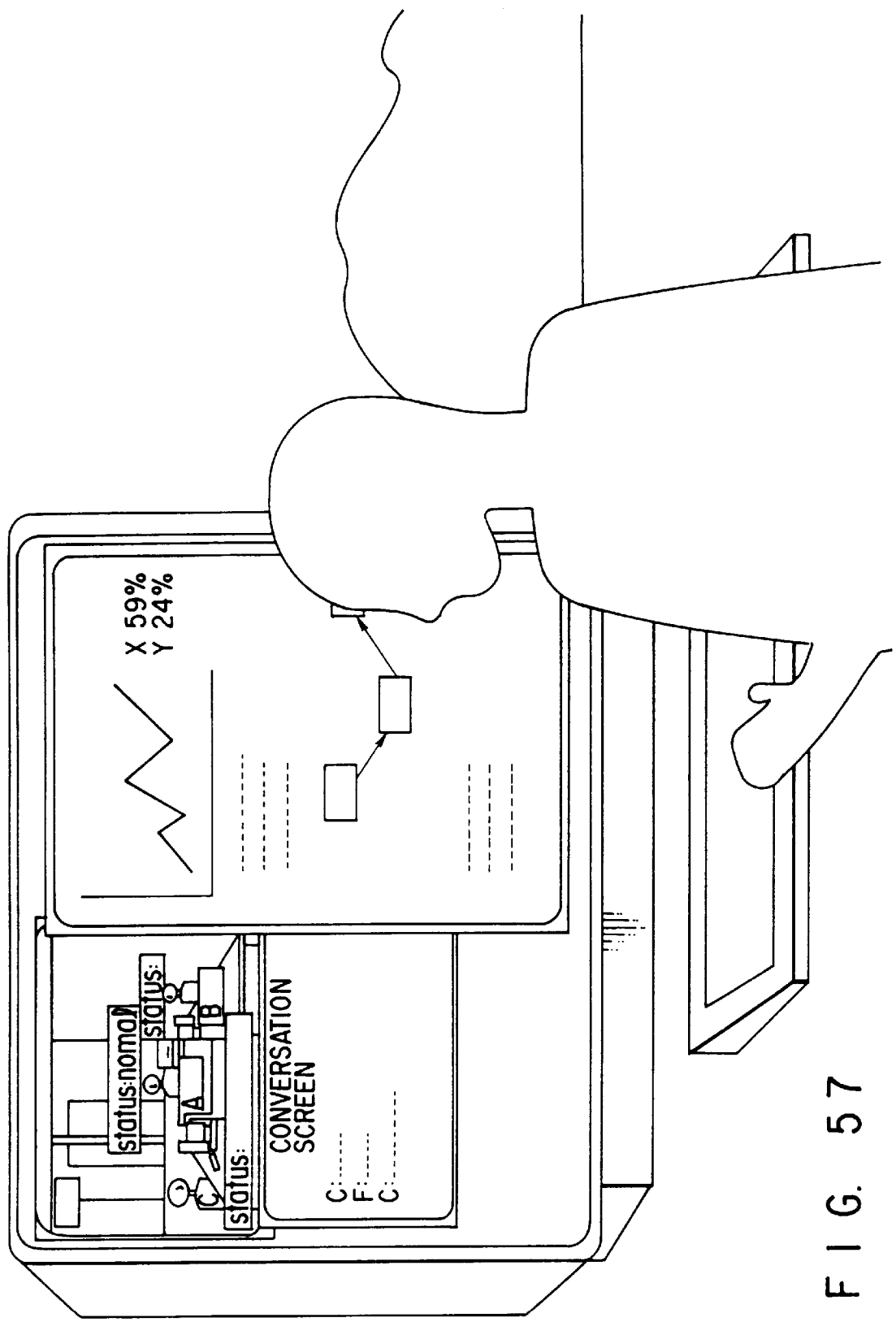
FIG. 57 is a view showing the circumstances of the remote servicing.

FIG. 57 is a view showing the situation of the remote service realized by the present invention, and the situation of fellow workers who work in the virtual office can be seen, and the user can feel that the fellow workers are working even from the remote area, thus psychological effect can be obtained to keep the private and public life separate. Moreover, by setting the user's own current status like Chief B, the conversation can be controlled, and the conversation of little importance and of little emergency can be deleted.

Figure 58:
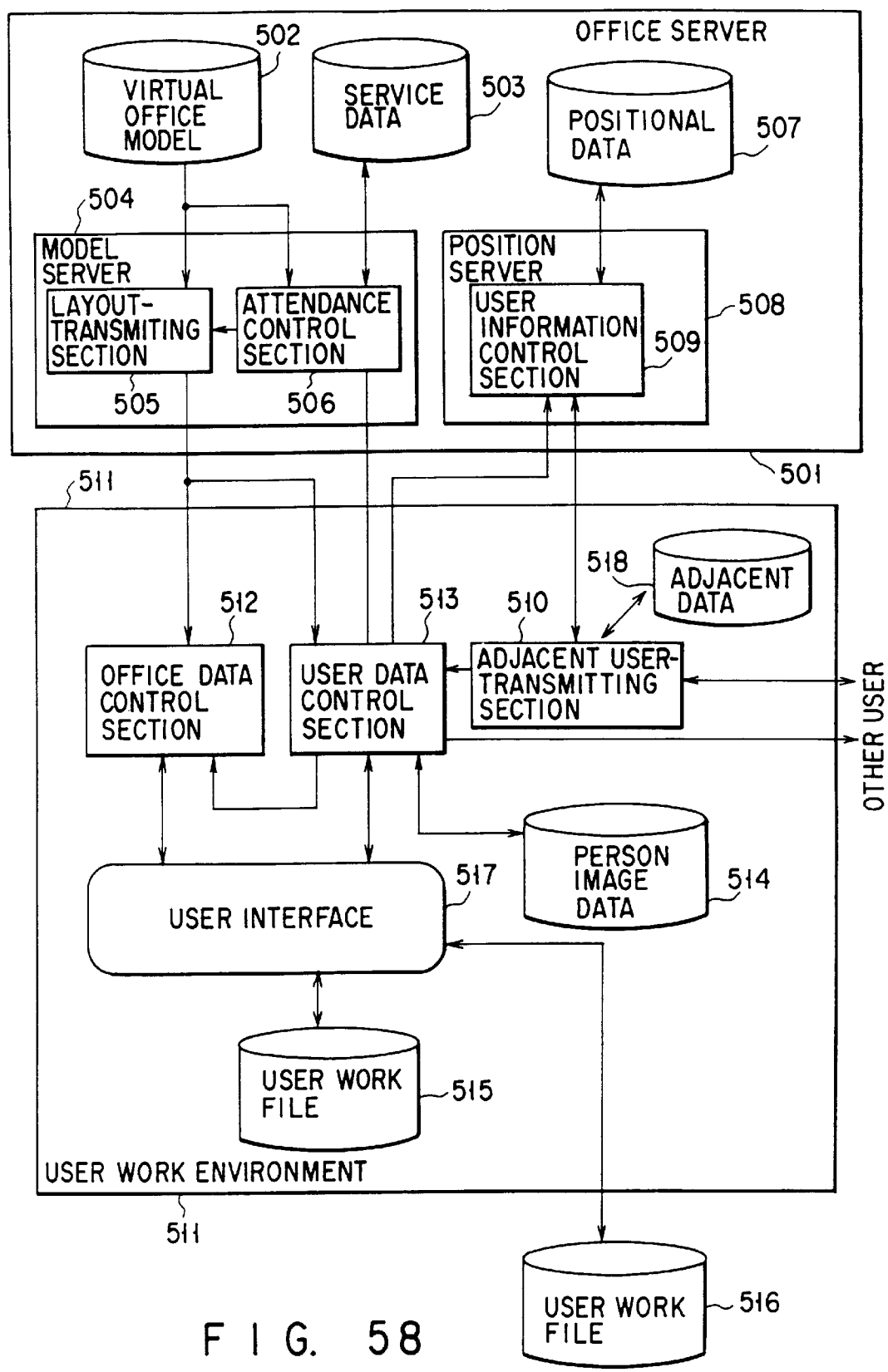
FIG. 58 is a view showing the communication system in which the processing of the adjacent user-transmitting section and the adjacent data are included in the user work environment in FIG. 39.
Figure 59:
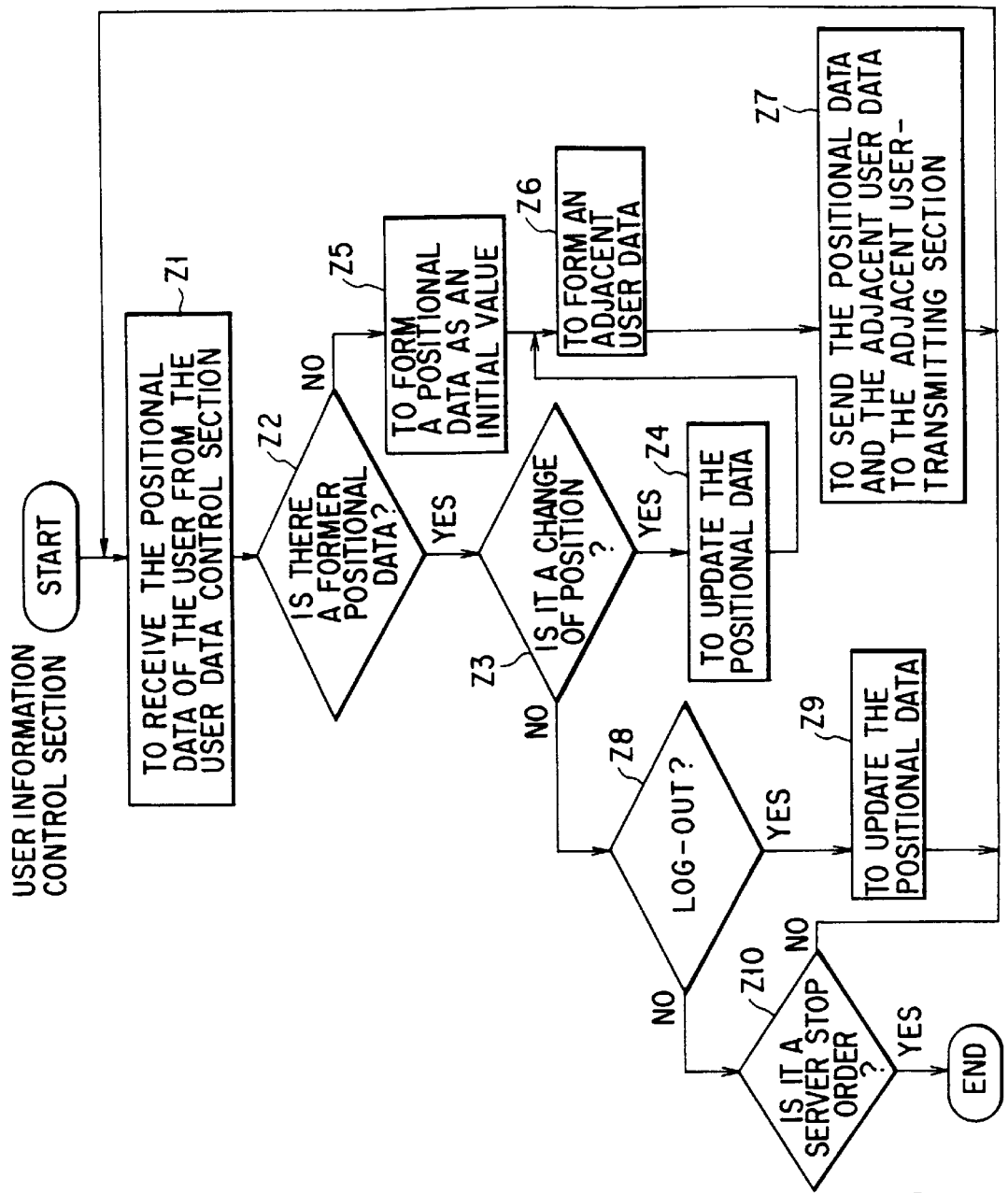
FIG. 59 is a flow chart showing the algorithm of the processing to be executed in the user information control section.
Figure 60:
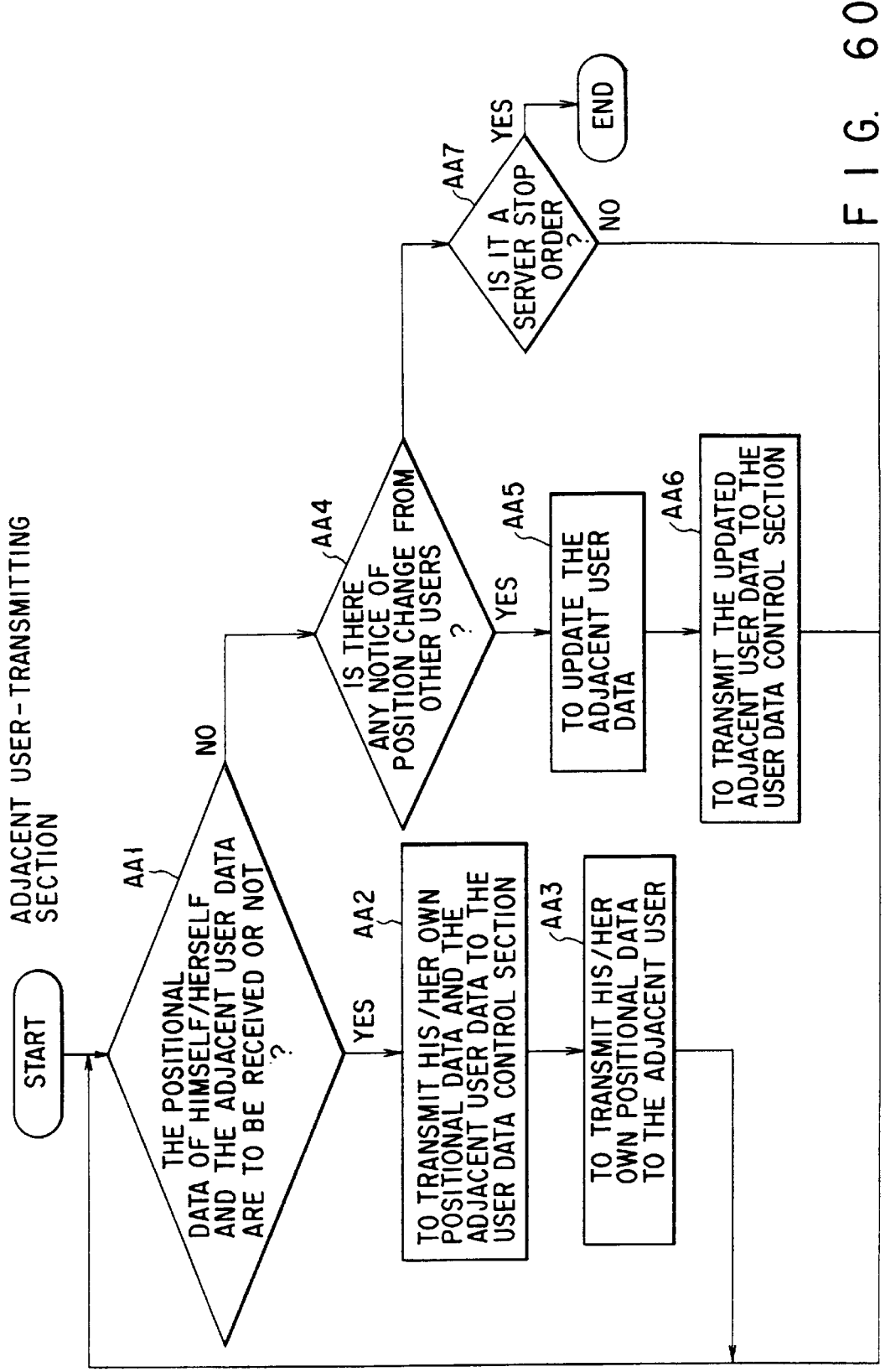
FIG. 60 is a flow chart showing the algorithm of the processing to be executed in the adjacent user-transmitting section.

Next, the 13th embodiment will be described with reference to FIG. 58. FIG. 58 shows an embodiment in which the processing of the adjacent user-transmitting section 510 in FIG. 39 and the adjacent data 518 are included in the user work environment 511. And FIG. 59 shows the algorithm of the processing executed by the user information control section 509 (Z1–Z10), and FIG. 60 shows the algorithm of the processing executed by the adjacent user-transmitting section 510 (AA1–AA7).

In the 12th embodiment, the structure is the one suitable for the case where the processing capacity of the personal terminal is low, and the office server is a computer having high capacity, and is a collective type structure in which the positional data base 507 control the data in an unified manner, and the update of the data is reflected on respective users via the server. On the other hand, this 13th embodiment has the structure suitable for the case where the processing capacity of personal terminal is high, and the office server is a computer not having extremely high capacity, which is a dispersion type structure in which only the positional data is controlled in an unified manner, and the update of the adjacent user data is reflected by the communication between respective users.

According to the above-mentioned 12th and 13th embodiments, the image of the virtual office is adjusted to the viewpoint of workers and displayed, and by displaying the situation of fellow workers who are working in the vicinity of the user therein, the user can feel that fellow workers are working even from the remote area, thus the psychological effect can be given to the user to keep the private and public life separate. Moreover, by setting the user's own current status, the conversation with fellow workers can be controlled by using the information, and the conversation of little importance and of little emergency can be deleted to provide the environment where efficient service is provided.

Figure 61:
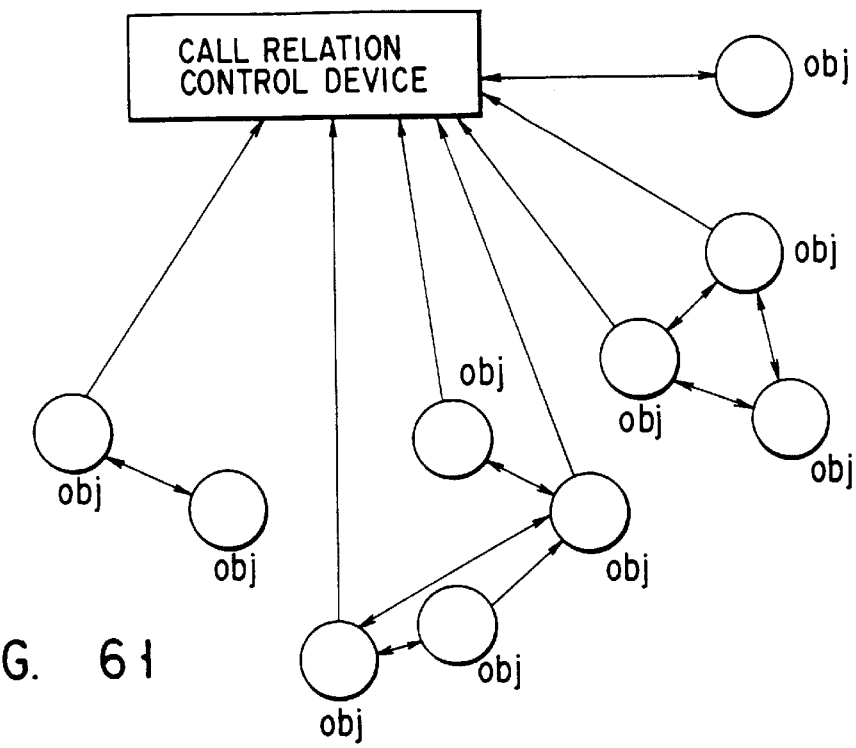
FIG. 61 is a view showing the call relation between objects.
Figure 62:
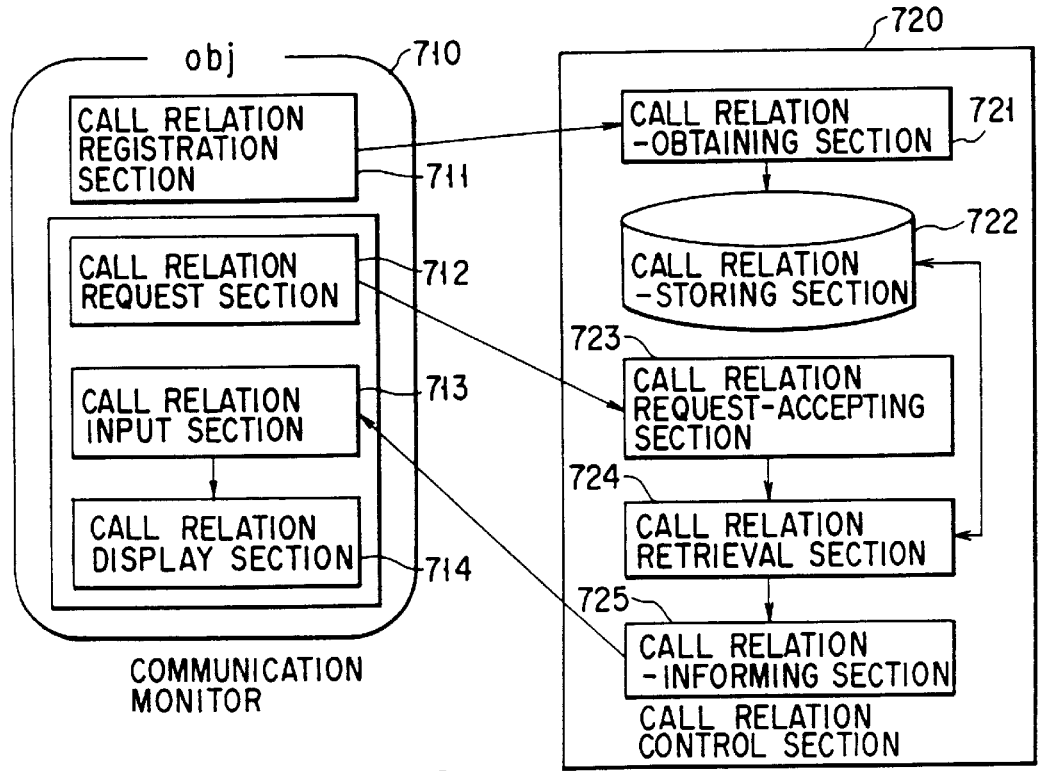
FIG. 62 is a flow chart showing the structure of the object and the call relation control device.

The 14th embodiment will now be described with reference to FIGS. 61 and 62. In this embodiment, as shown by an arrow in FIG. 61, the call relation is established between objects. Namely, the arrow running from objects toward the call relation control device shows the registration of call relations, and the arrow running from the call relation control device toward objects shows the information of call relations. In FIG. 62, the structures of object 710 and the call relation control device 720 are shown. Here, object 710 comprises a call relation registration section 711, a call relation request section 712, an input section 713 and a call relation display section 714. Also the call relation control device 720 comprises a call relation-obtaining section 721, a call relation-storing section 722, a call relation request-accepting section 723, a call relation retrieval section 724, and a call relation-informing section 725.

According to this structure, when an object establishes the call relation with other object, the call relation registration section 711 registers the call relation to the call relation-obtaining section 721 of the call relation control device 720. In this embodiment, it is assumed that the object which asked the communication registers the call relation. It is a matter of course that the object which received the communication request may register the call relation.

In order to register the call relation, for example, the following character string is transmitted to the call relation-obtaining section 721. Namely, register (A, X, 0). A represents the object ID of the object which asks the communication, and X represents the ID of the object which accepted the establishment of the communication relations. The last 0 represents that the security level is 0. The call relation-obtaining section 721 of the call relation control device 720 stores the call relation newly obtained in the call relation-storing section 722.

The operation when object A cancels the call relation with object X will be as follows. Namely, The call relation registration section 711 of A informs the cancellation of the call relation to the call relation-obtaining section 720. Concretely speaking, the character string delete (A, X) is transmitted to the call relation-obtaining section 721. The call relation-obtaining section 721 deletes the call relation information between A and X stored in the call relation-storing section 722.

In the present invention, it is assumed that the object side which cancels the call relation informs the cancellation of the call relation to the call relation device, but the object side whose call relation is canceled may inform the cancellation.

Next, the operation when the communication monitor of the object displays the call relation will be described.

First, the call relation-requesting section 712 requests the call relation to the call relation control device 720. Concretely speaking, the character string reg (A, <=, 1) is transmitted to the call relation request-accepting section 723. Here, A represent the ID of the object which issues the request, and requests that the call relation whose security level is 1 or below is informed by the remaining argument. The request from the object is sent from the call relation-accepting section 723 to the call relation retrieval section 724. The call relation retrieval section 724 finds out the call relation (group) in response to the requests in the call relation-storing section 722, and transfers it to the call relation-informing section 725. The call relation-informing section 725 transmits the list of call relations to the call relation input section 713 of the object which issued the request. It is expressed as, for example, the following character string:

(A, B, 0); (A, C, 0); (A, D, 0); (C, D, 0)
(X, Y, 0); (X, Z, 0); (Y, Z, 0); (Y, W, 0)

The call relation display section 714 of the communication monitor in the object displays the list of call relations received by the call relation input section.

Figure 63:
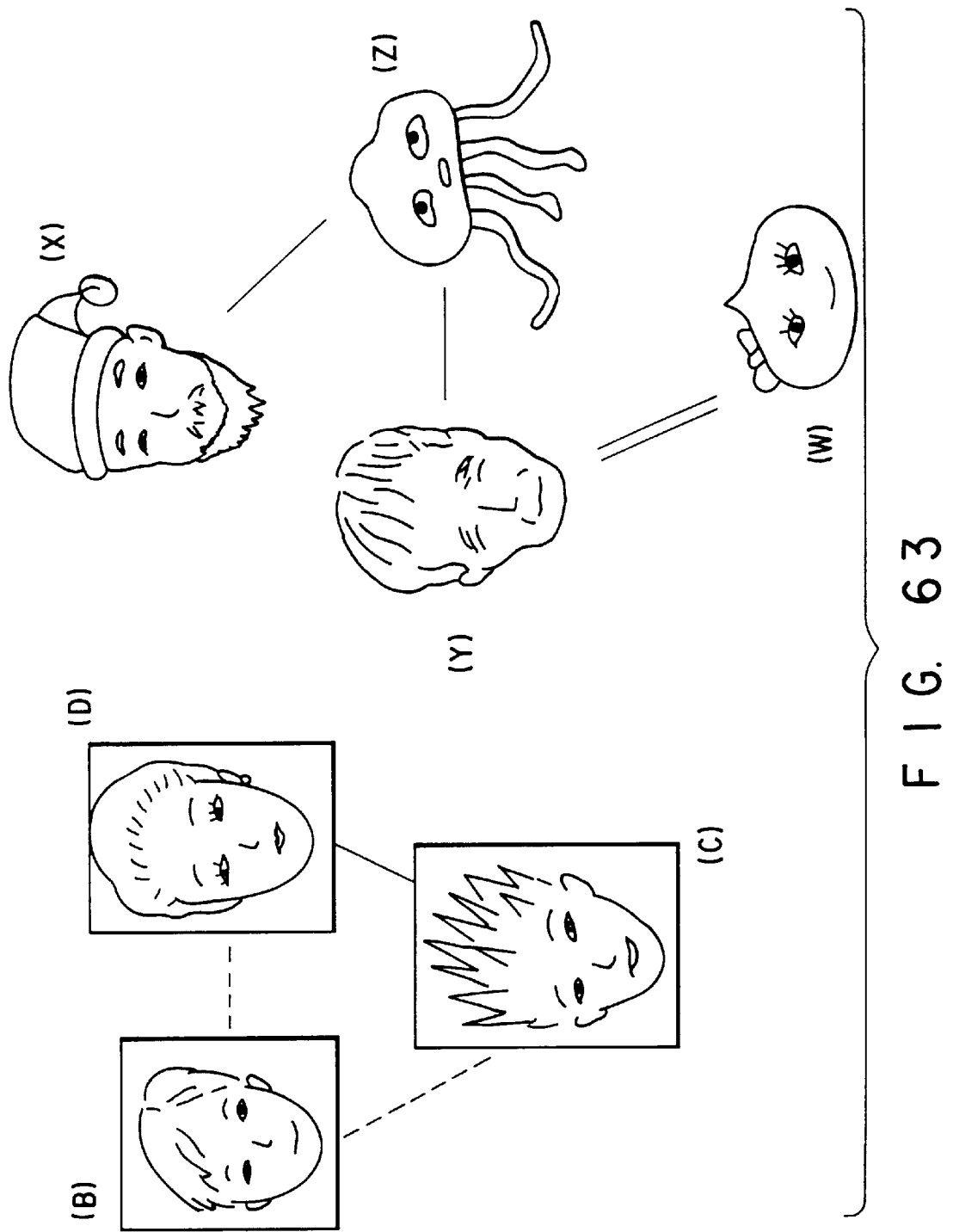
FIG. 63 is a view showing a display example of the call relation display section.

The display examples of the call relation display section 714 are shown in FIG. 63. This shows the display of said list of call relations. Namely, the conversation among A, C and D is such that the call relation is connected as a whole among three parties, thereby they can hear the conversation mutually, but cannot hear the conversation between C and D. In order to call attention thereto, between B and C, and B and D are connected by a dotted line. Furthermore, the communication between Y and W has a security level of 1, and thus separated from other communications whose security level is 0. It is shown by a double line between Y and W in FIG. 45.

According to the above embodiment, the object connected to the network obtains the call relation within the network which changes on the real-time basis according to need, and can utilize the call relation informations positively, such that, for example, the call relation between other objects can be accessed.

Next, the 15th embodiment will be described with reference to FIG. 64.

According to this embodiment, key informations 802 are input preliminarily in the center station 801 from the plural user terminals 804, 805, 806 and 807, and the key informations 802 are kept in the memory 803. Here, the key informations 802 mean, for example, as shown in FIG. 65, the position in a certain two-dimensional virtual space A of the user, the position in another one-dimensional virtual space B, the degree of interest in sports, the degree of interest in music, other hobbies, occupation, and the like. And these keys are provided with numbers for every user, and are kept with the address of a terminal used by the user.

Referring again to FIG. 64, when an user wants to connect with any other terminal, the user operates the terminal 804 to transmit the call relation request signal 808 from the call relation candidate request section 809 to the center station 801. The call relation candidate-determining section 810 in the center station 801 refers to the memory 803, considering the address of terminal 804 contained in the request signal 808, and detects the registration number of terminal 804. Then, in predetermined key informations, the call relation candidate-determining section 810 finds other terminals having a close value with that of terminal 804 in memory 803, and informs these addresses 811 to terminal 804 via the call relation candidate-informing section 812.

The algorithm to find a terminal close to terminal 804 is shown in FIG. 66, and according to it, first in step BB1, the registration number of the requester is detected from the address of terminal 804, by referring to memory 803, and this number is assumed to be nr here. Then, reset the variable n relating to the number to zero, followed by addition of 1 to n. When n differs from nr, in step BB5, the distance h between n's value $\alpha i(n)$ of a predetermined key information $\alpha i$ and $\alpha i(nr)$ is determined. If $\alpha i$ is, for example, a position in space, this distance h may use a normal euclidean distance, or if $\alpha i$ is a degree of interest in sports, this distance h may be the difference between values. Furthermore, if $\alpha i$ is the one not given by numerical value, such as hobbies or occupation, the distance is determined based on the rules of distance preliminarily determined. And, when the distance h is smaller than the threshold T, address 811 of n is output, and this is sent to the terminal 804, as described above. By repeating this procedure until n reaches the registered number N, all addresses 811 of terminals close to terminal 804 can be found in the key information $\alpha i$.

In FIG. 65, when it is assumed that terminal 804 has a number of 1, the request is for the call relation in space B, and T=500, the addresses "0010" and "0101" of number 2 and 3 are informed to terminal 804. When there are too many people than T who are close thereto, the one having small distance may be given priority, or the remainder after being thinned down at random may be informed to terminal 804.

Returning again to FIG. 64, terminal 804 stores the address 811 temporarily in memory 815, and issues the address 811 through the call relation control section 816, thereby communication between terminal 804 and other terminal is started. Here, if there is other terminal with which the user does not want to communicate, by registering it in advance to the control section 816, it can be excluded even if the address 811 contains its terminal.

The key information $\alpha i$ used for determination of the distance may be properly determined by the center station 801, or the terminal 804 may include it in the request signal 808 to specify it. Furthermore, when the user wants to communicate with a particular terminal and terminals in the vicinity thereof, the user informs the address of the terminal with which the user wants to communicate to the center station 801 by including it in the request signal 808. The determining section 810 determines the number np from the address of the terminal with which terminal 804 wants to communicate, in addition to nr.

Next, as shown in FIG. 67, variable i which means the kind of key information is set to zero, and by adding 1 thereto sequentially, the distance between $\alpha i$(np) and $\alpha i$(nr) is determined. When the distance becomes smaller than the threshold T, $\alpha i$ is determined, and thereafter the address 811 is determined as in the algorithm shown in FIG. 66. When the distance does not become smaller than T in all i, this effect is informed to terminal 804 instead of the address 811.

The user can communicate with people, for example, who are close to the user in the virtual space, or who have similar hobbies to the user, by specifying the key informations. Furthermore, by specifying the address of particular person, the user can communicate with some people so that the particular person is always included. Or, when the terminal does not specify anything, the center station 301 can determine the key information properly, thereby accidental encounter is made possible. In this case, the point that the user can communicate with people who are close to the user in some key information is the same as in the case where the user specifies the key information, therefore communication with the people who have no connection with the user does not occur.

What is claimed is:

1. A communication navigation system comprising:
   a server configured to store items of information;
   a plurality of clients configured to access an item of the information stored in the server, in which
   said server comprises,
      means for acquiring items of user information of clients which access a specific item of the information accessed by one of said plurality of clients; and
      means for supplying the items of the user information of clients acquired by said acquiring means to said one of said plurality of clients, and
   said one of said plurality of clients comprises,
      means for displaying the items of the user information supplied from said server,
      means for selecting a desired item of the user information displayed, and
      means for settling a communication with a client corresponding to the desired item of the user information selected,
   wherein each of said items of the user information comprises a photograph of a user of the clients which access the specific item of the information.

2. The system according to claim 1, wherein said server comprises:
   means for storing common data which are commonly shared by the clients which access the specific item of the information.

3. The system according to claim 2, wherein said one of said plurality of clients further comprises:
   means for displaying the desired item of the user information selected.

4. A communication navigation system comprising:
   a server configured to store items of information;
   a plurality of clients configured to access an item of the information stored in the server, in which
   said server comprises,
      means for acquiring items of user information of clients which access a specific item of the information accessed by one of said plurality of clients; and
      means for supplying the items of the user information of clients acquired by said acquiring means to said one of said plurality of clients, and
   said one of said plurality of clients comprises,
      means for displaying the items of the user information supplied from said server,
      means for selecting a desired item of the user information displayed, and
      means for settling a communication with a client corresponding to the desired item of the user information selected,
   wherein the items of the information stored in said server is represented by a hypertext markup language.

5. A communication navigation system comprising:
   a server configured to store items of information;
   a plurality of clients configured to access an item of the information stored in the server, in which
   said server comprises,
      means for acquiring items of user information of clients which access a specific item of the information accessed by one of said plurality of clients; and
      means for supplying the items of the user information of clients acquired by said acquiring means to said one of said plurality of clients, and
   said one of said plurality of clients comprises,
      means for displaying the items of the user information supplied from said server,
      means for selecting a desired item of the user information displayed, and
      means for settling a communication with a client corresponding to the desired item of the user information selected,
   wherein said server further comprises:
      means for forming a server system using the clients which access the specific item of the information and said one of said plurality of clients; and
      means for forming a reproduction of the server system as a new server system based on the user information of the clients which access the specific item of the information.

6. The system according to claim 5, wherein the items of the information stored in said server is represented by a hypertext markup language.

7. A communication navigation system comprising:
   a server configured to store items of information;
   a plurality of clients configured to access an item of the information stored in the server, in which
   said server comprises
      means for acquiring items of user information of clients which access a specific item of the information accessed by one of said plurality of clients; and
      means for supplying the items of the user information of clients acquired by said acquiring means to said one of said plurality of clients, and
   said one of said plurality of clients comprises,
      means for displaying the items of the user information supplied from said server,
      means for selecting a desired item of the user information displayed, and
      means for settling a communication with a client corresponding to the desired item of the user information selected,
   wherein said server comprises:
      means for forming a server system using the clients which access the specific item of the information and said one of said plurality of clients;
      means for forming at least two reproductions of the server system as new server systems based on the user information of the clients which access the specific item of the information; and
      means for merging said new server systems based on the user information of the clients which access the specific item of the information.

8. The system according to claim 7, wherein the items of the information stored in said server is represented by a hypertext markup language.

9. A communication system comprising:
   plurality of terminal stations; and
   a center station, in which each of said terminal stations comprises:
      means for supplying an attribute thereof to said center station;
      call relation candidate-storing means for storing call relation candidates supplied from said center station; and call control means for controlling communication with another terminal station indicated by one of the call relation candidates, and said center station comprises, storing means for storing the attribute of each of said terminal stations supplied from each of the terminal stations;

call relation candidate-determining means for determining call relation candidates upon request from one of the terminal stations based on the attribute thereof; and call relation candidate-determining means for informing the call relation candidates determined by said candidate-determining means to said one of the terminal stations.

10. The system according to claim 9, wherein said center station further comprises means for supplying a virtual market scene image to the terminal stations, the virtual market being formed of plural terminal stations acting as shoppers, and said call control means of one of said plural terminal stations comprises means for inhibiting communication with other terminal stations acting as the shoppers.

11. A system according to claim 9, wherein said center station further comprises means for supplying a virtual market scene image to the terminal stations, the virtual market being formed of first terminal stations acting as shoppers and a second terminal station acting as a salesclerk, and said call control means of said second terminal station comprises means for supplying a commercial message to the first terminal stations in accordance with the attribute of the first terminal stations, the attribute representing an importance level of shoppers.

12. A virtual office system comprising:

a server for providing a virtual office scene image;

a plurality of terminals connected to said server, configured to display the virtual office scene image including images of said plurality of terminals, each of said plurality of terminals has attribute data indicating a position of a user thereof and comprising means for designating another terminal in the virtual office scene image and means for communicating with the another terminal designated;

means for detecting the attribute data of each of said plurality of terminals; and means for updating the virtual office scene image in accordance with a change in the attribute data of each of said plurality of terminals, wherein said attribute data comprises data indicating a viewing direction of the user and data indicating a log-in time and log-out time of the virtual office system.

13. The system according to claim 12, wherein said detecting means and said updating means are provided in said server.

14. The system according to claim 12, wherein said detecting means and said updating means are provided in each of said plurality of terminals.

15. A virtual office system comprising:

a server for providing a virtual office scene image;

a plurality of terminals connected to said server, configured to display the virtual office scene image including images of said plurality of terminals, each of said plurality of terminals has attribute data indicating a position of a user thereof and comprising means for designating another terminal in the virtual office scene image and means for communicating with the another terminal designated;

means for detecting the attribute data of each of said plurality of terminals; and means for updating the virtual office scene image in accordance with a change in the attribute data of each of said plurality of terminals, wherein said attribute data comprises data indicating whether or not communication with others is desired and which further comprises means for controlling communication based on the attribute data.

16. The system according to claim 15, wherein said detecting means and said updating means are provided in said server.

17. The system according to claim 15, wherein said detecting means and said updating means are provided in each of said plurality of terminals.

18. A communication system having terminals, comprising:

call relation detecting means for detecting a communication status of each of the terminals;

call relation storing means for storing a graph having at least two nodes representing at least two terminals which communicate with each other and at least one segment connecting said at least two nodes, the graph formed based on a detected communication status; and call relation displaying means for displaying the graph stored in said call relation storing means by said at least two terminals, wherein said call relation detecting means comprises means for detecting a call relation attribute indicating a frequency band of communication and a security level, said call relation storing means stores the graph with the call relation attribute, and said call relation informing means informs said at least two terminals of the graph and the call relation attribute stored in said call relation storing means.

19. The system according to claim 18, wherein each of the terminals comprises means for outputting a status of a terminal which represents materialization or cancellation of call relation with other terminals.

20. The system according to claim 19, wherein each of the terminals further comprises means for outputting a call relation attribute indicating a frequency band of communication and a security level.

21. The system according to claim 20, wherein each of the terminals comprises means for outputting a status of a terminal which represents materialization or cancellation of call relation with other terminals.

22. The system according to claim 20, further comprising:

call relation input means for inputting the communication status of each of the terminals.

23. The system according to claim 18, further comprising:

call relation input means for inputting the communication status of each of the terminals.

24. A method for establishing communications from a first user to a second user with common interests, comprising steps of:

storing client accessible information on a server;

storing user identification information on said server;

displaying a specific client accessible information from said server on a first client terminal of said first user;

displaying said specific client accessible information from said server on a second client terminal of said second user;

displaying said user identification information corresponding to said second user on said first client terminal of said first user;

displaying said user identification information corresponding to said first user on said second client terminal of said second user;

selecting said user identification information corresponding to said second user on said first client terminal of said first user;

establishing communication from said first user to said second user in response to the selecting.

25. The method of claim 24, wherein said establishing step comprises activating telephone communication from said first user to said second user.

26. A system for establishing communications from a first user to a second user with common interests, comprising:

means for storing client accessible information on a server;

means for storing user identification information on said server;

means for displaying a specific client accessible information from said server on a first client terminal of said first user;

means for displaying said specific client accessible information from said server on a second client terminal of said second user;

means for displaying said user identification information corresponding to said second user on said first client terminal of said first user;

means for displaying said user identification information corresponding to said first user on said second client terminal of said second user;

means for selecting said user identification information corresponding to said second user on said first client terminal of said first user;

means for establishing communication from said first user to said second user in response to the selecting.

* * * * *